(12) United States Patent
Okamoto et al.

(10) Patent No.: US 6,510,425 B1
(45) Date of Patent: Jan. 21, 2003

(54) DOCUMENT SEARCH METHOD FOR REGISTERING DOCUMENTS, GENERATING A STRUCTURE INDEX WITH ELEMENTS HAVING POSITION OF OCCURRENCE IN DOCUMENTS REPRESENTED BY META-NODES

(75) Inventors: Takuya Okamoto, Sagamihara (JP); Toru Takahashi, Sagamihara (JP); Hisamitsu Kawaguchi, Sagamihara (JP); Katsumi Tada, Kawasaki (JP); Noriyuki Yamasaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/972,004

(22) Filed: Oct. 9, 2001

Related U.S. Application Data

(63) Continuation of application No. 09/256,178, filed on Feb. 24, 1999, now Pat. No. 6,377,946.

(30) Foreign Application Priority Data

Feb. 25, 1998 (JP) ............................................ 10-043187

(51) Int. Cl.[7] ............................................. G06F 17/30
(52) U.S. Cl. ............................ 707/3; 707/100; 707/500
(58) Field of Search ............................... 707/2, 3, 4, 6, 707/100, 500

(56) References Cited

U.S. PATENT DOCUMENTS 5,848,409 A * 12/1998 Ahn ................................. 707/3
5,890,147 A *  3/1999 Peltonen et al. ................. 707/1
6,098,066 A *  8/2000 Snow et al. ..................... 707/3

* cited by examiner

Primary Examiner—John Breene
Assistant Examiner—Cheryl Lewis
(74) Attorney, Agent, or Firm—Antonelli, Terry, Stout & Kraus, LLP

(57) ABSTRACT

A document search method and apparatus and a portable medium used therefor are described, in which when registering a document in a data base, the logic structures of each document to be registered are superposed one on another to generate a structure index in which the structure elements having the same position of occurrence in the document are represented by a single meta-node. At the time of document search, a mass of the meta-nodes meeting a specified structural condition is determined with reference to the structure index. A string index is searched with the meta-node identifiers as a key thereby to determine a mass of documents meeting the specified condition. As a result, a highly accurate structure-specified search is made possible on a document data base including a mass of structured documents. In the structure-specified search of structured documents, the conditions for the position of occurrence of the logic elements in the document are specified, thereby making possible a highly accurate structure-specified search.

8 Claims, 72 Drawing Sheets

FIG.4

```
< !ELEMENT THESIS          ( TITLE , AUTHOR , DATE , TEXT ,
                                        REFERENCE LIST ) >

< !ELEMENT TITLE           ( #PCDATA ) >
< !ELEMENT AUTHOR          ( NEME + ) >
< !ELEMENT NAME            ( #PCDATA ) >
< !ELEMENT DATE            ( #PCDATA ) >

< !ELEMENT TEXT            ( CHAPTER * ) >
< !ELEMENT CHAPTER         ( CHAPTER TITLE , (PARAGRAPH | REMARK ) *,CLAUSE * ) >
< !ELEMENT CLAUSE TITLE    ( #PCDATA ) >
< !ELEMENT CLAUSE          ( CLAUSE TITLE , ( PARAGRAPH | REMARK ) *,TERM * ) >
< !ELEMENT CLAUSE TITLE    ( #PCDATA ) >
< !ELEMENT TERM            ( TERM TITLE , ( PARAGRAPH | REMARK ) * ) >
< !ELEMENT TERM TITLE      ( #PCDATA ) >
< !ELEMENT PARAGRAPH       ( #PCDATA | EMPHASIS ) * >
< !ELEMENT REMARK          ( #PCDATA | EMPHASIS ) * >
< !ATTLIST REMARK
          TYPE ( REFER | NOTE ) REFER >

< !EREMENT EMPHASIS        ( #PCDATA ) >

< !EREMENT REFERENCE LIST  ( REFERENCE + ) >
< !EREMENT REFERENCE       ( TITLE , AUTHOR , SOURCE ) >
< !EREMENT SOURCE          ( #PCDATA ) >
```

FIG.5

```
< !DOCTYPE THESIS SYSTEM " ronbun . dtd " >
< THESIS >
< TITLE > SGML 文書変換言語の開発とその適用事例 < / TITLE >
< AUTHOR >
< NAME > 高橋亨   < / NAME >
< NAME > 東野純一 < / NAME >
< NAME > 星幸雄 < / NAME >
< / AUTHOR >
< DATE > 1996年10月23日 < / DATE >
<TEXT >
< CHAPTER >
< CHAPTER SUBJECT > はじめに < / CHAPTER SUBJECT >
< PARAGRAPH > 文書記述にSGML を用いることによって … < / PARAGRAPH >
< PARAGRAPH > 作成したSGML 文書をさまざまな … < / PARAGRAPH >
< / CHAPTER >…
< CLAPTER >
< CLAUSE SUBJECT > 適用事例 < / CLAUSE SUBJECT >
< CLAUSE >
< CLAUSE SUBJECT >背景 < CLAUSE >
< PARAGRAPH > 現在、ISOでは … < / PARAGRAPH >…
< / CLAUSE >…
< CLAUSE >
< CLAUSE SUBJECT > 変換処理の実例 < / CLAUSE SUBJECT >
< TERM >
< TERM SUBJECT > 数式の変換 < / TERM SUBJECT >
< PARAGRAPH > JIS 規格DTDでは、基本的には数式を … < / PARAGRAPH >…
< REMARK : TYPE = NOTE >ただし、行列式の場合には … < / REMARK >
< / TERM > …
< / CLAUSE >
< / CHAPTER >
< / TEXT >
< REFERENCE LIST >
< REFERENCE >
< TITLE > SGML インスタンスの変換方式の検討 < / TITLE >
< AUTHOR >
< NAME >今郷詔 < / NAME >
< / AUTHOR >
< SOURCE >情報処理学会第49回全国大会< / SOURCE >
< / REFERENCE > …
< / REFERENCE LIST >
< / THESIS >
```

FIG.14

| DOCUMENT ID | CONTEXT ID | CONTENT |
|---|---|---|
| D1 | C1 | "SGML文書変換言語の開発とその適用事例" |
|  | C2 | "高橋亨" |
|  | C3 | "東野純一" |
|  | C4 | "星幸雄" |
|  | C5 | "1996年10月23日" |
|  | C6 | "はじめに" |
|  | C7 | "文書記述にSGMLを用いることによって…" |
|  | C8 | "作成したSGML文書をさまざまな…" |
|  | ⋮ | |
|  | C15 | "適用事例" |
|  | C16 | "背景" |
|  | C17 | "現在、ISOでは…" |
|  | ⋮ | |
|  | C129 | "変換処理の実例" |
|  | C130 | "数式の変換" |
|  | C131 | "JIS規格DTDでは、基本的には数式を…" |
|  | C132 | "ただし、行列式の場合には…" |
|  | ⋮ | |

FIG.36

| DOCUMENT CONTEXT ID | CONTEXT ID | LCFS CONTEXT ID | CONTENT |
|---|---|---|---|
| D1 | C1 | -C351 | "SGML文書変換言語の開発とその適用事例" |
|  | C2 | -C350 | "高橋亭" |
|  | C3 | -C349 | "東野純一" |
|  | C4 | -C348 | "星幸雄" |
|  | C5 | -C347 | "1996年10月23日" |
|  | C6 | -C346 | "はじめに" |
|  | C7 | -C345 | "文書記述にSGMLを用いることによって…" |
|  | C8 | -C344 | "作成したSGML文書をさまざまな…" |
|  | ⋮ | ⋮ | |
|  | C15 | -C337 | "適用事例" |
|  | C16 | -C336 | "背景" |
|  | C17 | -C335 | "現在, ISOでは…" |
|  | ⋮ | ⋮ | |
|  | C129 | -C223 | "変換処理の事例" |
|  | C130 | -C222 | "数式の変換" |
|  | C131 | -C221 | "JIS規格DTDでは、基本的には数式を…" |
|  | C132 | -C220 | "ただし、行列式の場合には…" |
|  | ⋮ | ⋮ | |

FIG.50

TYPE DIFINITION TABLE (4803)

| TYPE | NUMBER OF ELEMENT TYPE NAMES | ELEMENT TYPE NAME |
|---|---|---|
| ATTRIBUTE | 3 | ATTRIBUTE , JOURNAL , MANAGEMENT INFORMATION , ... |
| DATE | 2 | DATE OF ISSUE , REPORTING DATE |
| SUBJECT | 4 | TITLE , SUBJECT |
| : | | |

5001　　5002　　5003

FIG.58
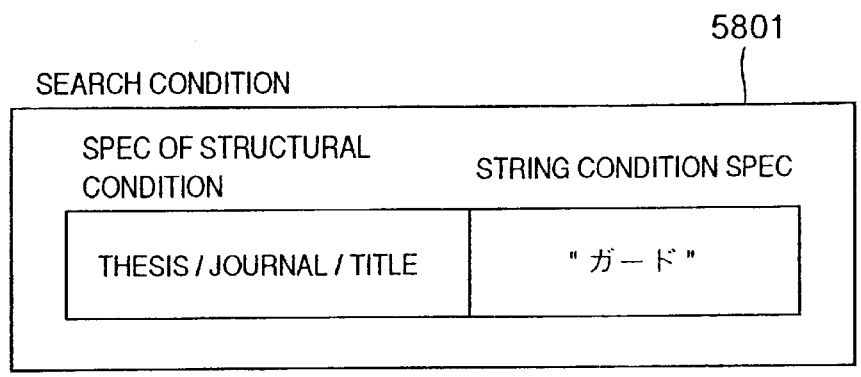
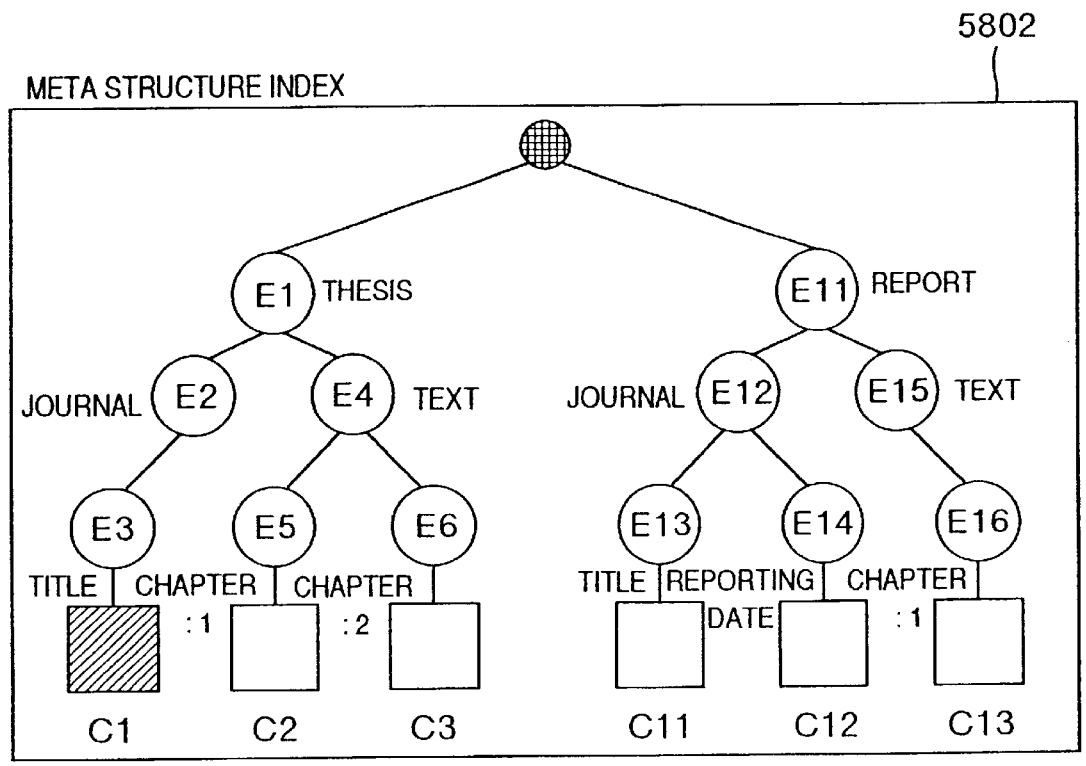
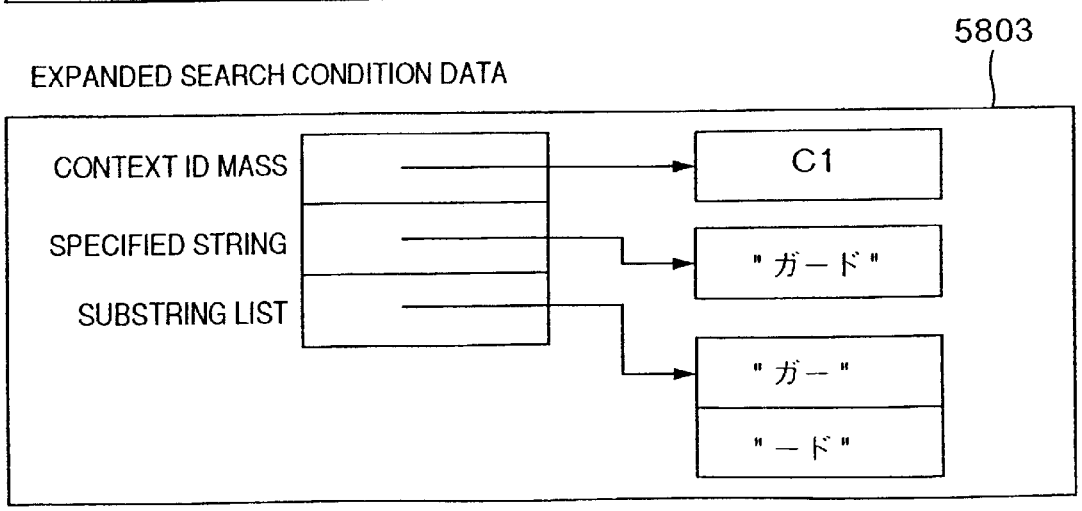

FIG.72

TYPE DEFINITION TABLE ( 4803 )

| TYPE | NUMBER OF ELEMENT TYPE NAMES | DTD NAME AND ELEMENT TYPE NAME |
|---|---|---|
| ATTRIBUTE | 3 | REPORT . dtd : ATTRIBUTE , THESIS . dtd : JOURNAL ... |
| REPORT CONTENT | 1 | REPORT . dtd : TEXT |
| TEXT | 3 | THESIS . dtd : TEXT |
| : | | |

5001   5002   7201

DOCUMENT SEARCH METHOD FOR REGISTERING DOCUMENTS, GENERATING A STRUCTURE INDEX WITH ELEMENTS HAVING POSITION OF OCCURRENCE IN DOCUMENTS REPRESENTED BY META-NODES

This is a continuation of application Ser. No. 09/256,178, filed Feb. 24, 1999 now U.S. Pat. No. 6,377,946.

BACKGROUND OF THE INVENTION

The present invention relates to a method of document registration and a method of document search for a document search system or a document management system using a computer system, or more in particular to a method and apparatus for registration and search of a mass of structured documents each having a logical structure, which is capable of searching specific document contents at high speed, and a portable medium used for them.

With the full scale progress of the information society, computerized document information generated using the word processor, the personal computer or the like have increased more than ever before. Under these circumstances, demand is rising for quickly and accurately retrieving a document containing the required information from a vast accumulation of computerized documents.

A technique meeting this demand is the full-text search. In full-text search, the entire text in the document to be registered is loaded in a computer system and converted into a data base, and the data base is searched directly for a specified character string (hereinafter referred to as the query term). This requires no key word and basically makes possible a search free of detection failure.

On the other hand, high-accuracy search can be realized by adding conditions for logic structure to the query (hereinafter referred to as the structure-specified search) intended for documents in which individual logic elements can be identified (hereinafter referred to as the structured document), including a document described in SGML, for example (C. F. Goldfarb: "THE SGML HANDBOOK" Oxford 1993).

A search method permitting the structure-specified search is proposed in JP-A-8-147311 (hereinafter referred to as the well-known example 1). The well-known example 1 will be briefly described below.

In the method of structured document search according to the well-known example 1, a document is registered first as a text directly in a search data base.

Then, a specific character string (hereinafter referred to as the front marker for the well-known example 1) indicating the head of each logic structure of the registered text and a specific character string (hereinafter referred to as the rear marker for the well-known example 1) indicating the tail of each logic structure of the registered text are detected thereby to identify the logic structure while at the same time segmenting the text by logic structure. In the electronically filed patent specification, for example, "<SDOABJ>" is detected as a front marker and "</SDO>" as a rear marker indicating the scope of the logic structure "abstract", whereby the text defined by them is cut out as a text corresponding to the "abstract". A similar cut-out work is performed also for other logic structures to segment the text by logic structure.

Then, the text corresponding to each logic structure is condensed, and a condensed text is produced. Specifically, as for the "abstract", the text thereof is segmented into substrings by word, and the inclusion relation is checked mutually between the substrings thus segmented. In the process, the character strings contained in other substrings are removed, thereby producing a condensed test of the "abstract". A similar processing is performed for other logic structures to produce a condensed text by logic structure and registered in the search data base as a condensed text file.

Then, "1" is set to a bit corresponding to the character code of the characters appearing in the text to generate a character component table, which is registered as a character component table file in the search data base.

After constructing a search data base in this way, the document search is conducted in the following manner for the well-known example 1.

First, a specified query term is decomposed by character, and the documents containing all the characters constituting the query term are extracted with reference to the character component table.

Then, the condensed text file for the logic structure specified as an object of search is selected among the condensed text files corresponding to logic structures. At the same time, only the condensed text of a document extracted by the character component table search is searched, thereby extracting a document containing the query term specified in the specified logic structure. In the case where the positional relation between a plurality of query terms in the text is not specified in the specified query formula, the search process is terminated. In the case where such a positional relation is specified, on the other hand, the contents of the text corresponding to the document extracted as a result of condensed text search is read, and only those texts containing all the specified query terms and meeting the specified conditions for the positional relation between the query terms are extracted.

In this way, according to the method of the well-known example 1, a structure-specified search is made possible while maintaining a practical search speed for a large-scale text data base.

SUMMARY OF THE INVENTION

The prior art disclosed in the well-known example 1 described above makes possible a structure-specified search to some extent. Nevertheless, there may be the case in which search meeting the structural conditions is impossible as intended by the structure-specified search of the well-known example 1.

In the method of the well-known example 1, the structure of a registered document involved is segmented into several predetermined subelements, and a condensed text file is produced for each subelement. At the time of search, a mass of the condensed text files to be searched is determined by reference to a table defining the correspondence between the structure name of the subelement and the condensed text file, and only the condensed text files contained in the particular mass are searched thereby to realize a structure-specified search.

This method estimates a future search specifying the structural condition at the time of constructing a text data base, and segments the condensed text files in such a manner as to permit a search meeting such a condition. Therefore, the search specifying the structural condition not assumed at the time of data base construction is impossible to conduct.

Assume, for example, that a document is configured of two logic elements (hereinafter called the elements) including "abstract" and "body", and the latter is configured of repetitions of an arbitrary number of "clauses", which in turn includes one "clause subject" and an arbitrary number of "paragraphs". In constructing a text data base from a set of documents having this structure, the condensed text files is segmented into those corresponding to "abstract" and those corresponding to "body". It is impossible to conduct a structure-specified search meeting the condition that "a set of documents containing a string XX in the clause subject is determined".

Of course, this condition can be met if instead of making one condensed text file of the whole "body", the "body" is segmented further into "clause subjected" and "paragraph" to produce a condensed text file. Even when the file is configured this way, however, it is impossible to meet the structural condition that "a set of documents containing a string XX in the first clause (clause subject or paragraph) is determined" or that "a set of documents containing a string XX in the last paragraph of a clause is determined". For this structural condition with a specified order is to be met, it is necessary to prepare a condensed text file for each order of occurrence of a clause and a paragraph. In view of the fact that an arbitrary number of clauses and paragraphs can occur, however, the number of the condensed text files would become enormous. In addition, the well-known example 1 lacks means for setting a correspondence between the structural condition containing an arbitrary specification of the order of occurrence and a mass of finely segmented condensed text files. Actually, therefore, the search meeting this condition is impossible.

As described above, in the prior art, the condition for the position of occurrence of the logic elements in a document cannot be included in the specification of the structural condition, and therefore a highly accurate structure-specified search cannot be executed.

An object of the present invention is to solve the above-mentioned problem of the prior art and to provide a function of conducting a highly accurate and efficient structure-specified search.

Further, the prior art described above can realize only the structure-specified search for a set of documents having a predetermined structure.

Specifically, a structure document such as SGML is the one having a structure predetermined by the DTD (document type definition). In the case where a structure-specified search is conducted for a set of documents according to a specified document type definition, therefore, a document is segmented structurally in order to meet all the conditions for structure specification that can occur, thus making a structure-specified search possible.

Nevertheless, there is not only one document type definition. A thesis, a report, etc. for example, has a different document type definition. In this way, a structured document has various document structures for different objects of the document, and a document type definition corresponding to a particular document structure is produced.

These documents are grouped and registered by document type definition, so that the structure-specified search becomes possible for each group. An attempt to realize a search specifying a common structure that can occur for all the groups, however, cannot be achieved unless the structure-specified search is conducted independently for each group and the result is integrated.

On the other hand, standardization of a structured document not necessarily requiring a specific structure like XML (Extended Markup Language) is going one at W3C (World Wide Web Consortium). The probable trend is toward the situation in which the document having a document structure meeting a specific DTD like SGML is not the only object of search.

Further, according to the prior art described above, even structures having the same meaning (type) like "title", "subject" are regarded as different structures when the element type name is different. In the structure-specified search in terms of "a document containing 'SGML' in 'title'", for example, a document meeting the condition "a document containing 'SGML' in 'subject'" cannot be produced as the search result.

Especially when a document type definition is different, different element type names may be attached to the same type of structure for each document type definition.

Assume that a structure-specified search is to be conducted for "title", for example. Unless the user specifies element type names meaning "title" occurring in each document type definition, such as "title", "subject", "name", "TITLE" and prepares a query specifying a structure, all the documents required cannot be acquired. Also, unless all the document type definitions of the registered documents are known, all the structures meaning "title" cannot be covered by the element type name determined by the user. A document according to the document type definition that a title is described in the structure "T", for example, can never be acquired by the structure-specified search by the user not knowing the rule.

Another object of the present invention is to solve the problems mentioned above and to provide a function of highly accurately and efficiently conducting structure-specified search on a set of documents having different document structures coexisting therein.

Further, assume that a condition for the structure-specified search is set as "a document containing the word 'SGML' in the title of any item including a chapter, a clause, etc.". It is necessary to search all the structures meeting the structural condition "title", thereby leading to a reduced search efficiency.

If all the elements down to title are specified sequentially from the base document element such as "/document/chapter/title" as a query, a structure can be efficiently specified. This requires the user, however, to prepare the structure-specified search condition indicating all the structures, like "/document/chapter/title" or "/document/chapter/clause/title" or "so forth", and thus increases the load on the user. In addition, unless the user grasps all the structures of the document to be searched, a complete search may be impossible.

Still another object of the invention is to solve the problems mentioned above and to provide a function of efficiently realizing a search specifying the same type of structure occurring in a plurality of hierarchical levels without specifying a complicated structural condition.

In order to solve the problems mentioned above, according to the present invention, there are provided a document registration and search method, comprising the following steps.

Specifically, a document registration method according to this invention includes the steps of:

(1) analyzing the logic structure of a document to be registered, generating analyzed document data, and registering the analyzed document data in a document data base;

(2) superpose the logic structures of the documents to be registered, sequentially in the order of registration, causing a single meta element to represent a set of elements having the same position of occurrence in the document and the same type, and causing a single meta string data to represent a set of string data having the same position of occurrence in the document, thereby generating a structure index composed of a structure tree of a set of meta elements and a set of meta string data (hereinafter collectively referred to as the meta-nodes), and attaching to all the meta-nodes constituting the structure index a context identifier for uniquely identifying them in the structure index;

(3) generating structured full-text data composed of the definition of the correspondence between all the string data contained in the analyzed document data corresponding to each document to be registered on the one hand and the context identifier of the meta string data representing the string data in the structure index; and (4) extracting from the structured full-text data corresponding to each document to be registered, a predetermined substring, character position information of the substring in the document to be registered, a document identifier for uniquely identifying the document to be registered, in the document data base, and a context identifier of the metal string data representing the string data containing the substring in the structure index; generating the structured character position information including the character position information, the document identifier and the context identifier; and registering the correspondence between the substring and the structured character position information thereby to update the string index.

Also, in a document search method according to this invention, the process for searching a registered document includes the steps of:

(1) determining a mass of context identifiers meeting a specified structural condition with reference to the structure index;

(2) extracting a predetermined substring from a query term, and extracting a mass of structured character position information corresponding to the substring with reference to the string index; and (3) extracting from the mass of the structured character position information the structured character position information having a context identifier contained in the mass determined in the structural condition determining step and having the same positional relation as the arrangement of the substring on the query term.

Further, in a document search method according to the invention, the process for collectively registering documents having a plurality of document structures includes the steps of:

(1) acquiring the type of a particular structure from the element type name with reference to a type definition table describing the correspondence between the name and the type of the structure that can occur in a plurality of structures in the structure index;

(2) acquiring a structure index having the base document element of the same type as the base document element of the document; and (3) providing a parent node (root meta node) for collecting the structure indexes at the root of the structure index of the documents having a plurality of document structures at the time of registering the structured documents, thereby collecting a plurality of structure indexes into a single meta structure index.

Alternatively, the process for collectively registering documents having a plurality of document structures includes the steps of:

(1) acquiring the type of a particular structure from the element type name with reference to a type definition table describing the correspondence between the name and the type of each structure that can occur in a plurality of structures in a structure index; and (4) adding a provisional base document element shared by all the documents to the analyzed document data obtained by analyzing the structure of a registered document.

The type definition table is prepared beforehand, manually or automatically by assigning synonyms to the same type using a thesaurus or the like.

Further, in a document search method according to this invention, in order to efficiently realize the structure-specified search specifying the elements of the same type occurring at many positions in the structure index, a document registration program includes the step of:

(1) generating an alias structure index together with a structure index at the time of document registration.

The alias structure index is a structure index prepared so that the information capable of being set for each document structure, such as the date of preparation and the data of updating, can be searched collectively without tracing the structure index. The structure-specified search conducted by specifying the type acquired from the alias structure index enables a plurality of elements in the structure index corresponding to an alias to be acquired collectively from the alias structure index, and therefore the search can be realized more efficiently than when acquiring the context identifier of a specified element by tracing the structure index.

BRIEF DESCRIPTION OF THE DRAWINGS

FIG. 4 is a diagram showing an example of the DTD defining a document logic structure.

FIG. 5 is a diagram showing an example description of the structured document according to SGML.

FIG. 14 is a diagram showing a file format of the structured full-text data according to the first embodiment of the invention.

FIG. 36 is a diagram showing a file format of the structured full-text data according to the second embodiment of the invention.

FIG. 50 is a diagram showing the contents of a type definition table according to the fifth embodiment of the invention.

FIG. 58 is a diagram showing an example of generating the expanded search condition data according to the fifth embodiment of the invention.

FIG. 72 is a diagram showing the contents of a type definition table according to a ninth embodiment of the invention.

DESCRIPTION OF THE PREFERRED EMBODIMENTS (1) First Embodiment

A first embodiment of the present invention will be described below with reference to the drawings.

First, a system configuration according to this embodiment will be explained.

Figure 1:
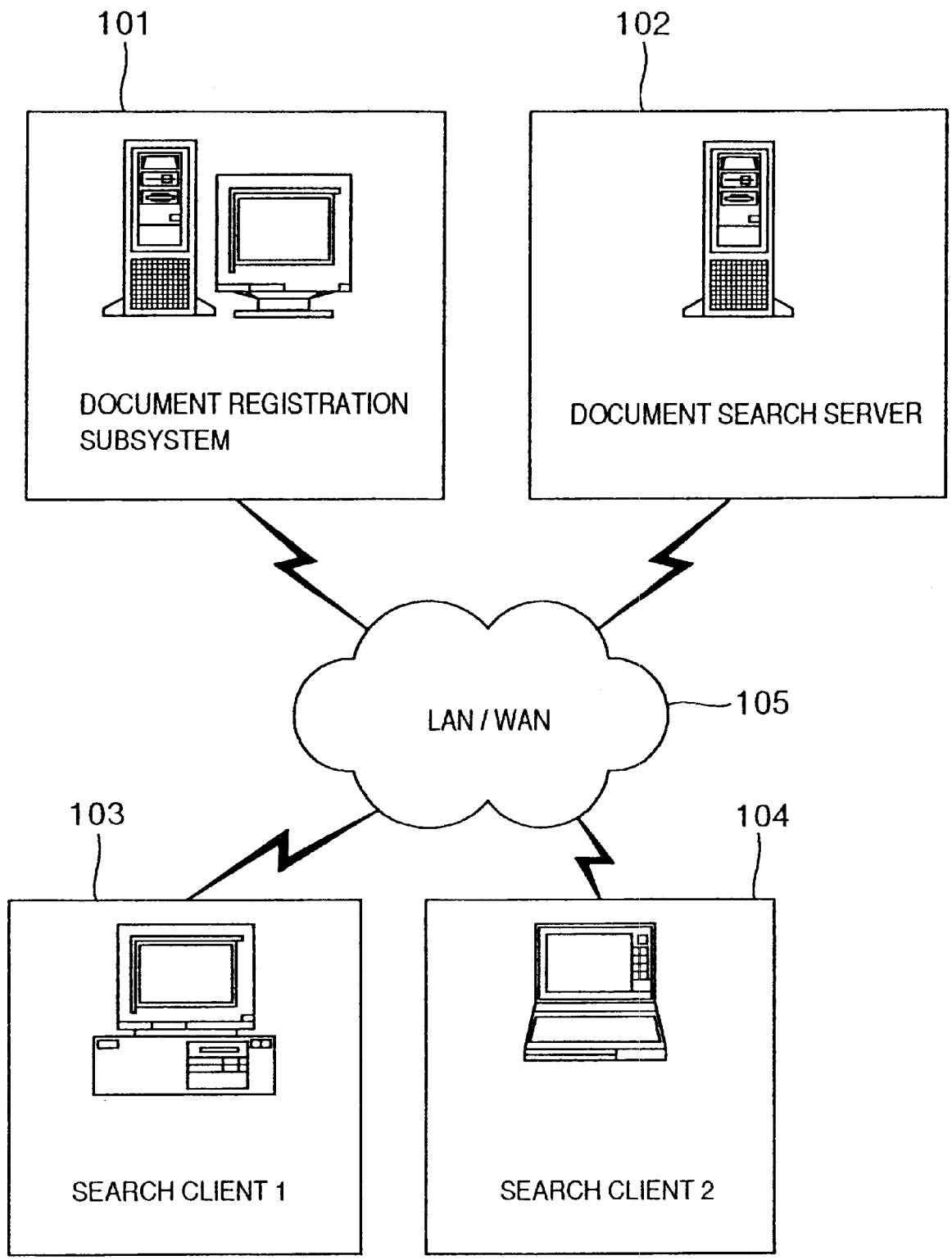
FIG. 1 is a diagram showing a general configuration of a document search system according to a first embodiment of the invention.

FIG. 1 is a diagram showing a general configuration of a document search system according to the first embodiment of the invention. As shown in FIG. 1, the document search system according to the first embodiment of the invention comprises a document registration subsystem 101, a document search server 102, document search clients 103, 104, and a network 105.

The document registration subsystem 101 analyzes the structure of each document input thereto as an object of search and generates index data required for the search. This index data is transferred through the network 105 to the document search server 102 which uses it for the element search process.

The document search server 102 receives a search command from the search clients 103, 104, searches the contents of the documents meeting the conditions specified by the search command using the index data generated by the document registration subsystem 101, and sends back the search result data to the search client constituting an origin of the search request.

The search clients 103, 104 display a screen for the user to specify a search condition (query) interactively, converts the search condition specified by the user on the screen into a search command that can be interpreted by the document search server 102, and transmits the search command to the document search server 102 through the network 105. Upon receipt of the search result data sent back after the search conducted by the document search server 102 in response to the search command, the search client 102 proposes the received search result data by displaying it on the screen. FIG. 1 shows a configuration example using the two computers 103, 104 as search clients. Nevertheless, either a single computer or three or more computers can be configured as search clients.

The network 105 is a local area network and/or a wide area network used by the document registration subsystem 101, the document search server 102 and the search clients 103, 104 to exchange various data and commands.

In FIG. 1, the network 105 is used for transferring the index data from the document registration subsystem 101 to the document search server 102. As an alternative, a configuration is possible which uses a portable medium such as a floppy disk, a magneto-optic disk, a write-once optical disk, etc. As another alternative, the document registration subsystem 101 and the document search server 102 are mounted on a single computer and the data transfer is eliminated.

Further, although FIG. 1 shows the case in which a computer is used for each of the search clients 103, 104, and the document search server 102, a configuration can be employed in which one search client or more and the document search server share the same computer.

The document registration subsystem according to this embodiment, i.e. the subsystem 101 in FIG. 1 will be explained below.

Figure 2:
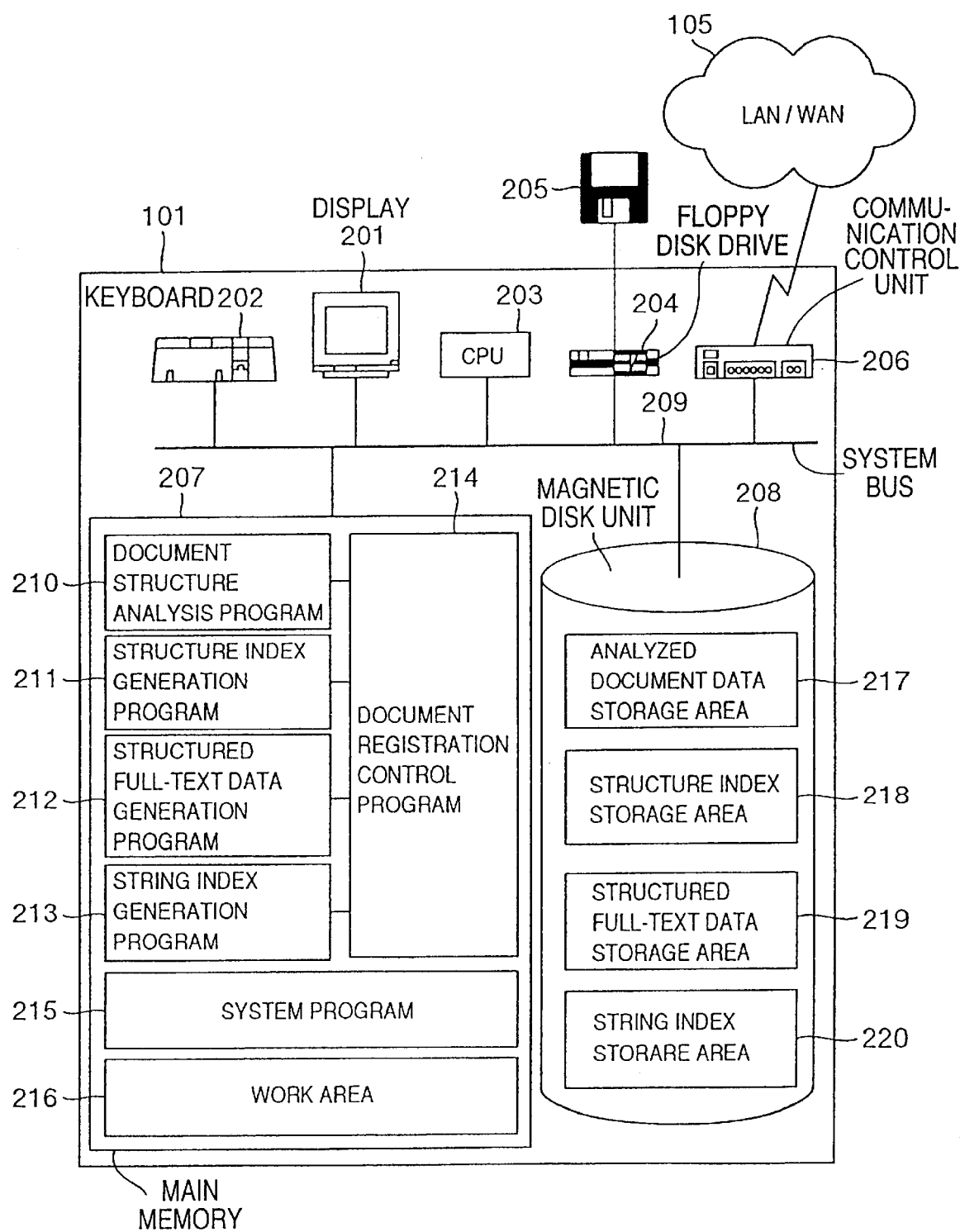
FIG. 2 is a diagram showing a configuration of a document registration subsystem according to the first embodiment of the invention.

FIG. 2 is a diagram showing a configuration of the document registration subsystem 101 according to this embodiment.

The document registration subsystem 101 shown in FIG. 2 includes a display 201, a keyboard 202, a central processing unit (CPU) 203, a floppy disk drive 204, a floppy disk 205, a communication control unit 206, a main memory 207, a magnetic disk unit 208 and a system bus 209.

The display 201 is used for displaying the progress of execution of the document registration process in this subsystem. The keyboard 202 is used for inputting a command specifying the execution of the document registration process, etc. The central processing unit 203 executes various programs configuring this subsystem. The floppy disk drive 204 is used for writing and reading data to and from the floppy disk 205. The floppy disk 205 is used for storing a document to be registered and inputting the same document to this subsystem. The communication control unit 206 is used for communicating with the document search server 102 through the network 105 to exchange requests and data. The main memory 207 is used for holding various programs and provisional data for executing the processes in this subsystem. The magnetic disk unit 208 is used for storing the document data registered and the index data generated by this subsystem. The system bus 209 is used for connecting these various units.

The main memory 207 stores therein a document structure analysis program 210, a structure index generation program 211, a structured full-text data generation program 212, a string index generation program 213, a document registration control program 214 and a system program 215 on the one hand, and holds a work area 216 on the other hand. An analyzed document data storage area 217, a structure index storage area 218, a structured full-text data storage area 219 and a string index storage area 220 are secured in the magnetic disk unit 208.

The document structure analysis program 210, which is described by SGML, is used for reading the document to be registered stored in the floppy disk 205, generating the analyzed document data by analyzing the logic structure of the document to be registered, and storing the analyzed document data in the analyzed document data storage area 217. The structure index generation program 211 is executed for registering the information on the logic structure of the analyzed document data in the structure index stored in the structure index storage area 218 and updating the structure index. The structured full-text data generation program 212 is executed for generating the structured full-text data on the document to be registered from the analyzed document data and storing the same data in the structured full-text data storage area 219.

The string index generation program 213 is executed for generating the data indicating the correspondence between a predetermined substring and the structured character position information of the substring from the structured full-text data, and registering the same data in the string index stored in the string index storage area 220 thereby to update the string index.

The document registration control program 214 is used for controlling the activation and execution of the document structure analysis program 210, the structure index generation program 211, the structured full-text data generation program 212 and the string index generation program 213, while at the same time transferring the analyzed document data, the structure index and the string index generated by these programs to the document search server 102 through the network 105. The system program 215 provides basic functions such as inputting/outputting data to and from the peripheral units on the computer for executing each program constituting this subsystem. The work area 216 is used for storing the data temporarily required for executing each program.

Although this embodiment represents a configuration in which the document to be registered stored in the floppy disk 205 is read as an input, it is also possible to employ a configuration in which such a document is read from a magneto-optic disk, a write once optical disk or other portable medium, or a configuration in which the document transferred through the network 105 is input. Further, according to this embodiment, the network 105 is used for transferring the analyzed document data, the structure index and the string index generated to the document search server 102. Instead, a configuration can be employed which uses a floppy disk, a magneto-optic disk, a write once optical disk or the like portable medium, or a configuration in which the document registration subsystem 101 and the document search server 102 are mounted on a single computer to eliminate data transfer.

Now, the steps of processing the document registration according to this embodiment will be explained.

Figure 3:
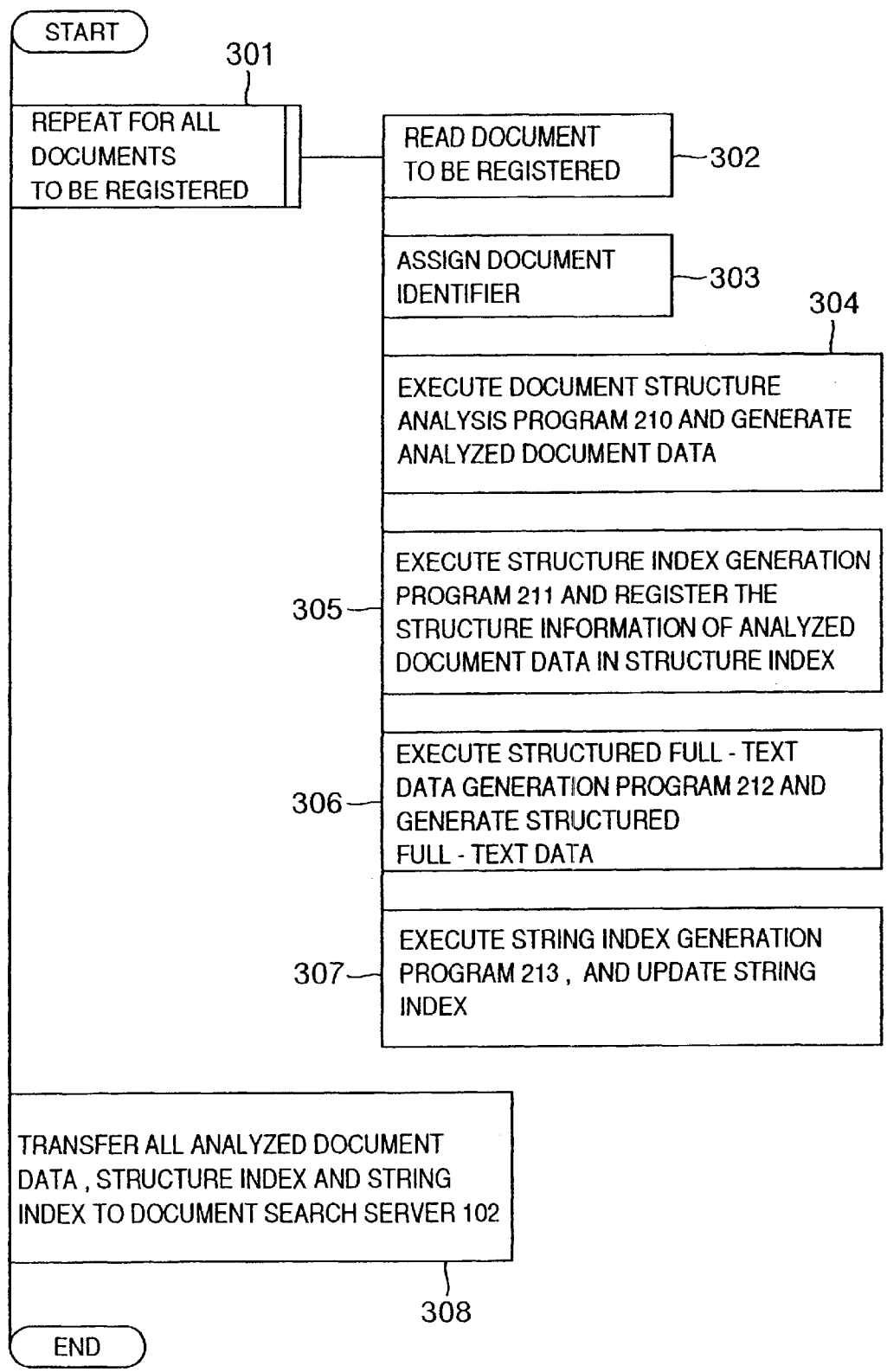
FIG. 3 is a PAD generally showing the steps of document registration process according to the first embodiment of the invention.

FIG. 3 is a PAD (Problem Analysis Diagram) briefly showing the steps of processing the document registration according to a first embodiment of the invention. Upon activation of the document registration control program 214 in response to a registration command or the like from the keyboard 202, this program first checks the floppy disk 205 for the presence or absence and the number of documents to be registered stored therein, and repeatedly executes a series of the process including steps 302 to 305 for all the documents to be registered (step 301).

In step 302, an unprocessed document to be registered is selectively read from the set of documents to be registered stored in the floppy disk 205. In step 303, the document to be registered thus read is assigned a document identifier. The document identifier is the number for identifying a specific document uniquely in a document data base.

In step 304, the document structure analysis program 210 is executed with this document to be registered read as an input. The document structure analysis program 210 generates the analyzed document data corresponding to the document to be registered and stores the data in the analyzed document data storage area 217.

In step 305, the structure index generation program 211 is executed with the analyzed document data generated in step 304 as an input. The structure index generation program 211 first reads the current structure index from the structure index storage area 217, registers the structure information held in the supplied analyzed document data in the structure index, and stores the updated structure index again in the structure index storage area 218.

In step 306, the analyzed document data generated in step 304 is supplied as an input and the structured full-text data generation program 212 is executed. The structured full-text data generation program 212, with reference to the analyzed document data supplied thereto, generates the structured full-text data corresponding to the document to be registered read in step 303, and stores it in the structured full-text data storage area 219.

In step 307, the string index generation program 213 is executed in response to the structured full-text data generated in step 306 and supplied thereto as an input. The string index generation program 213 first reads the current string index from the string index storage area 220, generates the data indicating the correspondence between a predetermined substring and the structured character position information of the particular substring from the structured full-text data, registers it in the string index, and stores the updated string index again in the string index storage area 220.

Upon complete series of process from steps 302 to 307 on all the documents to be registered, the document registration control program 214 executes step 308 and terminates the process. In step 308, all the analyzed document data stored in the analyzed document data storage area 217, the structure index stored in the structure index storage area 218, and the string index stored in the string index storage area 220 are transferred to the document search server 102 through the network 105.

Now, the detail of step 304 in FIG. 3, i.e. the steps of processing in the document structure analysis program 210 according to this embodiment will be explained.

The document structure analysis program 210 processes the structural analysis of a single document to be registered described using SGML. In SGML, the logic structure shared by a set of documents of a specific type is defined by DTD (document type definition). FIG. 4 shows an example of DTD. The DTD defines a mass of logic elements (hereinafter referred simply as "elements") constituting a document thereby to define the logic structure of the document. In FIG. 4, the part defined by the string "<!ELEMENT" and string ">" is called an element type declaration. Each element type declaration specifies the name (called the element type name) shared by a set of elements having an element type and the structure thereof. The string indicated in the left part of the element type declaration indicates the element type name and the right part is the definition of the structure of the content thereof.

In the DTD shown in FIG. 4, the element type declaration for the element type "thesis" specifies that the content of the element associated with this element type has a structure including each one of the elements of the element types "title", "author", "date", "text" and "reference list" arranged in that order. A plurality of element type names are arranged by separating them by "" from each other, indicating that the elements associated with these element type names are required to occur in the specified order.

The element type declaration for the element type "author" specifies that the content of the element associated with this element type has a structure including at least one repetition of the element associated with the element type "name". The character "+" is added to the tail of the element type name to indicate that at least one element associated with the particular element type name occurs.

The element type declaration for the element type "text" specifies that the content of the element associated with this element type has a structure including at least zero repetition of the element associated with the element type "chapter". The character "*" is added to the tail of the element type name to indicate that at least zero element associated with this element type name occurs.

The element type declaration for the element type "chapter" specifies that the content of the element associated with this element type has a structure including at least zero neighboring element associated with the element type "paragraph" or "remark" at the tail of one element associated with the element type "chapter title", followed by at least zero repetition of the element associated with the element type "clause". A plurality of element type names are segmented by "|" to indicate that an element associated with any one of the element types segmented by the character occurs.

The element type declaration for the element type "clause" specifies that the content of the element associated with this element type has a structure including one element associated with the element type "clause title", followed by at least zero neighboring element associated with the element type "paragraph" or "remark", further followed by at least zero repetition of the element associated with the element type "term".

The element type declaration for the element type "term" specifies that the content of the element associated with this element type has a structure including one element associated with the element type "term title", followed by at least zero repetition of the element associated with the element type "paragraph" or "remark".

The element type declaration for the element type "reference list" specifies that the content of the element associated with this element type has a structure including at least one repetition of the element associated with the element type "reference".

The element type declaration for the element type "reference" specifies that the content of the element associated with this element type has a structure including one element each associated with the element types "author", "date" and "source" arranged in that order.

Also, the content of the elements associated with the element types "title", "name", "date", "chapter title", "clause title", "term title", "emphasis" and "source" is specified simply as "#PCDATA". This specifies that these elements have no subelements and has a content composed simply of a character string. The element type declaration for the element types "paragraph" and "remark", on the other hand, specifies that the elements associated with these element types have a structure including at least zero repetition of an element or a simple character string associated with the element type "emphasis".

In the DTD, the part defined between the string "<!ATTLIST" and the string ">" is called an attribute list declaration, which defines the attribute shared by a set of elements associated with an element type. In the DTD shown in FIG. 4, it is defined that the element associated with the element type "remark" has the attribute "type", that this attribute can assume a value of "refer" or "note", and that in the case where this last definition is omitted, "refer" is given as a value.

An example of the SGML document described according to the DTD shown in FIG. 4 is shown in FIG. 5. The part defined between the string "<!DOCTYPE" and the string ">" at the head of the document is called the document type declaration, which declares the DTD followed by the particular SGML document and the element type name of the base document element. In the example shown in FIG. 5, this part specifies that this document follows the DTD stored in the file "ronbun.dtd", and that the element type name of the base document element is "thesis". In this case, assume that the DTD shown in FIG. 4 is stored in the file "ronbun.dtd".

As shown in FIG. 5, the document structure is expressly described in SGML by adding a mark indicating the head position and a mark indicating the tail position of each element constituting a document. The mark indicating the head position of each element is called the "start tag" and the mark indicating the tail position thereof is called the "end tag". The start tag is indicated by describing the element type name of a particular element between the strings "<" and ">". The end tag is indicated by describing the element type name of a particular element between the strings "</" and ">". In the case where an element has an attribute, the specification of the attribute value can be described in the start tag (after the element type name). The specification of an attribute value is indicated by placing the string "=" between the attribute name and the attribute value. In FIG. 5, for example, the start tag "<remark type=note>" attaches the attribute value "note" to the attribute "type" of the element "remark". In the SGML document, the part describing the document structure using these tags is called the "document instance".

Figure 7:
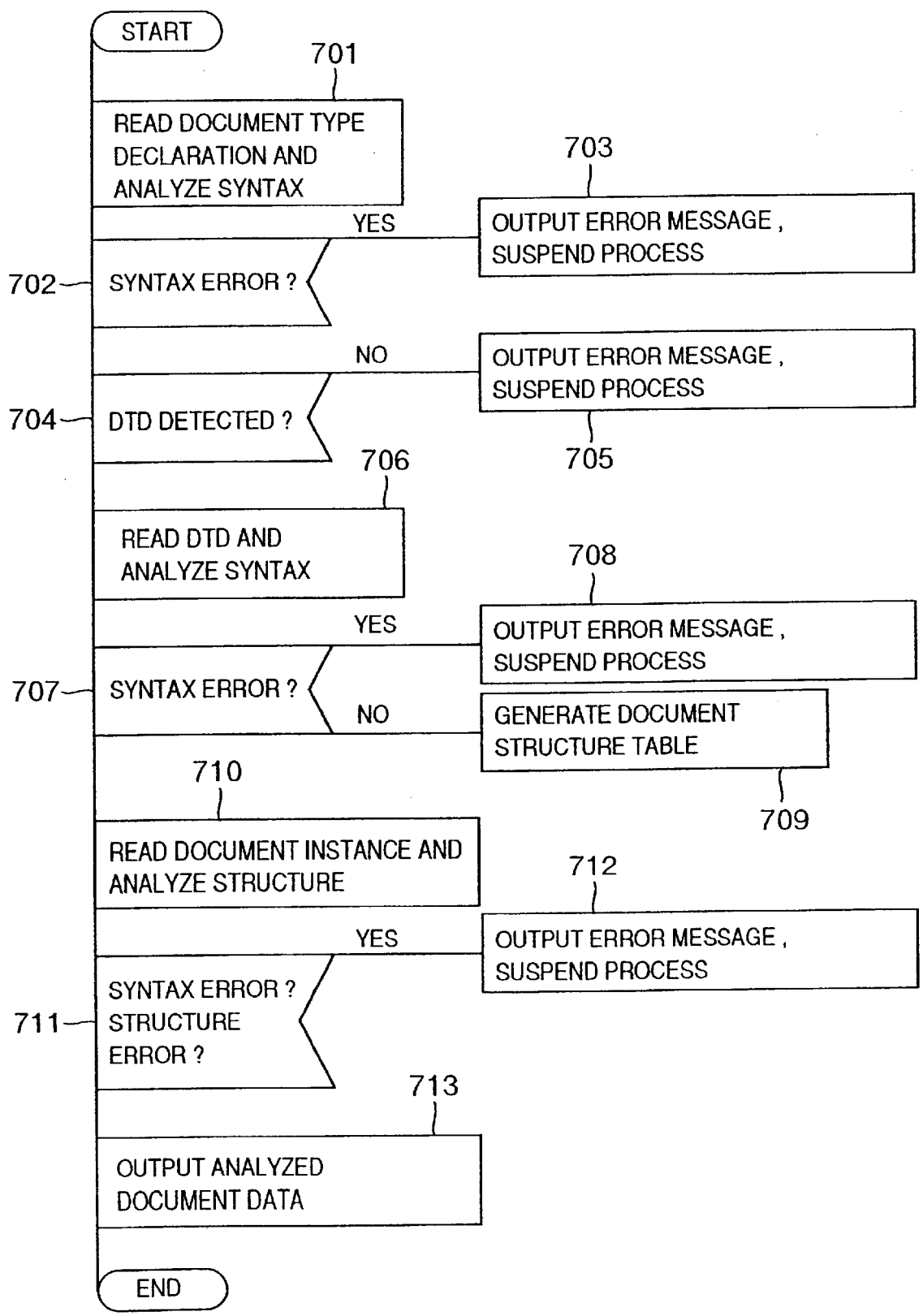
FIG. 7 is a PAD showing the steps of a document structure analysis program according to the first embodiment of the invention.

The detail of step 304 in FIG. 3, i.e. the steps of processing the document structure analysis program 210 according to this embodiment is shown in the PAD of FIG. 7.

As shown in FIG. 7, the document structure analysis program 210, upon activation thereof by the input thereto of one document to be registered described in SGML, first reads the document type declaration described at the head of the particular document and analyzes the syntax thereof (step 701). Then, step 702 determines the presence or absence of a syntax error in the document type declaration. In the case where a syntax error is detected, the process proceeds to step 703 where an error message is output and the process is suspended.

In the absence of a syntax error in the document type declaration, the process proceeds to step 704 for determining whether the DTD file specified in the particular document type declaration is present or not. Unless the DTD file is detected, the process proceeds to step 705 where an error message is output and the process is suspended.

In the case where the DTD file is detected, on the other hand, the process proceeds to step 706 where the content of the file is read and the syntax thereof is analyzed. Then, in step 707, the presence or absence of a syntax error in the DTD is determined. In the case where a syntax error is detected, the process proceeds to step 708, where an error message is output and the process is suspended. In the case where no syntax error is detected, on the other hand, the process proceeds to step 709 where a document structure table providing data describing the document structure model defined by the DTD is generated on the memory.

Then, in step 710, the document instance is read with reference to the document structure table described above, and the structure is analyzed, with the result that an analyzed document data is generated. Then, step 711 determines whether the document instance contains a syntax error or a structural error (deviation from the structure model defined by DTD) or not. In the case where a syntax error or a structure error is detected, the process proceeds to step 712, where an error message is output and the process is suspended. In the case where no error is detected, on the other hand, the process proceeds to step 713 where the analyzed document data including a document identifier for identifying the document to be registered and the analysis result data obtained by the structural analysis in step 710 are output to the analyzed document data storage area 217 and the process is terminated.

Figure 8:
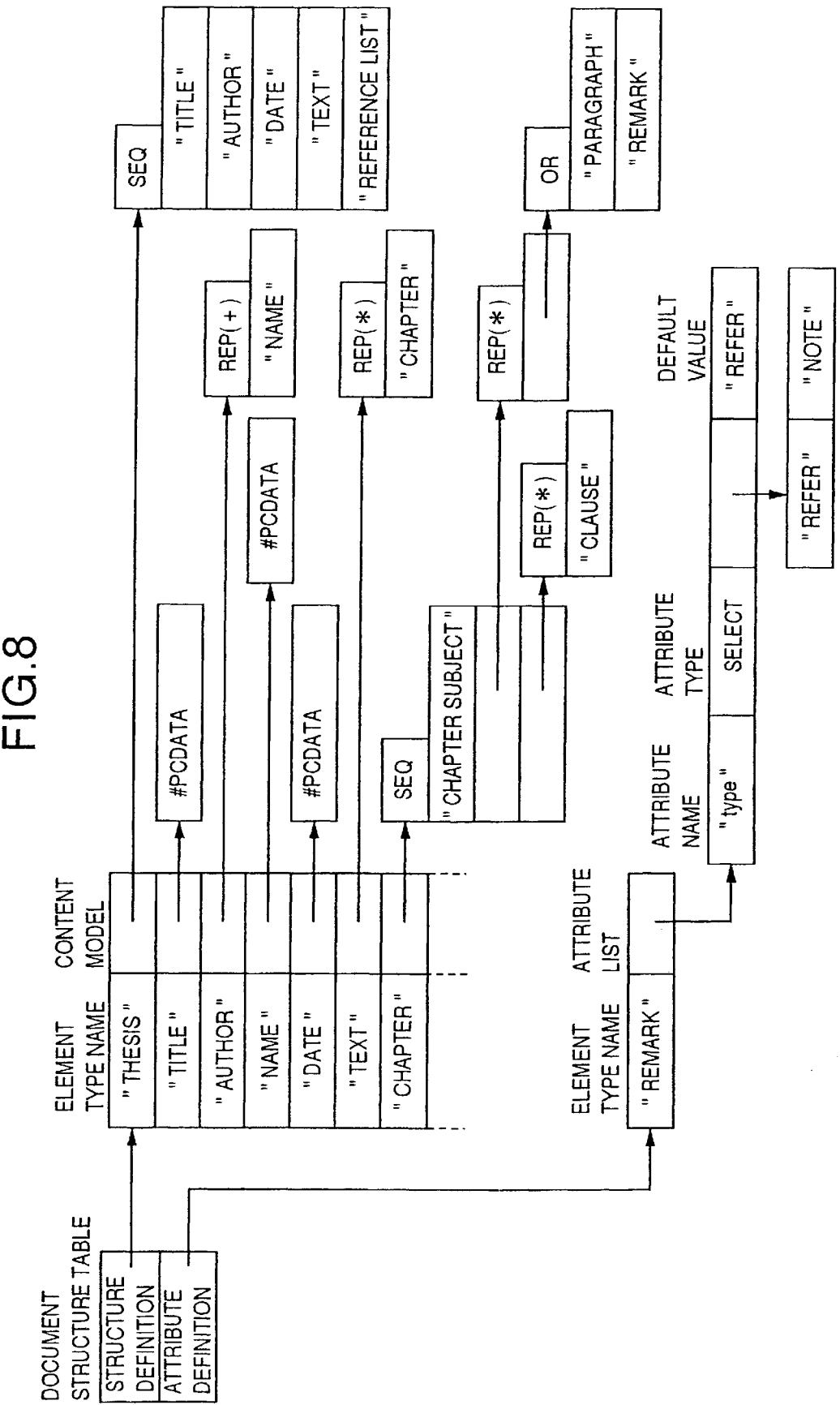
FIG. 8 is a diagram showing a data structure of a document structure table.

As an example, reference is made to the case in which the document structure analysis program 210 is executed with the SGML document of FIG. 5 as a document to be registered, and where the content of the DTD file "ronbun.dtd" referred to by the document is the DTD shown in FIG. 4. In this case, the document structure table generated in step 709 assumes a data structure as shown in FIG. 8. As shown in FIG. 8, the document structure table includes two parts, a structure definition and an attribute definition. The structure definition defines the data model of the content that the element associated with a particular element type corresponding to the element type name of each element type configuring the DTD. The attribute definition, on the other hand, defines the name, the type of the attribute value and the default value of each attribute of each element associated with each element type corresponding to the element type name configuring the DTD. By referring to this structural definition, it is determined whether the arrangement or the hierarchical relation of a set of elements occurring in the document instance is correct or not (presence or absence of an element error). Also, in the case where a tag is omitted or an attribute value is specified, they can be complemented.

Figure 6:
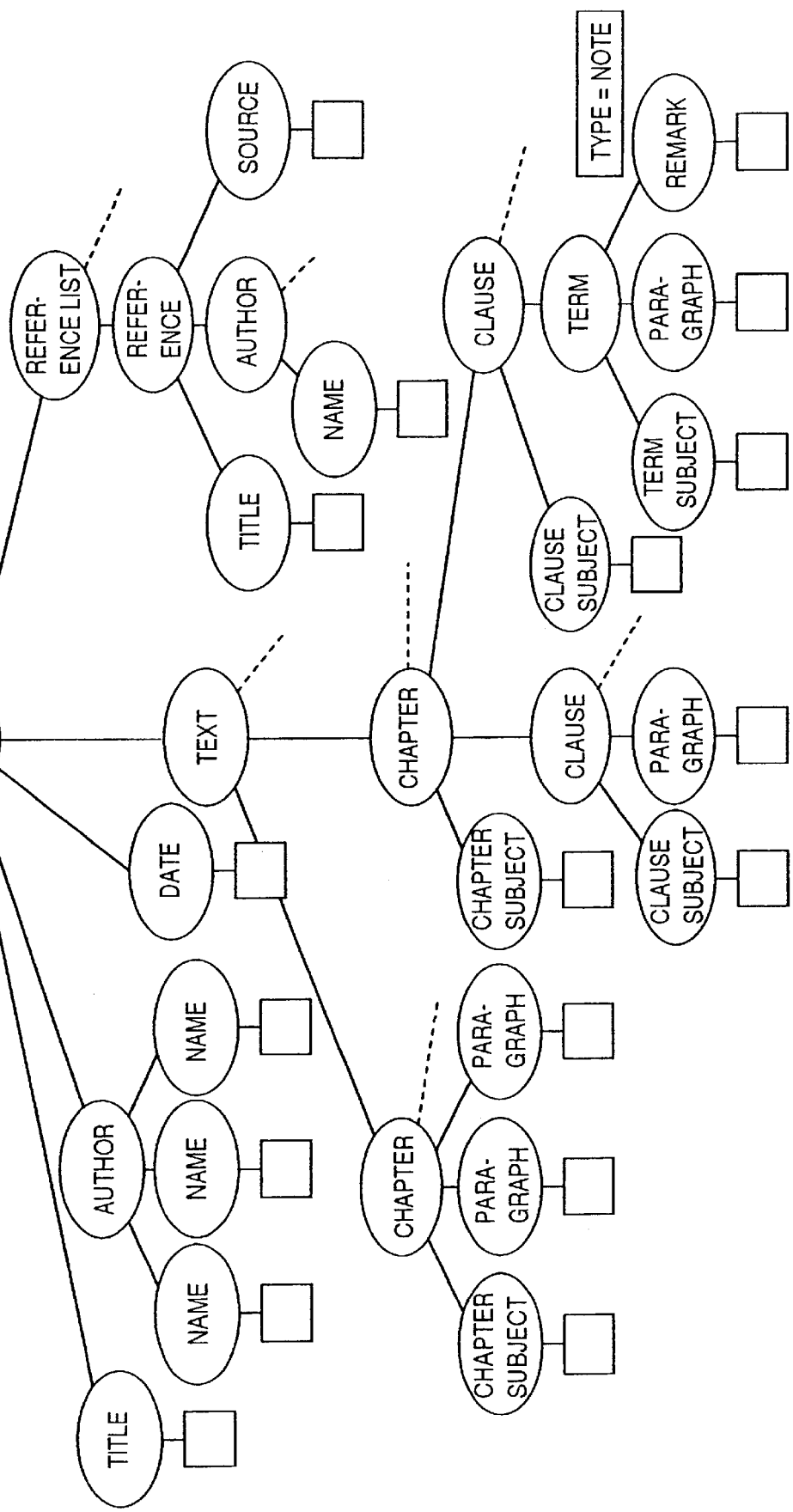
FIG. 6 is a model diagram showing a pattern of the logic structure of a document expressed by SGML.

Assume that the SGML document shown in FIG. 5 is supplied to the document structure analysis program 210 as a document to be registered and that the DTD thereof is as shown in FIG. 4. Then, the structure tree shown in FIG. 6 is obtained as the analyzed document data. FIG. 6 is a model diagram showing a pattern of the logic structure of the document expressed by the SGML description shown in FIG. 5. As shown in FIG. 6, the logic structure of the structured document can be grasped as a structure tree with each element as an intermediate node and the string data as end nodes. In FIG. 6, each element is expressed by a circle, and the string data by a rectangle.

According to this embodiment, a configuration is employed in which the structured document described in SGML is processed as a document to be registered. Nevertheless, a configuration is possible in which a structured document described in other forms such as ODA (open document architecture) can be used as a document to be registered.

Figure 9:
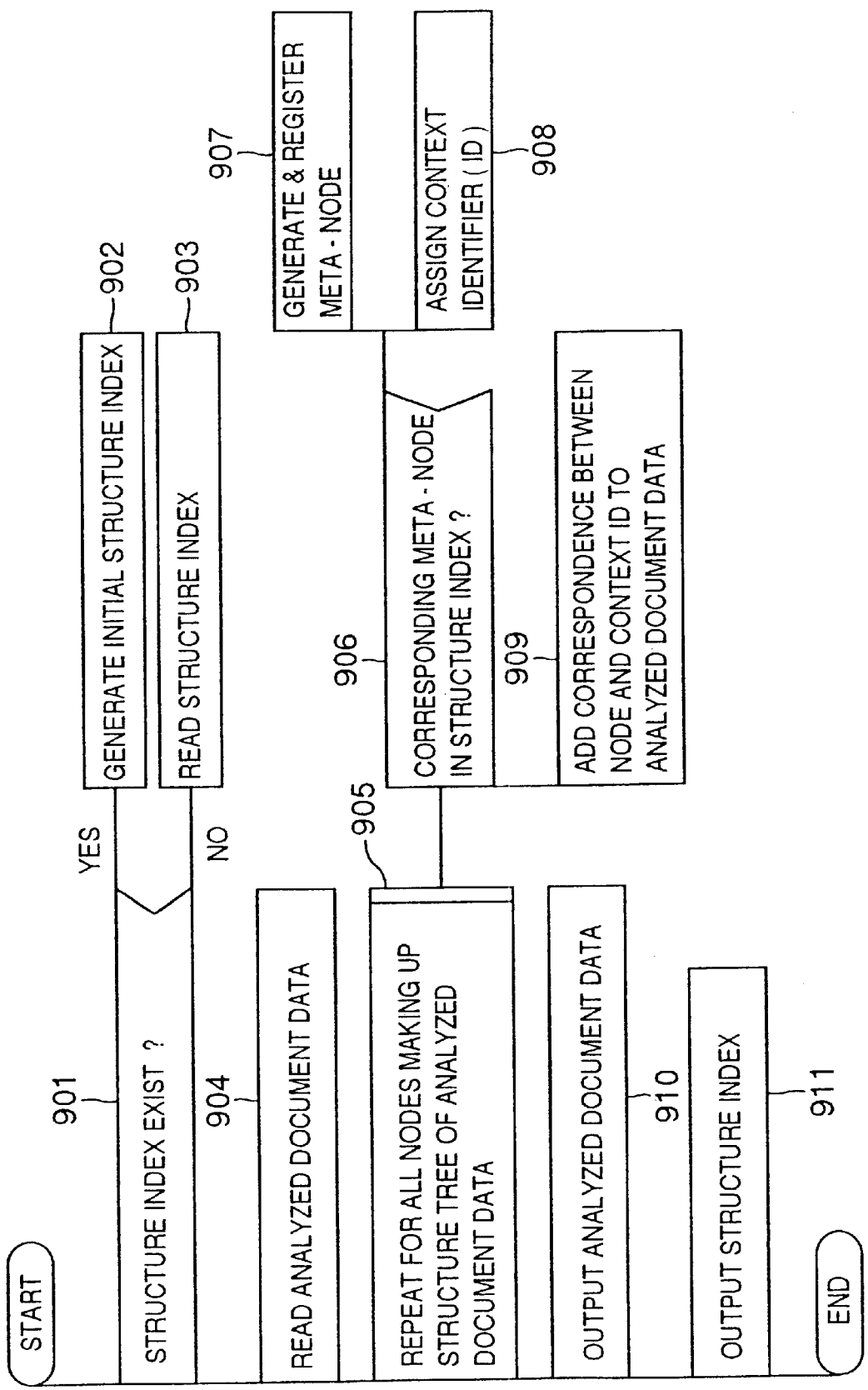
FIG. 9 is a PAD showing the steps of a structure index generation program according to the first embodiment of the invention.

FIG. 9 is a PAD showing the detail of step 305 in FIG. 3, i.e. a PAD showing the steps of processing in the structure index generation program 211 according to this embodiment.

The structure index generation program 211 first determines, in step 901, whether the existing structure index is present in the structure index storage area 218. In the case where the structure index is not present in the structure index storage area 218, the process proceeds to step 902 for generating an initial (vacant) structure index. In the case where the existing structure index is detected, on the other hand, the process proceeds to step 903 for reading the same structure index.

Then, in step 904, the analyzed document data of the document to be registered is read from the analyzed document data storage area 217.

Next, in step 905, the process of steps 906 to 909 is repeated for all the nodes (elements and string data) making up the structure tree of the analyzed document data.

Step 906 determines whether or not a meta-node (meta element or meta string) corresponding to a node currently closely watched in the analyzed document data exists in the structure index. In the case where there exists no such corresponding meta-node, the process proceeds to step 907 where a meta-node corresponding to the particular node is generated and registered in the structure index and further the meta-node thus registered is assigned a context identifier providing the number for uniquely identifying the meta-node in the structure index (step 908). In step 909, the correspondence between the node currently closely watched in the analyzed document data and the context identifier for identifying the meta-node corresponding to the node in the structure index is added to the analyzed document data, and thus the analyzed document data is updated.

Upon complete repetition of step 905 and subsequent steps, the process proceeds to step 910 for outputting the updated analyzed document data and storing them in the analyzed document data storage area 217. Then, in step 911, the updated structure index is output and stored in the structure index storage area 218, thus terminating the process.

Figure 10:
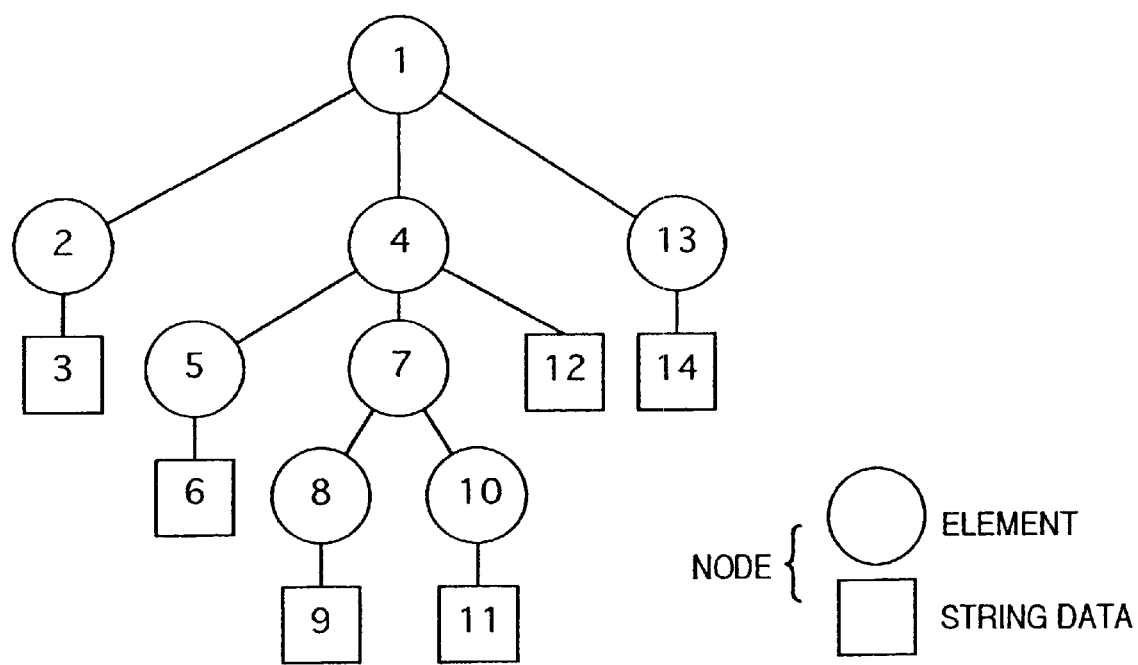
FIG. 10 is a diagram showing the order in which the analyzed document data are traced according to the first embodiment of the invention.

Now, the order in which individual nodes are processed by tracing the structure tree of the analyzed document data at the time of repetitive processing of all the nodes making up the structure tree in step 905 will be explained with reference to FIG. 10. In FIG. 10, each element node is designated by an ellipse, each string node by a rectangle, and in the case where a given node has a plurality of subnodes, the latter are expressed by arranging them from left to right in the order of occurrence. Also, the numerical character attached to each node indicates the order of processing the particular node. As shown in FIG. 10, in step 905, a set of nodes are processed in such an order that starting with the node located at the root of the structure tree, each specific node is processed first and then the subnodes thereof are processed sequentially in the order of occurrence.

Figure 11:
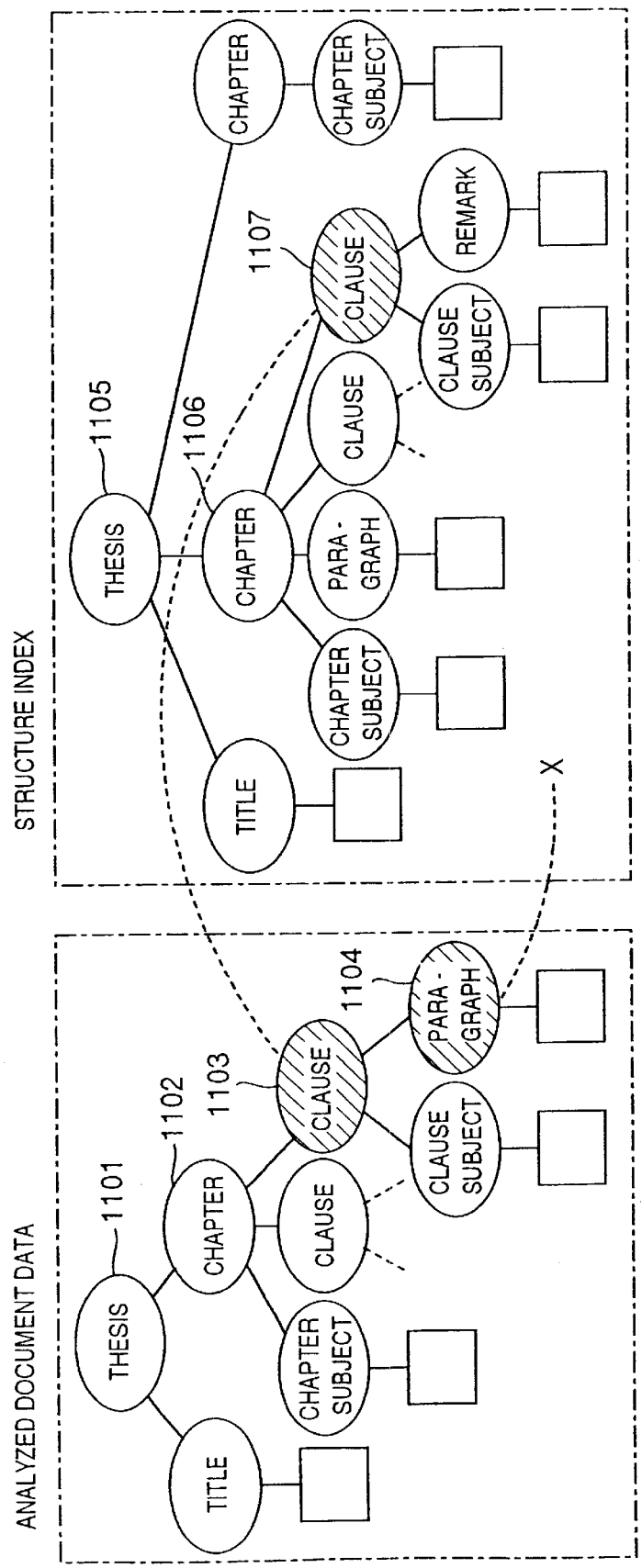
FIG. 11 is a diagram showing the correspondence between nodes and meta-nodes according to the first embodiment of the invention.

Now, the specific process in step 906, i.e. the specific process for determining whether or not a meta-node corresponding to a node currently closely watched in the analyzed document data exists in the structure index will be explained with reference to FIG. 11. FIG. 11 is a diagram showing the correspondence between a set of nodes making up the structure tree of the analyzed document data shown to the left of the drawing and a set of nodes (meta-nodes) constituting the structure tree of the structure index shown to the right in the drawing.

According to this embodiment, it is defined that a given node in the structure tree of the analyzed document corresponds to a metal node in the structure tree of the structure index in the case where the structure tree address of the particular node and the structure tree address of the particular meta-node are equal to each other.

The structure tree address is defined herein as a combination of the type of each node (element, string data, and in the case of an element, the element type) existing along a given route starting with the root of the structure tree and traced from a superior node to subnodes till reaching the specific node on the one hand and the number of the order in which the particular node occurs in the sibling nodes having the same node type.

For example, among a set of nodes in the analyzed document data shown in FIG. 11, the node 1101 has no superior node and the first "thesis" element node in the sibling nodes. Therefore, the structure tree address of this node can be expressed as "/thesis[1]". In similar fashion, the node 1102 is a subnode of the node 1101 and the first "chapter" element node in the sibling nodes. Therefore, the structure tree address of this node can be expressed as "/thesis[1]/chapter[1]". Also, the node 1103 is a subnode of the node 1102, and the second "clause" element node in the sibling nodes, and therefore the structure tree address of this node can be expressed as "/thesis[1]/chapter[1]/clause[2]". Further, the node 1104 is a subnode of the node 1103 and the first "paragraph" element node in the sibling nodes, and therefore the structure tree address of this node can be expressed as "/thesis[1]/chapter[1]/clause[2]/paragraph[1]".

In similar fashion, the structure tree address of each meta-node making up a structure tree of the structure index on the right side of FIG. 11 is determined as follows. The structure tree address of the meta-node 1105 is "/thesis[1]" and equal to that of the node 1101. Similarly, the structure tree address of the meta-node 1106 is "/thesis[1]/chapter[1]" and equal to the structure tree address of the node 1102. The structure tree address of the meta-node 1107 is "/thesis[1]/chapter[1]/clause[2]" and equal to the structure tree address of the node 1103. As a result, in step 906, it is determined that the node 1101 corresponds to the meta-node 1105, the node 1102 to the meta-node 1106, and the node 1103 to the meta-node 1107.

In the structure index of FIG. 11, there is no meta-node having the same structure tree address as the node 1104. Therefore, it is determined that there exists no meta-node corresponding to the node 1104 in the structure index. Thus, in step 907, a new meta-node is generated and registered in the structure index. In the case where a new meta-node corresponding to a given node is registered in step 907, a meta-node of the type corresponding to the particular node is added to the tail of the subnodes having a meta-node corresponding to a superior node of the particular node. In the case where a meta-node corresponding to the node 1104 in FIG. 11 is registered, for example, a meta-node of the element type "paragraph" is added to the subnodes of the meta-node 1107 corresponding to the node 1103 which is a superior node of the node 1104, and the particular meta-node is placed at the tail end of the sibling meta-nodes.

Figure 12:
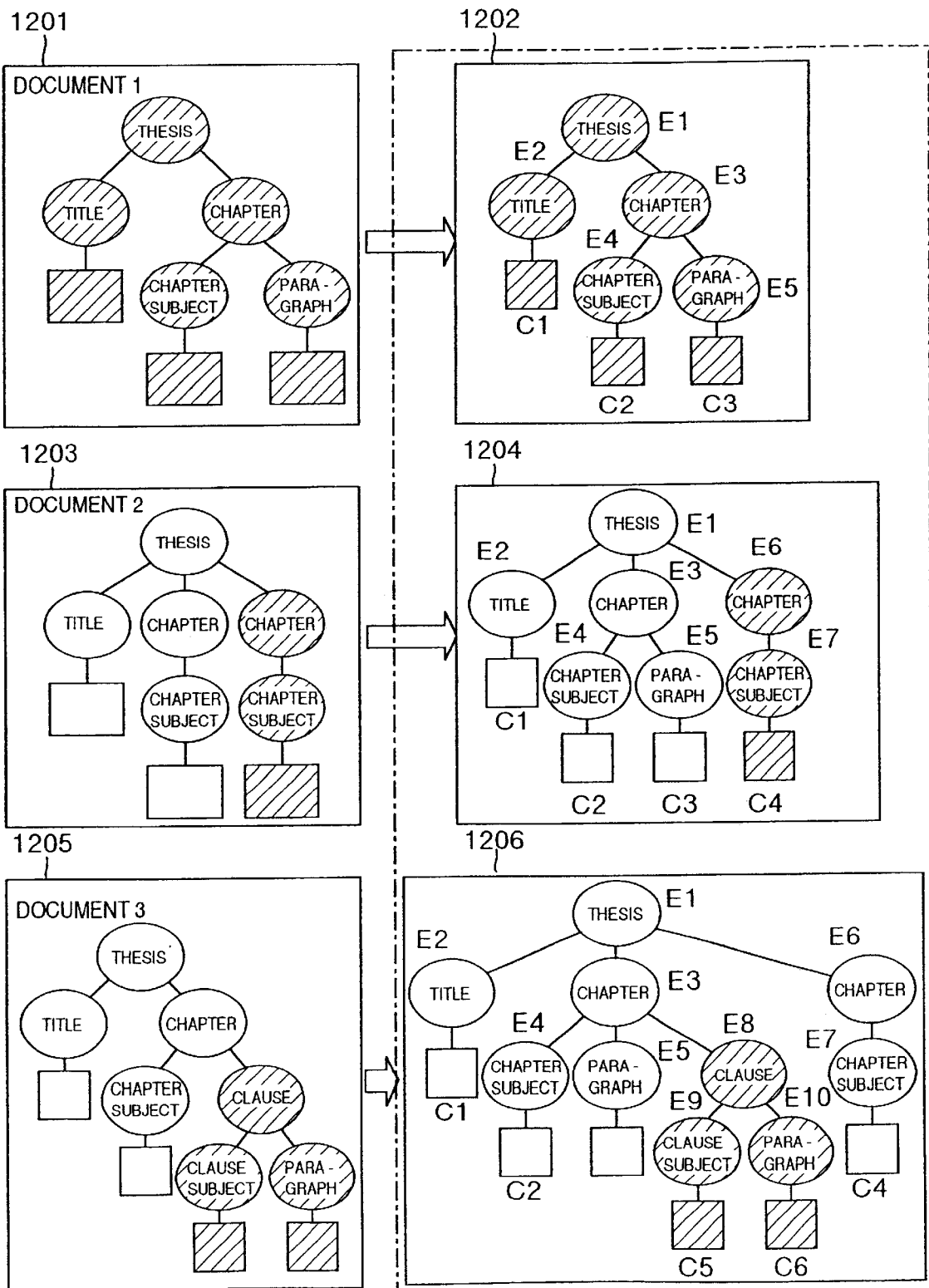
FIG. 12 is a diagram showing the process of generating a structure index according to the first embodiment of the invention.

Now, the process of generating a structure index by sequentially superposing a plurality of analyzed document data will be explained with reference to FIG. 12. In FIG. 12, numerals 1201, 1203 and 1205 designate analyzed document data for documents to be registered, respectively. The elements of these analyzed document data are sequentially superposed on the existing structure index thereby to form a structure index. Initially, the structure index is vacant. First, when the analyzed document data 1201 of the document I is input, therefore, a structure tree equivalent to the analyzed data is generated and directly registered in the structure index, so that the structure index assumes the state shown by 1202. The newly-generated meta elements are assigned context identifiers E1 to D5, while the newly-generated meta string data are assigned context identifiers C1 to C3, respectively.

When the analyzed document data 1203 of the document 2 is input, nothing is done with the part where the existing structure index (1202) is superposed, but only subelements (hatched portions in the drawing) lacking a corresponding part in the structure index 1202 are newly registered.

The meta elements newly generated are assigned the context identifiers E6 and E7, and the meta string data newly generated is assigned the context identifier C4. Then, when the analyzed document data 1205 of the document 3 is input, nothing is done with the portion where the structure thereof is superposed with the existing structure index 1204, but only the subelements (hatched portions in the drawing) lacking a corresponding part in the structure index 1204 are registered anew. The meta elements newly generated are assigned context identifiers E8, E9 and E10, and the meta string data newly generated are assigned context identifiers C5 and C6. In this way, with the three documents registered, the structure index assumes the state shown by 1206.

Figure 13:
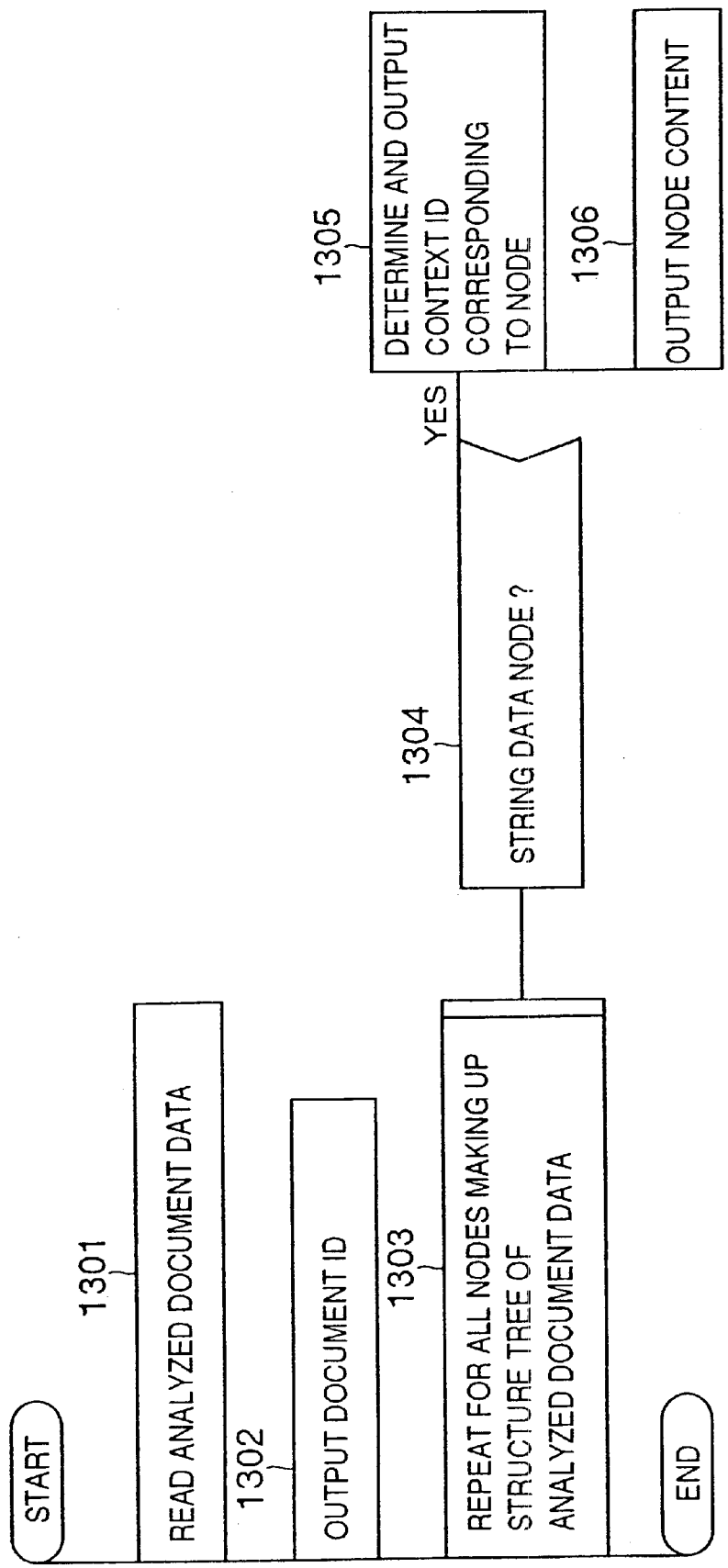
FIG. 13 is a diagram showing the steps of processing a structured full-text data generation program according to the first embodiment of the invention.

FIG. 13 is a PAD showing the detail of step 306 in FIG. 3, i.e. the steps of processing the structured full-text data generation program 212 according to this embodiment.

First in step 1301, the structured full-text data generation program 212 reads the analyzed document data of the document to be registered described above from the analyzed document data storage area 217.

In step 1302, the document identifier for identifying the document to be registered is output to the structured full-text data storage area 219.

Then, in step 1303, the process of steps 1304 to 1306 is repeated for all the nodes (element nodes and string data nodes) making up the structure tree of the analyzed document data.

In step 1304, it is determined whether a node currently closely watched in the analyzed document data is an element node or a string data node. Only in the case where the node is a string data node, the process proceeds to step 1305. In step 1305, a context identifier corresponding to the string data node current closely watched is acquired from the analyzed document data and output to the structured full-text data storage area 219. Then, in step 1306, the content of the string data node current closely watched is output to the structured full-text data storage area 219.

Upon complete repetition of step 1303 and subsequent steps, the process for this program is terminated.

FIG. 14 shows a file format of the structured full-text data output by the structured full-text data generation program 212. FIG. 14 illustrates the case in which the structured full-text data is generated with the SGML document of FIG. 5 as an input. As shown in FIG. 14, the data file of the structured full-text data according to this embodiment is so structured that a document identifier is described at the head, followed by the repetition of as many pairs of a context identifier and a corresponding content as the string data existing in the document.

For example, the document identifier of the document to be registered corresponding to the structured full-text data shown in FIG. 14 is "D1". In FIG. 5, the string data described as the content of the element "date" is assigned the context identifier "C5". In FIG. 14 and other figures, these identifiers are expressed by symbols. However, the value actually recorded in the data as a document identifier is the number (integer) for identifying a specific document uniquely in a mass of documents to be registered, and the value of a context identifier is the number (integer) for identifying a specific meta-node uniquely in a mass of meta-nodes making up the structure index.

Figure 15:
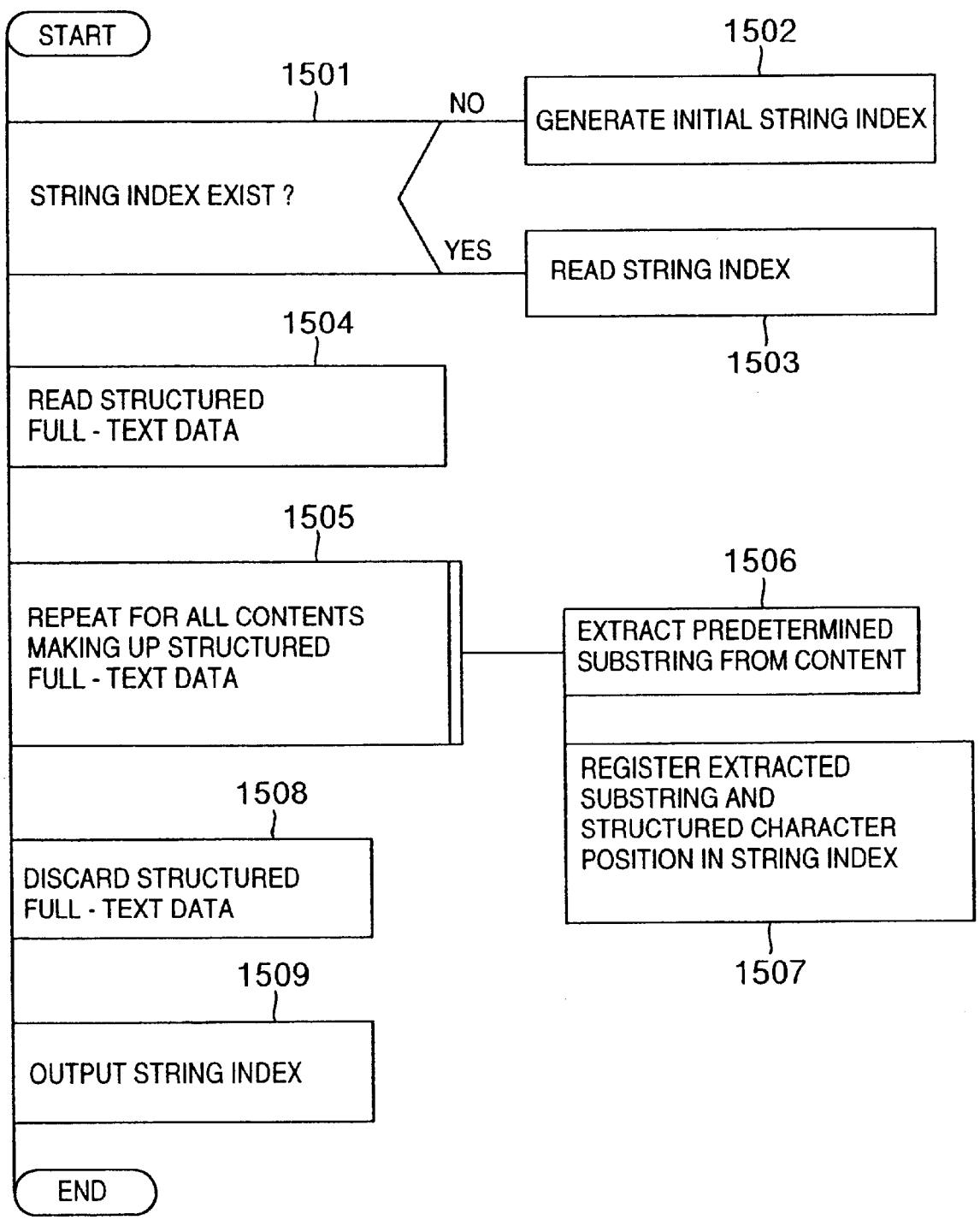
FIG. 15 is a PAD showing the steps of processing a string index generation program according to the first embodiment of the invention.

FIG. 15 is a PAD showing the detail of step 307 in FIG. 3, i.e. the steps of processing the string index generation program 213 according to this embodiment.

The string index generation program 213, first in step 1501, determines whether the existing string index is present in the string index storage area 220. In the case where the string index is not present in that area, the process proceeds to step 1502 and generates an initial (vacant) string index. In the case where the existing string index is detected, on the other hand, the process proceeds to step 1503 for reading the particular string index.

Then, in step 1504, the structured full-text data of the document to be registered is read from the structured full-text data storage area 219.

Then, in step 1505, the process of steps 1506 to 1507 is repeated for all the contents making up the structured full-text data.

In step 1506, a predetermined substring is extracted from the content currently closely watched in the structured full-text data. In step 1507, the correspondence between each substring extracted in step 1506 and the structured character position information of the substring is registered in the string index.

Upon complete repetition of step 1505 and subsequent steps, the process proceeds to step 1508, where the structured full-text data no longer required are deleted from the structured full-text data storage area 219 and discarded. Then, in step 1509, the updated string index is output and stored in the string index storage area 220, thus terminating the process.

In extracting a predetermined substring from a given content in step 1506, the length of the substring to be extracted is predetermined, and starting with the head of the content involved, the substrings of the predetermined length are sequentially extracted while at the same time incrementing the start position one by one. In the case where the length of the substring to be extracted is 2 characters and the content "変換処理の実例", which means "actual example of conversion process" in Japanese, corresponding to the context identifier C129 among a set of contents shown in FIG. 14 is used as an object of processing, for example, six substrings are extracted, including "変換", "換処", "処理", "理の", "の実", "実例".

Further, as for the tail of the content, each string having a length of one or more characters is extracted. In the example described above, "例" is extracted. In step 1507, these substrings are registered in the string index as a correspondence between each substring and the structured character position information indicating the position where the substring occurs. The structured character position information includes a document identifier of a document containing a corresponding substring, a context identifier for identifying the position of the string data containing the substring in the document structure, and the head character position of the substring in the document.

Figure 16:
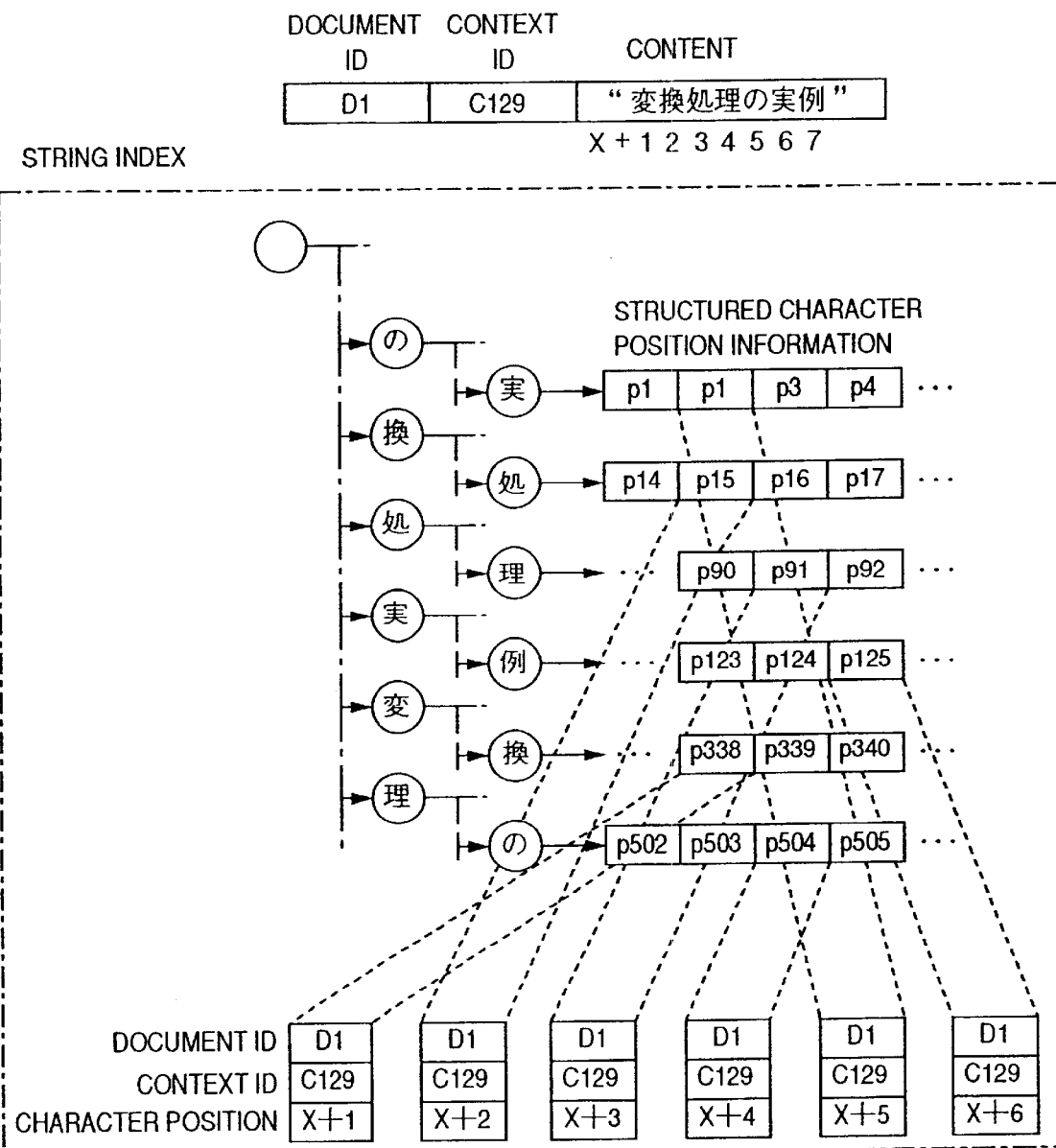
FIG. 16 is a diagram showing the data structure of a string index according to the first embodiment of the invention.

FIG. 16 shows a data structure of the string index according to this embodiment. FIG. 16 illustrates a part of the data structure (the portion associated with the content "変換処理の実例", actual example of conversion process)") of the string index as of the time when the structured full-text data shown in FIG. 14 is processed using the string index generation program 213 and when the substring set contained in the structured full-text data is registered in the string index. In FIG. 16, however, the character node corresponding to "例" at the tail of the content and the structured character position information are not shown. Also, the position of the character immediately before the content is expressed as a relative character position "X".

As shown in FIG. 16, the string index holds a list of the occurrence position information (the structured character position information including a combination of the document identifier, context identifier and the head character position) for all the substrings of a predetermined length occurring in the document to be registered. In order to increase the speed of index search, a data structure is employed in which a set of all substrings having the same first character share the first-character information. Also, the pointer to the first character from the root of the string index is arranged in the order of the code of the character indicated by the pointer. In similar fashion, the pointer from the first-character node to the second-character node is arranged in the order of the code of the character indicated by the pointer.

Once all the documents to be registered in the document data base are processed so that the set of substrings appearing therein are registered in the string index, then the position in the document where a string of given two characters (a method of searching for a string of other than two characters in length will be described later) appears can be determined simply by referring to the particular string index (without the need of scanning the document data proper at all).

According to this embodiment, the length of a substring is predetermined as two characters. Nevertheless, another length can be employed to construct a similar string index. Although the length of the substring is fixed according to this embodiment, a variable length can be used for constructing a similar string index.

The foregoing is the description of the document registration subsystem 101 according to this embodiment.

Now, an explanation will be given of the document search server according to this embodiment, i.e. the server 102 in FIG. 1.

Figure 17:
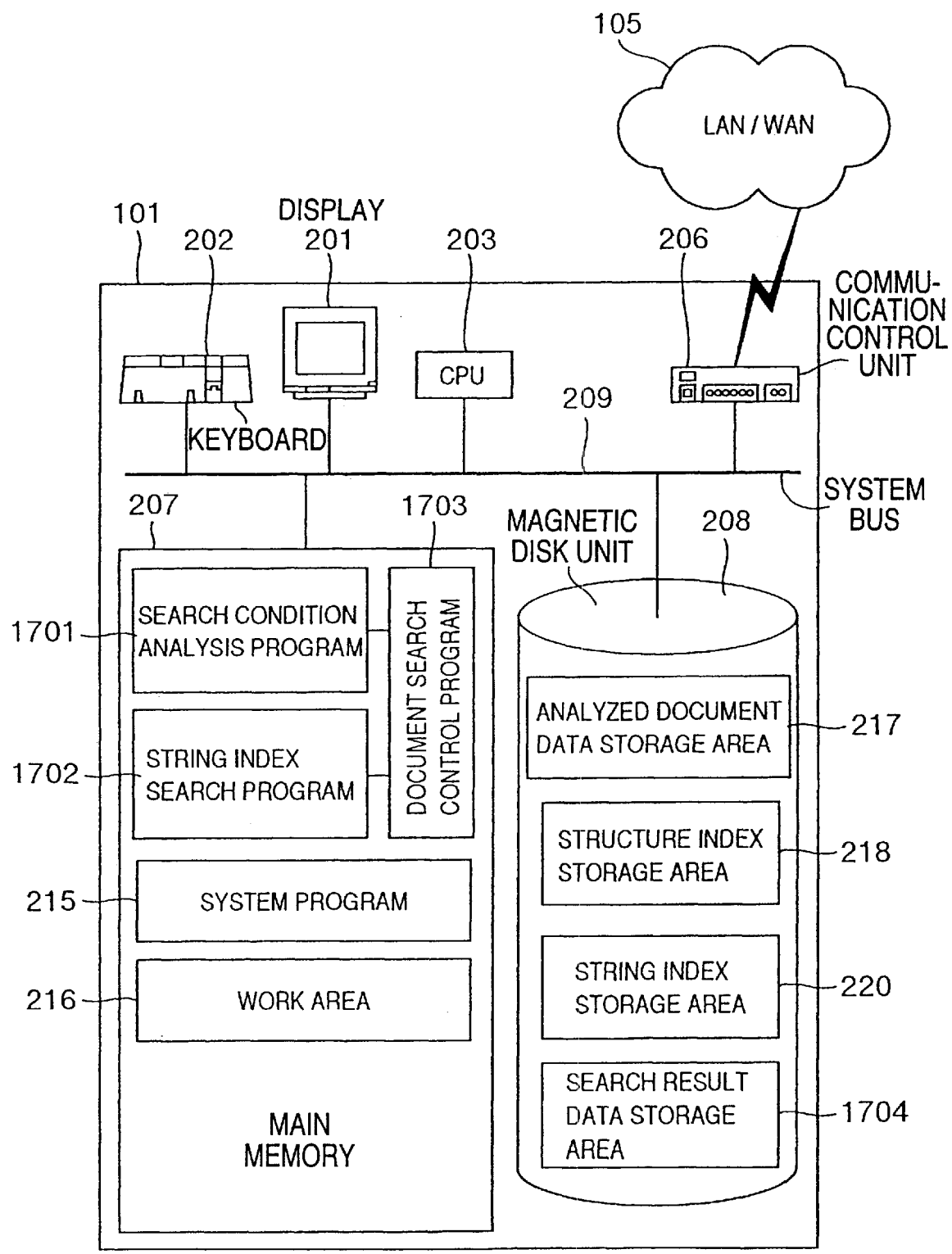
FIG. 17 is a diagram showing a configuration of a document search server according to the first embodiment of the invention.

FIG. 17 is a diagram showing a configuration of the document search server 102 according to this embodiment.

The document search server 102 shown in FIG. 17 includes a display 201, a keyboard 202, a central processing unit (CPU) 203, a communication control unit 206, a main memory 207, a magnetic disk unit 208 and a system bus 209.

The display 201 is used for displaying the operating situation of the server. The keyboard 202 is used for inputting commands for activation and deactivation of the server. The central processing unit 203 executes various programs making up the server. The communication control unit 206 is used for communication with the document registration subsystem 10 and the search clients 103 and 104 through the network 105 to exchange requests and data. The main memory 207 is used for holding various programs and temporary data for executing the process by the server. The magnetic disk unit 208 is used for storing a set of document data constituting the document data base and the index data referred to at the time of document search by the server. The system bus 209 is used for connecting these various units.

The main memory 207 holds therein a search condition analysis program 1701, a string index search program 1702, a document search control program 1703 and a system program 215. In addition, it holds a work area 216. The magnetic disk unit 208 secures therein an analyzed document data storage area 217, a structure index storage area 218, a string index storage area 220 and a search result data storage area 1704.

The search condition analysis program 1701 analyzes the search condition formula included in the search request received from the search clients 103, 104 and translates it into a condition specification that can be directly searched by the string index search program 1702. The string index search program 1702 search the string index stored in the string index storage area 220 in accordance with the condition specification translated by the search condition analysis program 1701, and stores the search result data thus obtained in the search result data storage area 1704.

The document search control program 1703 controls the activation and execution of the search condition analysis program 1701 and the string index search program 1702, while at the same time exchanging requests and data with the document registration subsystem 101 and the search clients 103, 104 through the network 105. The system program 215 provides the basic functions such as data input/output to and from the peripheral units for executing each program constituting the server in the computer. The work area 216 is used for storing data temporarily as required at the time of program execution.

According to this embodiment, the network 105 for is used for transferring data between the document search subsystem 101 and the search clients 103, 104. Alternatively, a configuration can be employed which uses a floppy disk, a magneto-optic disk, a write-once optical disk or the like portable medium. Also, a configuration is possible in which the document registration subsystem 101 and the document search server 102 are mounted on a single computer, and no data is transferred between them. Also, a configuration can be employed in which one or more search clients are executed by the same computer as the document search server 102, and no data is transferred between them.

Figure 18:
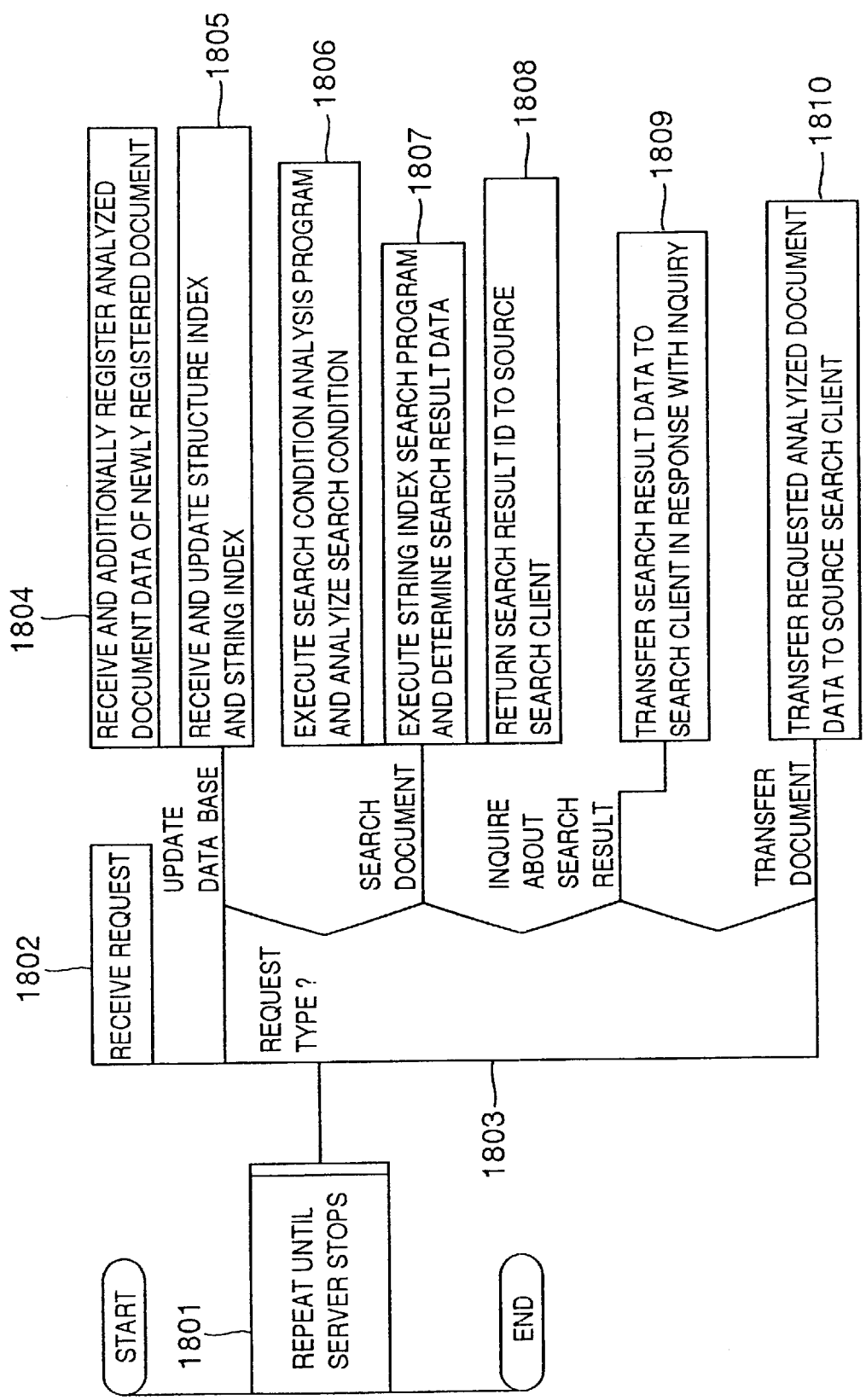
FIG. 18 is a PAD showing the steps of document search process according to the first embodiment of the invention.

FIG. 18 is a PAD briefly showing the steps of processing the document search according to the first embodiment of the invention. Upon activation of the document search control program 1703 in response to a server activation command from the keyboard 202, the program enters a loop in which as a server, it receives requests from the document registration subsystem 101 and the search clients 103, 104 and process them (step 1801). This loop continues until a command for deactivating the server is input from the keyboard 202.

The loop in step 1801 repeats the process (step 1802) for receiving requests from the document registration subsystem 101 and the search clients 103, 104 and the process (step 1803) for determining the type of the received requests and separating them into the processes corresponding to each type.

Step 1803 determines the type of the received requests, and in the case where a request is a data base update request (a request to register a new set of documents and update the document data base) transmitted from the document registration subsystem 101, the process branches into steps 1804 and 1805.

In the case where the request is a document search request (a request to search for a set of documents meeting a specific search condition) transmitted from the search clients 103, 104, on the other hand, the process branches into steps 1806, 1807 and 1808. Also, in the case where the request is an inquiry about the search result (a request to inquire about the result of a specific search process) transmitted from the search clients 103, 104, the process branches into step 1809. Further, in the case where the request is a document transfer request (a request to transfer a specified document data) transmitted from the search clients 103, 104, the process branches into step 1810. Upon complete processing at the destination of branching, the process returns to step 1802 to continue the loop.

In step 1804, the analyzed document data of a set of newly registered documents are received from the document registration subsystem 101, and added to the analyzed document data storage area 216. Then, in step 1805, the structure index and the string index updated in a manner to reflect the content of the newly-registered document set are received from the document registration subsystem 101 and stored in the structure index storage area 218 and the string index storage area 220, respectively.

In step 1806, the search condition analysis program 1701 is executed, and the search condition specified in the document search request is analyzed and converted into a condition specification (hereinafter referred to as the expanded search condition data) that can be directly processed by the string index search program 1702. Then, in step 1807, the string index search program 1702 is executed in response to an input of the expanded search condition data generated in step 1806, and the document set meeting the condition specified by the expanded search condition data is searched to determine the search result data. The search result data are stored in the search result data storage area 1704 in a manner corresponding to the search result identifier for identifying the search result data uniquely. Next, in step 1808, the search result identifier is returned to the search client constituting a request source.

In step 1809, a part or the whole of the search result data acquired in step 1807 is extracted from the search result data storage area 1704 in accordance with the content of the query and transferred to the search client constituting the request source.

In step 1810, the analyzed document data of the documents (all the plural specified documents, if any) specified in the document transfer request are extracted from the analyzed document data storage area 217 and transferred to the search client constituting the request source.

Figure 19:
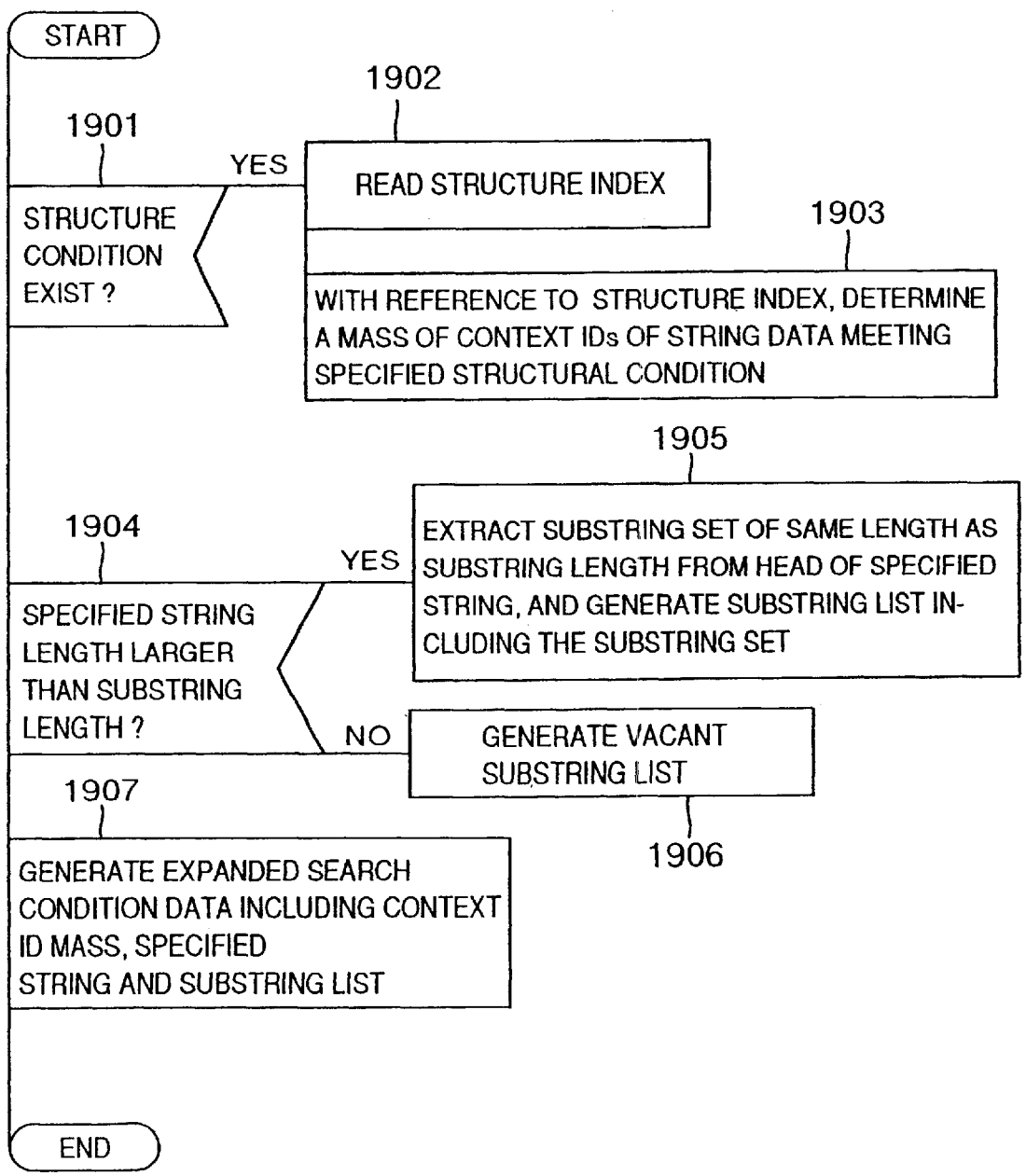
FIG. 19 is a PAD showing the steps of processing in the search condition analysis program according to the first embodiment of the invention.

FIG. 19 is a PAD showing the detail of step 1806 in FIG. 18, i.e. the steps of processing in the search condition analysis program 1701 according to this embodiment.

The search condition analysis program 1701, upon activation thereof in response to an input thereof including the search condition specified in the document search request, first determines, in step 1901, whether the structural condition is included in the search condition or not. Only in the case where the structural condition is so included, the process including steps 1902 and 1903 is executed. Unless the structural condition is so included, on the other hand, the process proceeds to step 1904.

In step 1902, the structure index is read from the structure index storage area 218. In step 1903, a mass of context identifiers of all the string data included in the structure meeting the structural condition are determined with reference to the structure index. The mass is hereinafter called the context identifier mass.

In step 1904, it is determined whether the length of the string specified as a string condition in the search condition exceeds the length of the substring predetermined at the time of generating the string index. In the case where the length of the specified string exceeds the substring length, the process proceeds to step 1905, where the start character position is incremented one by one from the head of the specified string, and a set of substrings having the same length as the substring length is extracted, so that a substring list including these substrings as elements is generated. In the case where the length of the specified string does not exceed the substring length, on the other hand, the process proceeds to step 1906 for generating a vacant (lacking elements) substring list.

In step 1907, an expanded substring data including the context identifier mass obtained in step 1903, the specified string included in the query and the substring list generated in step 1905 or 1906 is generated and the process is terminated.

Figure 20:
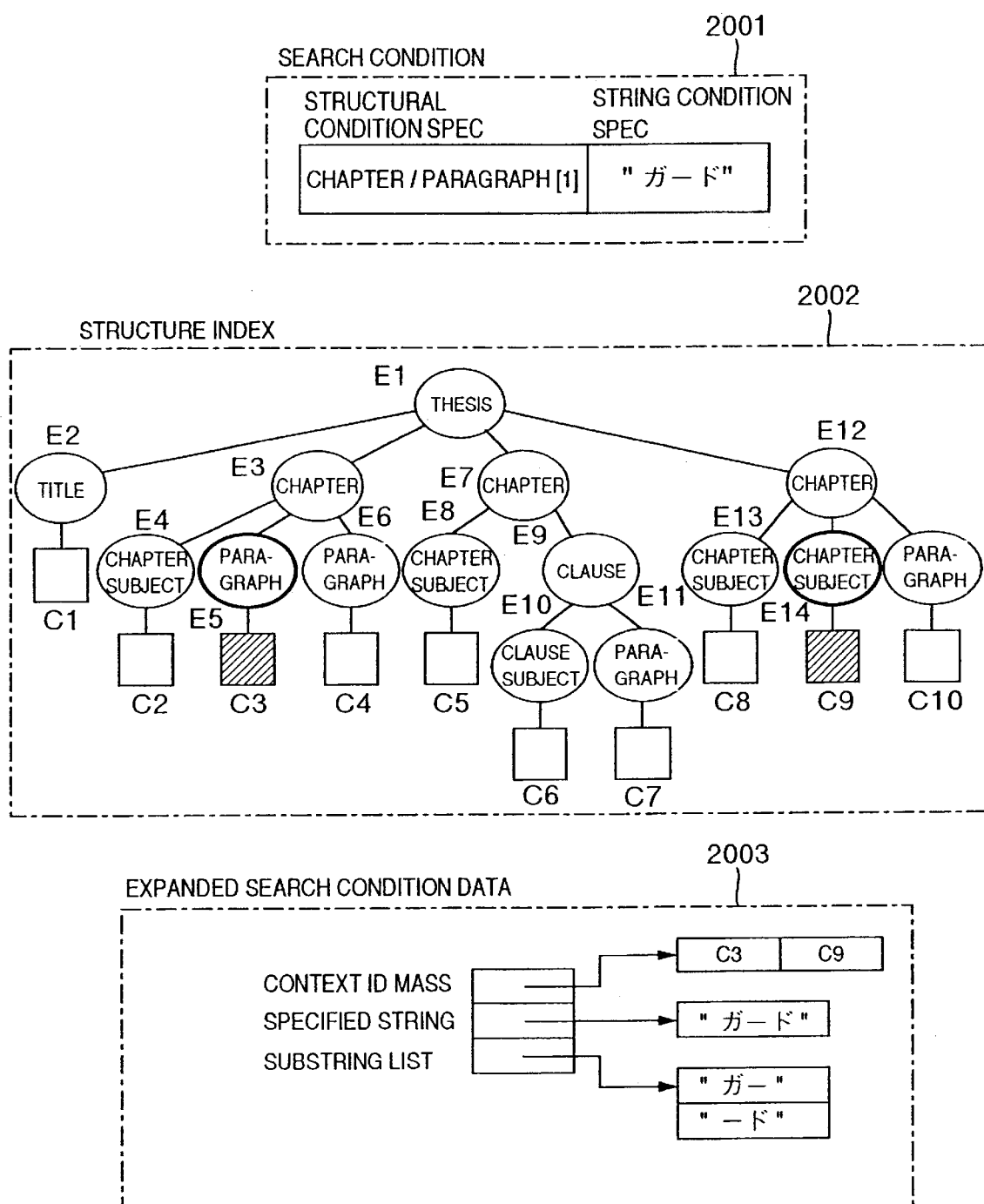
FIG. 20 is a diagram an example of generating an expanded search condition data according to the first embodiment of the invention.

FIG. 20 is a diagram showing an example of generating the expanded search condition data in processing the search condition analysis program 1701.

In FIG. 20, numeral 2001 designates an example of search condition specified in the document search request. The search condition 2001 is configured of the structural condition specification "chapter/paragraph[1]" and the string condition specification "ガード" which is Japanese expression of "guard". The search condition specifies the requirement to search for a case in which the string "ガード" appears in the first "paragraph" element immediately under the "chapter" element.

Assume that the content of the structure index is as shown by 2002. In step 1903, the context identifiers of the "paragraph" element meeting the structural condition specification are seen to be E5 and E14 by reference to the structure index. As a result, it is known that a case should be searched for in which the string "ガード" occurs in the string data underlying these paragraphs, i.e. in the string data with the context identifier C3 or C9. In view of the fact that the position of occurrence is registered only for the substrings having the length of 2 in the string index used for search, however, the specified string having three characters cannot be searched directly. In step 1905, therefore, a list of substrings of length 2 is generated by decomposing the specified string. In the case where the specified string is "ガード" as described above, for example, the extracted substrings are "ガー" and "ード".

As a result, in step 1907, the expanded search condition data shown by 2003, i.e. the data having the context identifier mass {C3, C9}, the specified string of "ガード" and the substring list of "ガー" and "ード" are generated.

Figure 21:
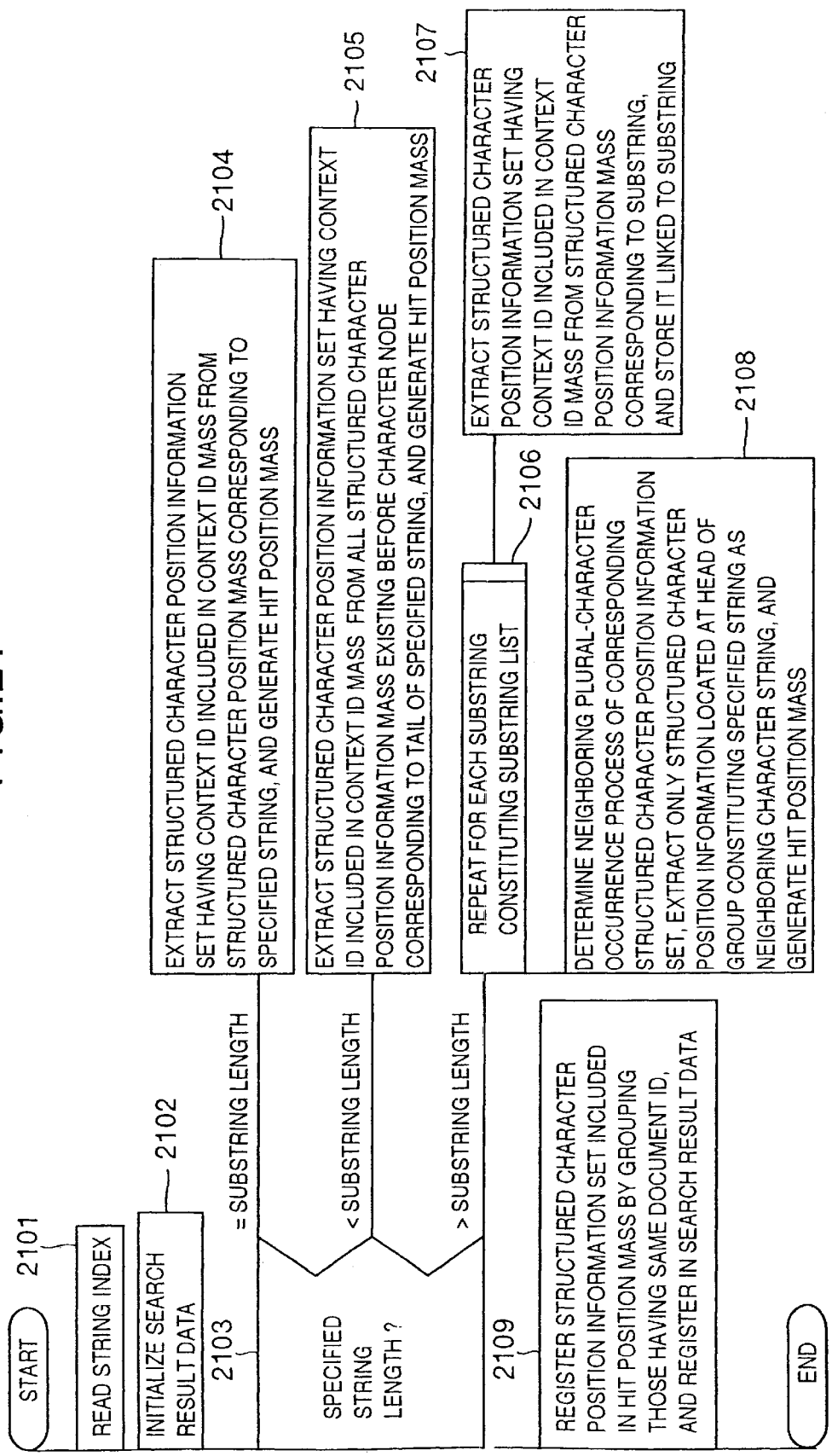
FIG. 21 is a PAD showing the steps of processing a string index search program according to the first embodiment of the invention.

FIG. 21 is a PAD showing the detail of step 1807 in FIG. 18, i.e. the steps of processing the string index search program 1702 according to this embodiment.

The string index search program 1702 is activated in response to an input of the expanded search condition data generated by the search condition analysis program 1701. This program, upon activation thereof, first reads the string index from the string index storage area 220. Then, the process proceeds to step 2102 for initializing the search result data.

Then, in step 2103, the length of the specified string included in the expanded search condition data is compared with the length of the substring predetermined at the time of generating the string index. In the case where the length of the specified string is equal to the length of the substring, the process proceeds to step 2104. In the case where the length of the specified string is shorter than the length of the substring, the process proceeds to step 2105. In the case where the length of the specified string exceeds the length of the substring, on the other hand, the process branches to step 2106.

In step 2104, the specified string is searched for in the string index to determine a mass of the structured character positions corresponding to the string. Then, only a set of structured character position information having any one of the context identifiers contained in the context identifier mass in the expanded search condition data is extracted thereby to generate a mass of hit positions including the extracted set of the structured character information.

In step 2105, the string index is searched for the specified string, and a mass of all the structured character position information existing before the character node corresponding to the tail end of the string is acquired, and only the mass of structured character position information having any one of the context identifiers included in the context identifier mass in the expanded search condition data is extracted thereby to generate a mass of hit positions including the extracted mass of structured character position information.

In step 2106, the process of step 2107 is repeated for each substring configuring the substring list in the expanded search condition data. In step 2107, the string index is searched for the substring, a mass of the structured character position information corresponding to the string is acquired, and only a set of structured character position information having any one of the context identifiers included in the context identifier mass in the expanded search condition data is extracted, and the extracted set of the structured character position information are stored in a manner corresponding to the substring.

Upon complete repetition in step 2106, the process proceeds to step 2108, where the neighboring plural-character occurrence is determined for the set of the structured character position information stored in at corresponding positions in step 2107, and only the set of the structured character position information constituting the specified string is extracted as a neighboring string. Also, in each set thus extracted, only the structured character position information corresponding to the substring located at the head of the specified string is extracted, and a mass of hit positions is generated from the extracted set of the structured character position information.

Upon complete processing of all the steps branching from step 2103, the process proceeds to step 2109 where a set of structured character position information included in the mass of hit positions are grouped into a set having the same document identifier and registered in the search result data.

Now, step 2108, i.e. the processing of determining a neighboring plural-character occurrence in the process of the string index search program 1702 will be explained in more detail with reference to FIG. 22.

Figure 22:
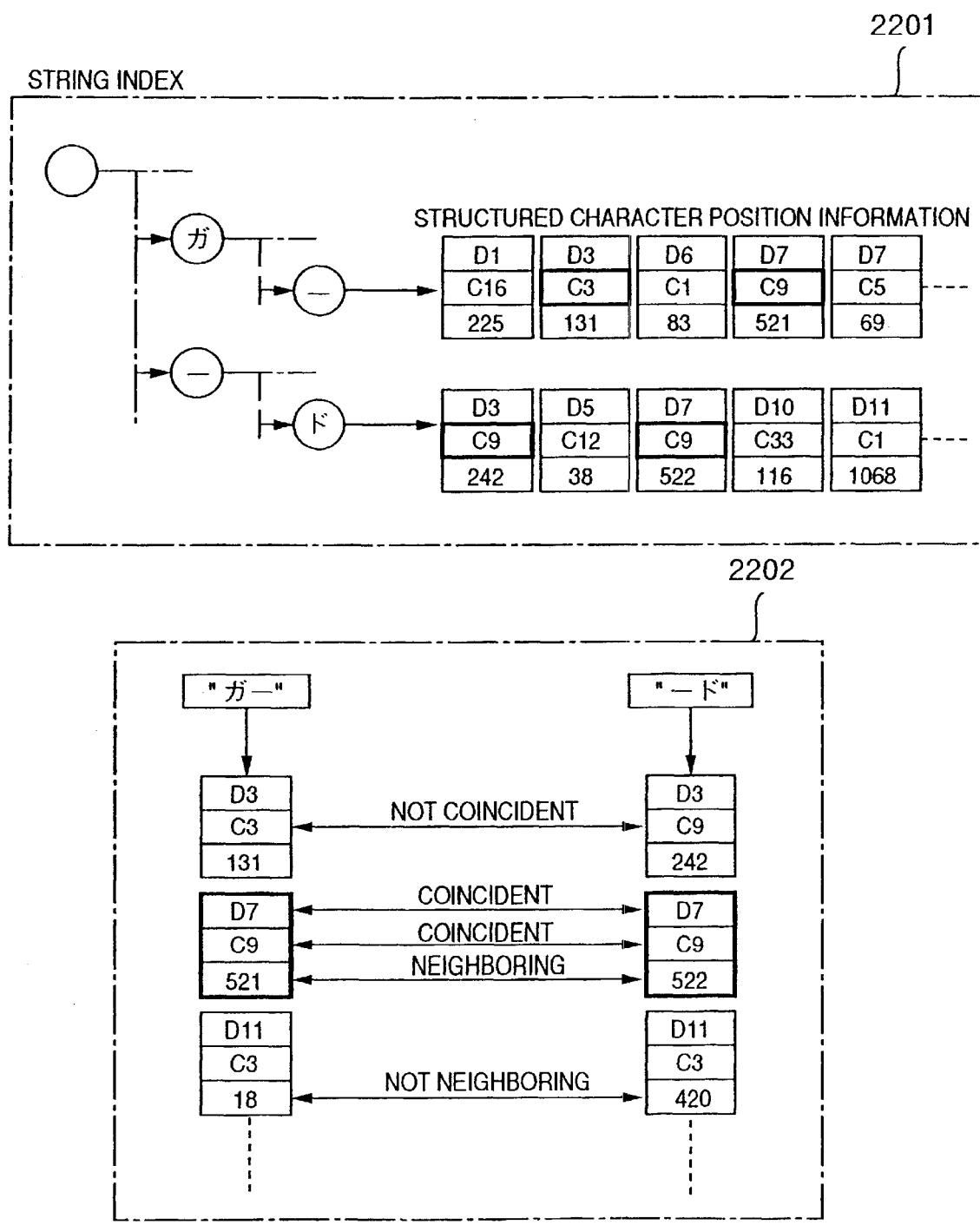
FIG. 22 is a diagram showing an example of execution of the neighboring plural-character occurrence determination process according to the first embodiment of the invention.

In FIG. 22, numeral 2201 designates an example (a part) of the string index. The string index holding the data shown in 2201 is searched according to the condition indicated by the expanded search condition data 2003 in FIG. 20. As shown in step 2107, first, only the structured character position information having a context identifier C3 or C9 are extracted from those corresponding to the substrings "ガー" and "ード". The data corresponding to extracted set of the structured character position information stored at positions corresponding to the substring are shown in 2202. The neighboring plural-character occurrence is determined based on this data.

In the process of determining the neighboring plural-character occurrence of step 2108, it is determined whether there exists a combination of the structured character position information constituting the specified string in the extracted structured character position information as a whole. Such a combination is required to meet the following conditions:

(1) All the document identifiers coincide among the sets of structured character position information.
(2) All the context identifiers coincide among the sets of structured character position information.
(3) By arranging the structured character position information in the ascending order of character position value and arranging the corresponding substring sets according to the string positions, a string equal to the specified string is obtained as a whole.

The cases shown by 2202 include a combination which constitutes the specified string "ガード" as a whole.

Once a combination of the structured character position information meeting the above-mentioned condition is found, the structured character information with a smallest character position value is selected as a representative of the structured character information set included in the combination and registered in the mass of hit positions.

Figure 23:
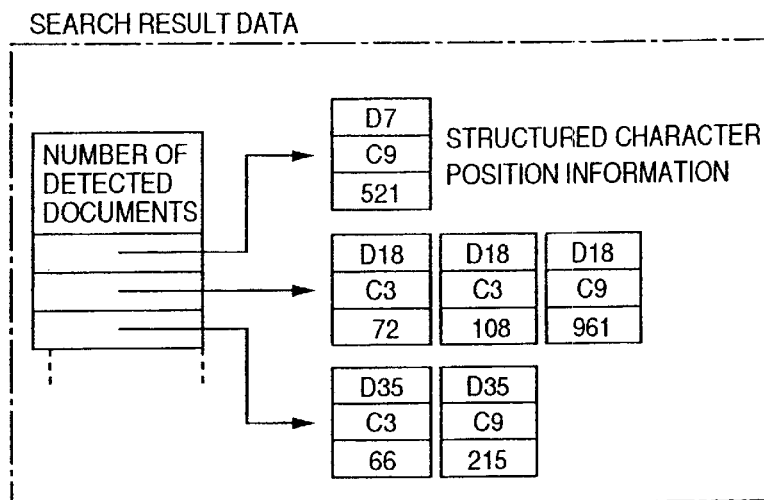
FIG. 23 is a diagram showing a data structure of the search result data according to the first embodiment of the invention.

FIG. 23 is a diagram showing a data structure of the search result data generated as a result of individual search process. As shown in FIG. 23, the search result data has such a configuration that the character position information set included in the mass of hit positions is divided into groups by document identifier, a list with the group as an element is generated, and information indicating the total number of detected documents is added. The search result data are set at positions corresponding to the search result identifiers for identifying the search result data uniquely in the mass of the search result data, and stored in the search result data storage area 1704.

Figure 24:
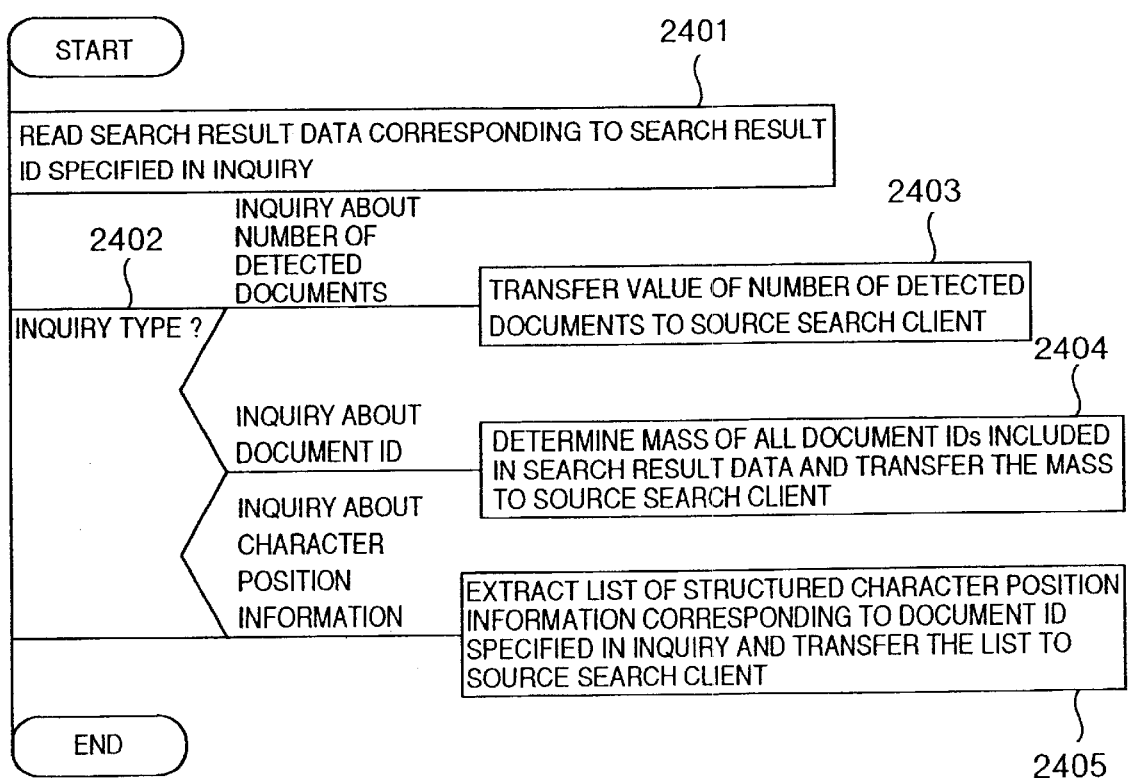
FIG. 24 is a PAD showing the detailed steps of processing the search result data transfer according to the first embodiment of the invention.

Then, step 1809 of FIG. 18, i.e. the process of transferring the search result corresponding to the content of the inquiry about the search result to the source client will be explained in more detail with reference to FIG. 24. FIG. 24 is a PAD showing the process of step 1809 in detail.

The body of the search result inquiry is composed of three parts including a search result identifier specification, an inquiry type specification and a document identifier specification. Some type of inquiry may have no document identifier specification.

As shown in FIG. 24, the process corresponding to step 1809 first includes step 2401 in which the search result data corresponding to the search result identifier specified in the inquiry is searched, and the search result data is read from the search result data storage area 1704.

Next, in step 2402, the inquiry type is determined, and in the case where the inquiry type is the inquiry about the number of detected documents, the process branches to step 2403. In the case where the inquiry type is the document identifier inquiry, the process branches to step 2404, and in the case where the inquiry type is the character position information inquiry, the process branches to step 2405.

In step 2403, the number of detected documents is extracted from the search result data read in step 2401, and the value of the number of detected documents is transferred to the source search client, thereby terminating the process.

In step 2404, the mass of all document IDs included in the search result data read in step 2401 is obtained, and the mass is transferred to the source search client, thereby terminating the process.

In step 2405, a list of the structured character position information corresponding to the document identifier designated in the inquiry is extracted from the search result data read in step 2401, and the list is transferred to the source search client, thereby terminating the process.

The foregoing is the description of the document search server 102 according to this embodiment.

Now, an explanation will be given of the document search client according to the first embodiment of the invention, i.e., the component parts 103 and 104 in FIG. 1.

Figure 25:
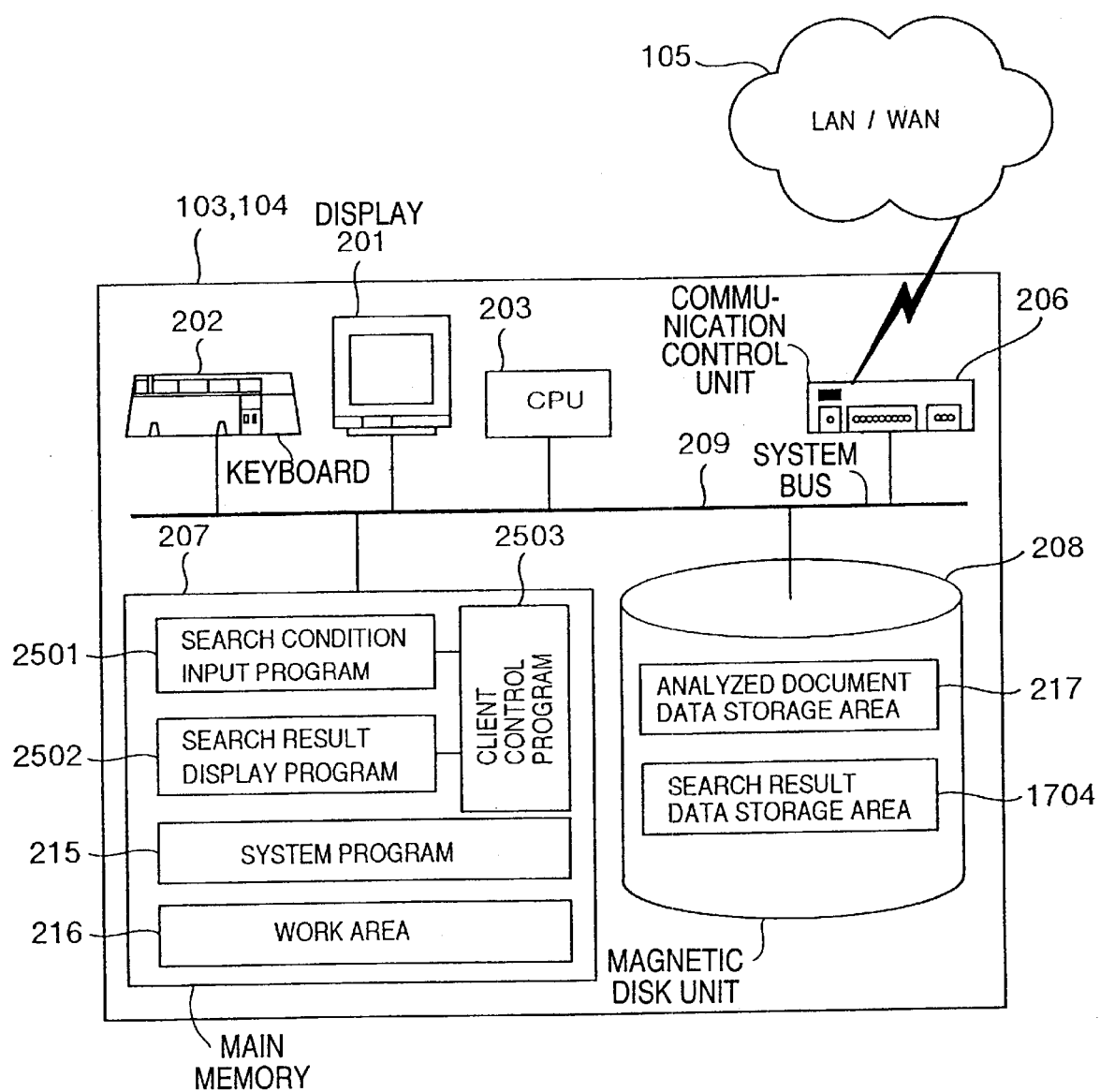
FIG. 25 is a diagram showing a configuration of a document search client according to the first embodiment of the invention.

The document search client shown in FIG. 25 is configured of a display 201, a keyboard 202, a central processing unit (CPU) 203, a communication control unit 206, a main memory 207, a magnetic disk unit 208 and a system bus 209.

The display 201 is used for displaying the screen by way of which the user inputs the search condition interactively, and also for displaying the search result, etc. The keyboard 202 is used for inputting a command for executing a search condition, a search process, etc. The central processing unit 203 executes various programs configuring the client. The communication control unit 206 is used for communicating with the document search server 102 through the network 105 and exchanging requests and data. The main memory 207 is used for holding various programs and temporary data with which the client executes the process. The magnetic disk unit 208 is used for storing the documents obtained as a result of search and other data. The system bus 209 is used for connecting the various units mentioned above.

The main memory 207 holds therein a query input program 2501, a search result display program 2502, a client control program 2503, a system program 215 and a work area 216. An analyzed document data storage area 217 and a search result data storage area 1704 are secured in the magnetic disk unit 208.

The search condition input program 2501 inputs and interprets the search condition interactively with the user. The search result display program 2502 displays the search result received from the document search server 102. The client control program 2503 controls the activation and execution of the search condition input program 2501 and the search result display program 2502, while at the same time exchanging requests and data with the document search server 102 through the network 105. The system program 215 provides basic functions such as input/output to and from the peripheral units for executing each program configuring the client in the computer. The work area 216 is used for storing the data temporarily required for program execution.

According to this embodiment, the network 105 is used for transferring data with the document search server 102. As an alternative, a floppy disk, a magneto-optic disk, a write-once optical disk or the like portable medium can be used. Also, one or more search clients can be executed on the same computer as the document search server 102 without data transfer between them. It is also possible to connect a printer to this client to print the search result.

Figure 26:
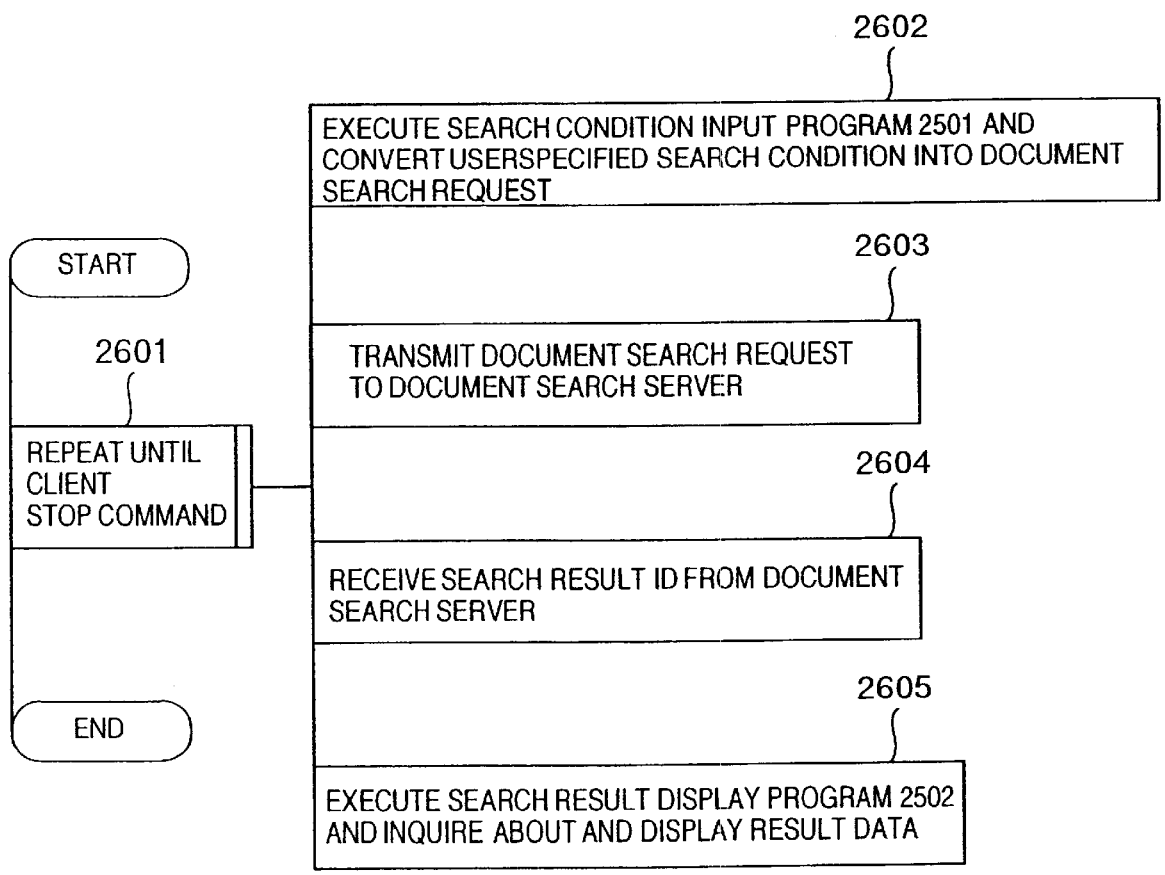
FIG. 26 is a PAD showing the steps of operation of a search client according to the first embodiment of the invention.

FIG. 26 is a PAD showing the steps of operation of the search client according to the first embodiment of the invention. The client control program 2503 is activated by a client activation command or the like entered from the keyboard 202. Then, the program receives a document search command from the user and enters a loop for processing it (step 2601). This loop continues until a deactivation command is input from the client by way of the keyboard 202.

The loop of step 2601 repeats the process shown in steps 2602 to 2605.

In step 2602, the search condition input program 2501 is executed. The search condition is input interactively with the user and the search condition is converted into a document search request that can be interpreted by the document search server 102. In step 2603, the document search request is transmitted through the network 105 to the document search server 102. In step 2604, the search result identifier is returned to and received in response to the document search request by the document search server 102.

In step 2605, the search result display program 2502 is executed in response to the search result identifier as an input, while at the same time making an inquiry and displaying the search result on the screen interactively.

Figure 27:
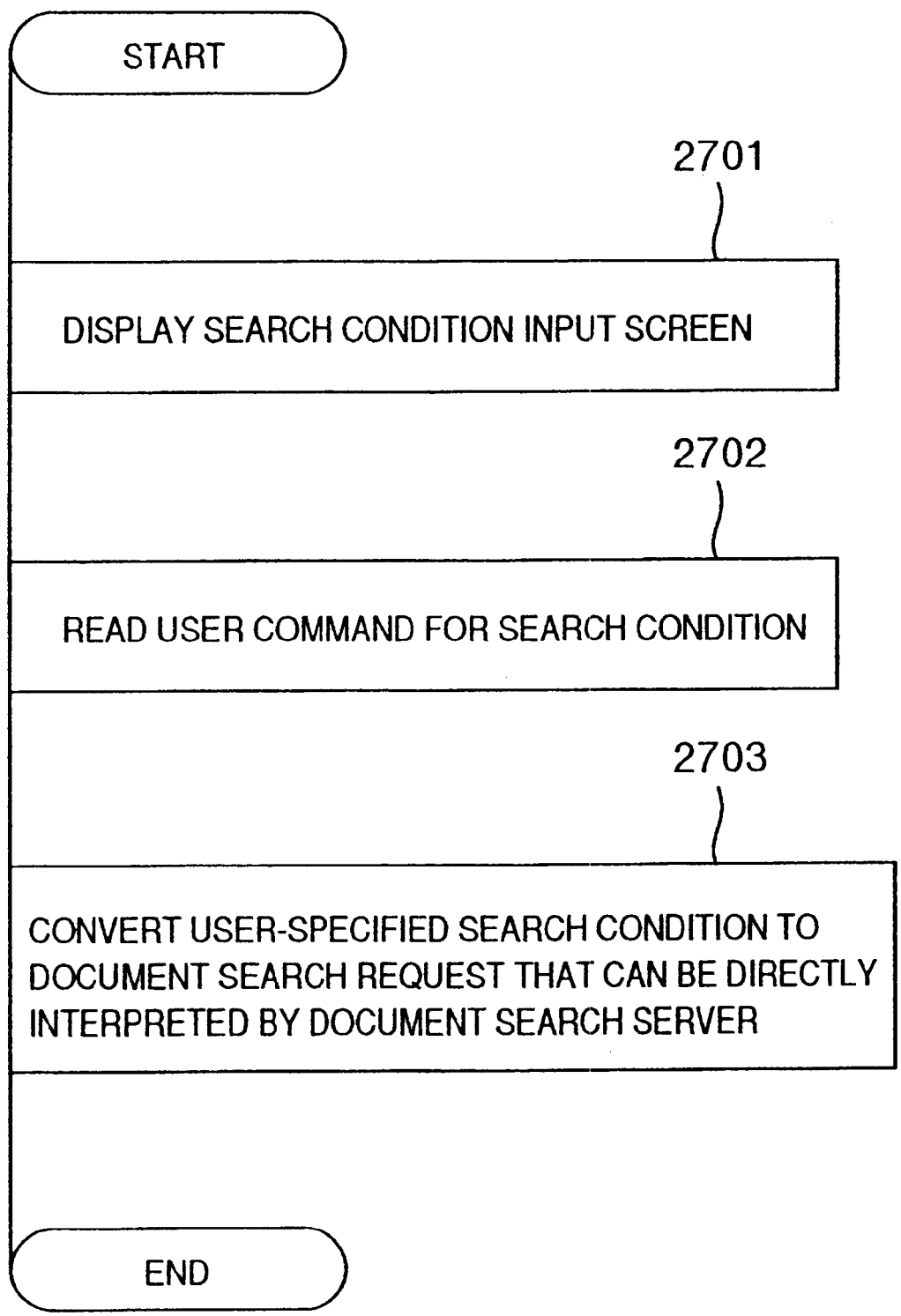
FIG. 27 is a PAD showing the steps of processing a query input program according to the first embodiment of the invention.

FIG. 27 is a PAD showing the detailed steps of processing the search condition input program 2501 executed in step 2602 in FIG. 26. The search condition input program 2501, once activated from the client control program 2503, displays on the display 201 a screen for the user to specify the search condition interactively (step 2701).

Next, in step 2702, the search condition specified by the user on the screen is read. Then, in step 2703, the search condition read in step 2702 is transformed into the form of the document search request that can be directly interpreted by the document search server 102.

Figure 28:
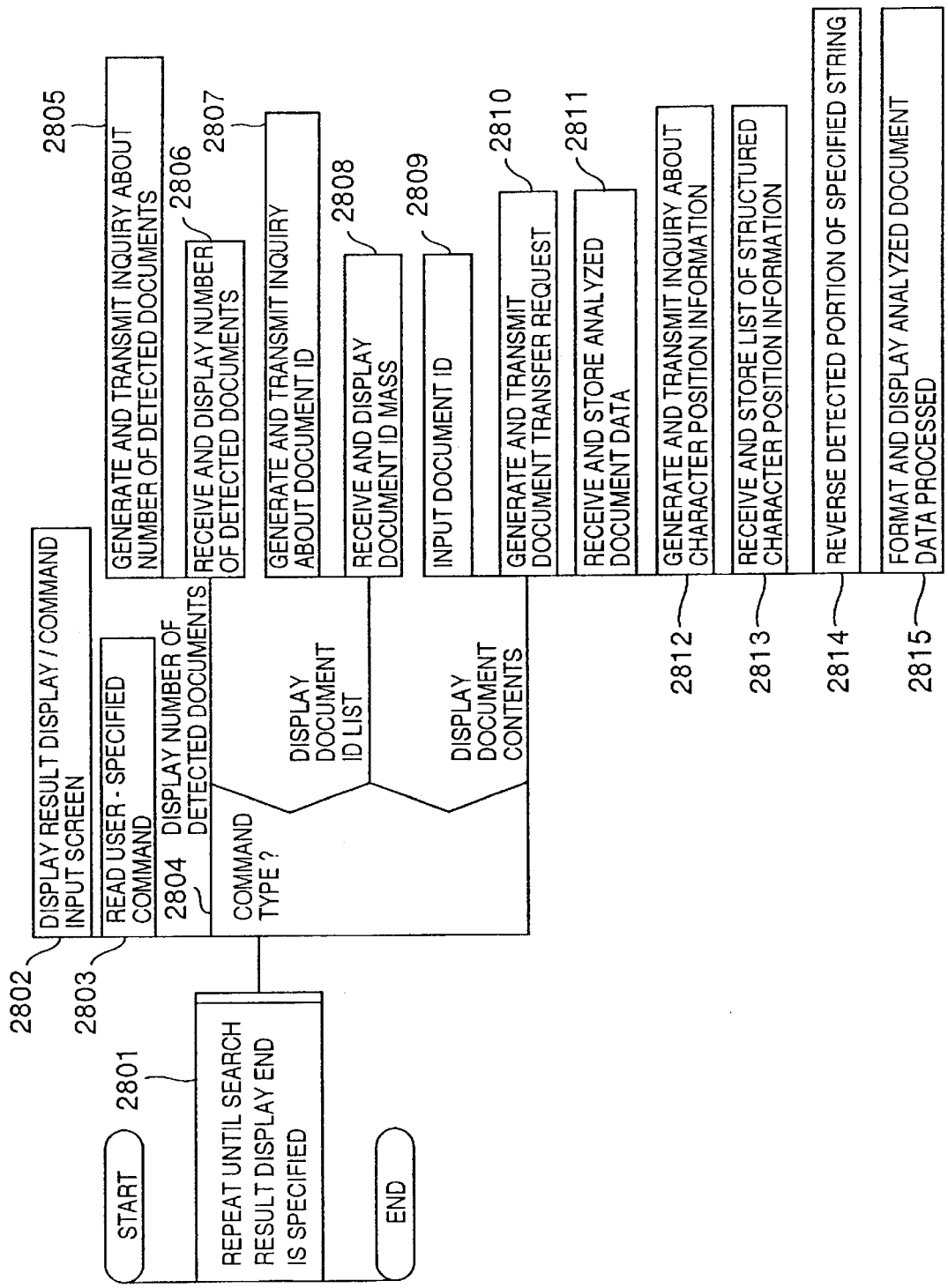
FIG. 28 is a PAD showing the steps of processing a search result display program according to the first embodiment of the invention.

FIG. 28 is a PAD showing the detailed steps of processing the search result display program 2502 executed in step 2605 of FIG. 26. The search result display program 2502, once activated in response to the search result identifier from the client control program 2503, immediately enters the loop of step 2801. This loop repeatedly executes the process shown in steps 2802 to 2815 until a command for terminating the display of the search result is received from the user.

In the loop of step 2801, which starts with step 2802, a screen used for displaying the search result and the command input from the user is displayed on the display 201. Then, in step 2803, the content specified by the user on the screen is read.

In step 2804, the type specified by the user is determined, and the process proceeds to a step corresponding to the particular type. Specifically, in the case where the command is for requesting the display of the number of detected documents, the process proceeds to steps 2805 and 2806. In the case where the command is for requesting the display of a document identifier list of a set of detected documents, on the other hand, the process proceeds to steps 2807 and 2808. In the case where the commands is for requesting the display of the content of the document, the process proceeds to steps 2809 to 2815. Upon complete processing of these steps, the process returns to step 2802 thereby to resume the loop.

In step 2805, a number-of-detected-documents inquiry list is generated for inquiring about the number of detected documents and transmitted to the document search server 102. Then, in step 2806, the number of detected documents transferred from the document search server 102 in response to the request is received and displayed on the display unit 201.

In step 2807, a document identifier inquiry list for inquiring about the document identifier list of the detected document set is generated, and the inquiry is transmitted to the document search server 102. Then, in step 2802, a mass of the document identifiers transferred from the document search server 102 in response to the inquiry is received and the document identifier set included in the mass is displayed as a list on the display unit 201.

In step 2809, the document identifier for specifying the document to be displayed is input. Then, in step 2810, a document transfer request is generated for acquiring analyzed document data for the document to be identified by the identifier, and transmitted to the document search server 102. Then, in step 2811, the analyzed document data transferred from the document search server 102 in response to the request is received, and stored in the analyzed document data storage area 217.

In step 2812, a character position information inquiry is generated for inquiring about the position where a string specified in the search condition is detected in the analyzed document data, which inquiry is transmitted to the document search server 102. Then, in step 2813, the list of the structured character position information transferred from the document search server 102 in response to the search condition is received and stored in the search result data storage area 1704.

In step 2814, the data are processed for reversed display of the specified string detected at the time of document search, with reference to the analyzed document data received in step 2811 and the structured character position information list received in step 2813. In step 2815, the analyzed document data thus reversed is formatted and displayed on the display unit 201.

The foregoing is the description of the operating steps performed on the part of the search clients 103 and 104 according to the first embodiment of the invention.

(2) Second Embodiment

Now, a second embodiment of the present invention will be explained with reference to the drawings.

Figure 29:
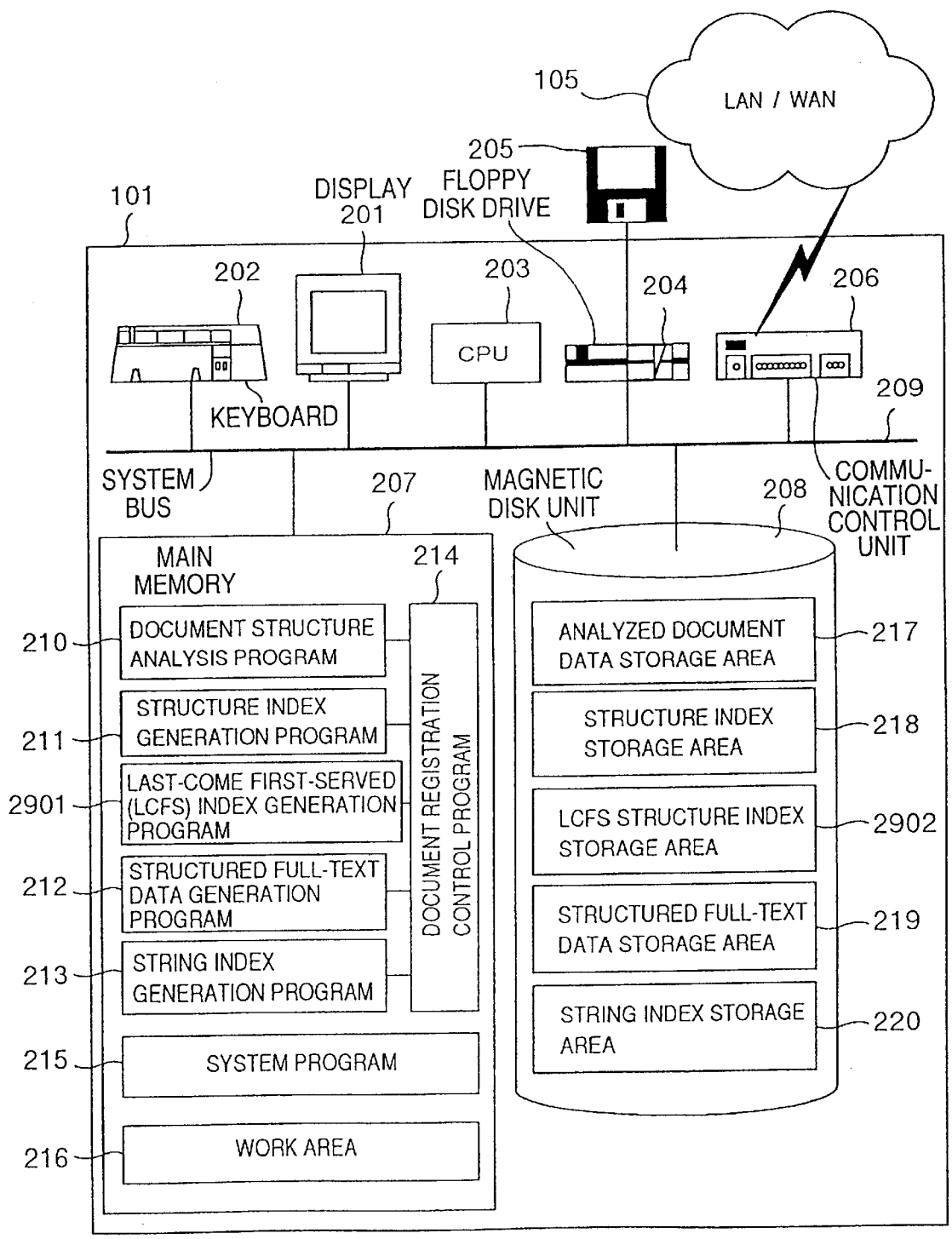
FIG. 29 is a diagram showing a configuration of a document registration subsystem according to a second embodiment of the invention.

FIG. 29 is a diagram showing a configuration of a document registration subsystem 101 according to this embodiment.

The document registration subsystem 101 shown in FIG. 29 has the same hardware configuration as the corresponding subsystem in the first embodiment shown in FIG. 2. The main memory 207, however, in addition to the program set held in the first embodiment, holds a last-come first-served structure index generation program 2901. Also, a last-come first-served structure index storage area 2902 is secured in the magnetic disk unit 208 in addition to the area set secured in the first embodiment. The last-come first-served structure index generation program 2901 is such that the information on the logic structure held in the analyzed document data of the document to be registered is registered in the last-come first-served structure index stored in the last-come first-served structure index storage area 2902 thereby to update the last-come first-served structure index.

According to this embodiment, the document registration control program 214 controls the activation and execution of the document structure analysis program 210, the structure index generation program 211, the last-come first-served structure index generation program 2901, the structured full-text data generation program 212 and the string index generation program 213, while at the same time transferring the analyzed document data, the structure index, the last-come first-served structure index and the string index generated by these programs to the document search server 102 through the network 105.

This embodiment is configured to read the document to be registered stored in the floppy disk 205 as an input. Alternatively, a configuration is possible to read from a magneto-optic disk, a write-once optical disk or the like portable medium. It is also possible to employ a configuration in which the document transferred by way of the network 105 is input. Further, according to this embodiment, the network 105 is used for transferring the analyzed document data, the structure index, the last-come first-served structure index and the string index to the document search server 102. As an alternative, a configuration is possible to employ a portable medium such as a floppy disk, a magneto-optic disk or a write-once optical disk. As another alternative, the document registration subsystem 101 and the document search server 102 can be mounted on a single computer, thus eliminating the data transfer.

Figure 30:
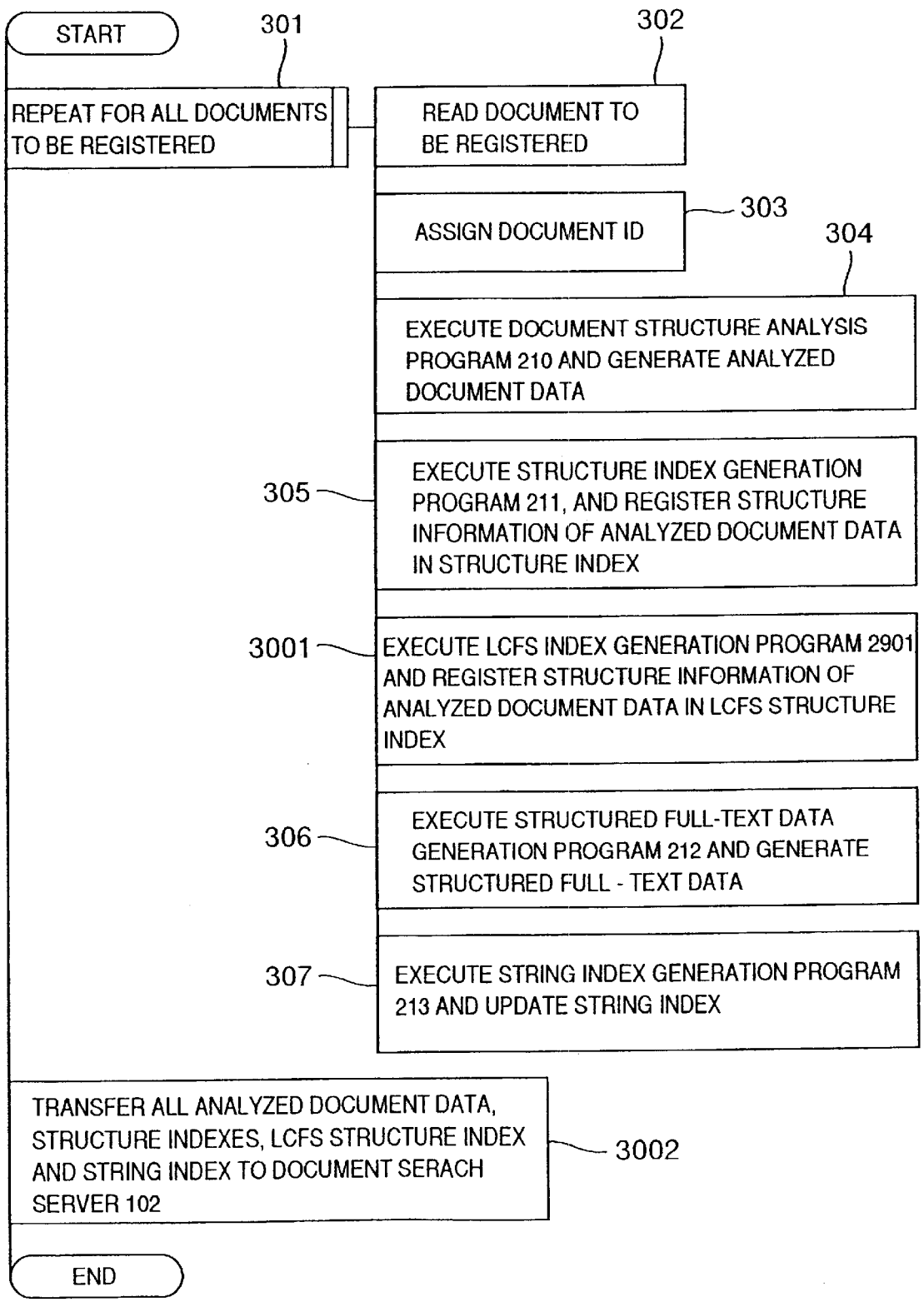
FIG. 30 is a PAD briefly showing the steps of processing the document registration according to the second embodiment of the invention.

FIG. 30 is a PAD briefly showing the steps of processing the document registration according to the second embodiment of the invention. The steps shown in FIG. 30 are substantially similar to those of the first embodiment shown in FIG. 3, but is different in that step 3001 is added immediately after step 305, and step 3002 is executed instead of step 308.

In step 3001, the last-come first-served structure index generation program 2901 is executed in response to the analyzed document data generated in step 304 input thereto. The last-come first-served structure index generation program 2901 first reads the current last-come first-served structure index from the last-come first-served structure index storage area 2902, registers the structure information held in the analyzed document data in the last-come first-served structure index, and stores the updated last-come first-served structure index again in the last-come first-served structure index storage area 2902.

In step 3002, all the analyzed document data stored in the analyzed document data storage area 217, the structure index stored in the structure index storage area 218, the last-come first-served structure index stored in the last-come first-served structure index storage area 2902 and the string index stored in the string index storage area 220 are transferred to the document search server 102 through the network 105.

Figure 31:
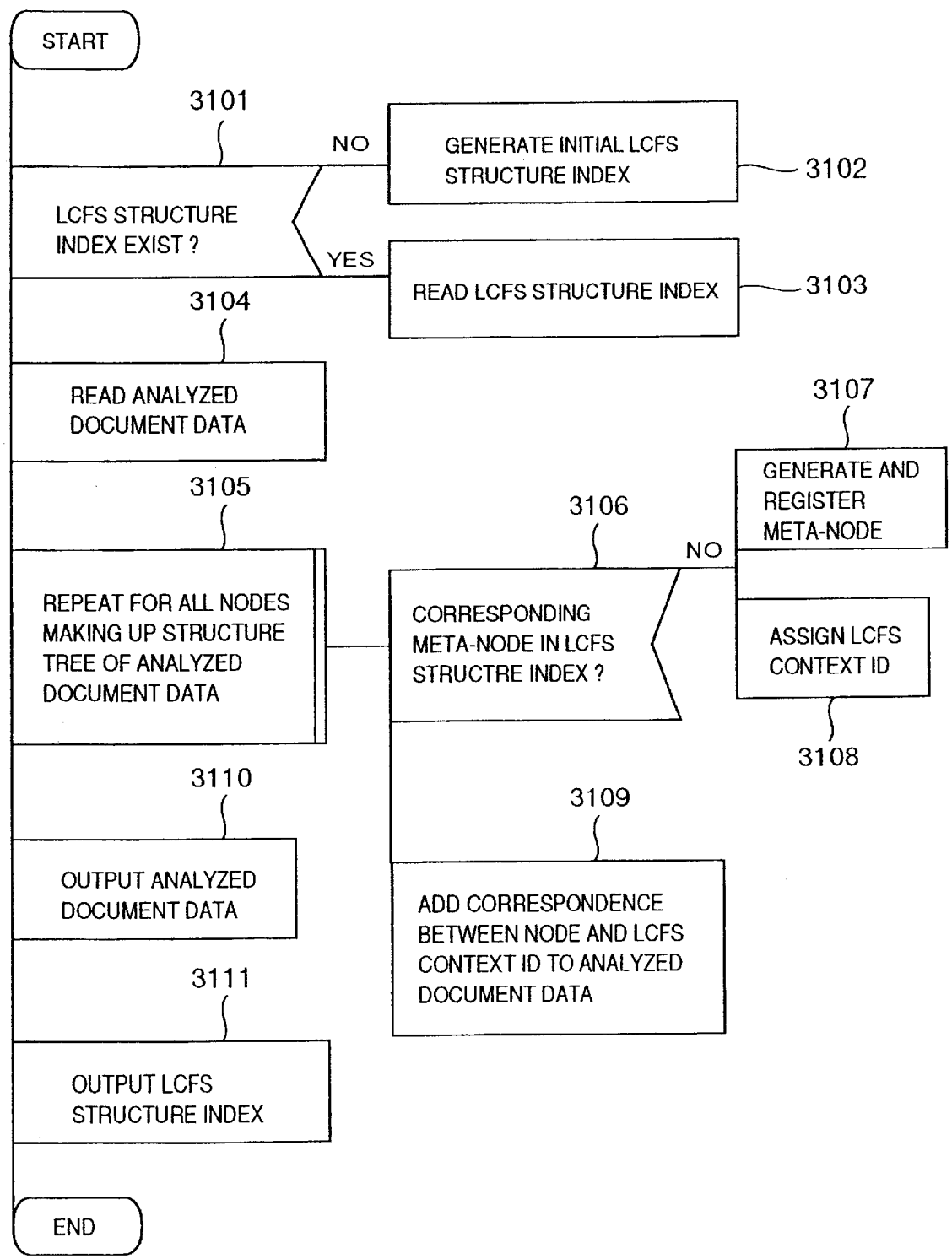
FIG. 31 is a PAD showing the steps of processing a last-come first-served structure index generation program according to the second embodiment of the invention.

FIG. 31 is a PAD showing the detail of step 3001 in FIG. 30, i.e. the steps of processing the last-come first-served structure index generation program 2901 according to this embodiment.

The last-come first-served structure index generation program 2901 determines, first in step 3101, whether the existing last-come first-served structure index is present in the last-come first-served structure index storage area 2902. In the case where the last-come first-served structure index does not exist in that area, the process proceeds to step 3102 for generating an initial (vacant) last-come first-served structure index. In the cases where the existing last-come first-served structure index is detected, on the other hand, the process proceeds to step 3103 for reading the last-come first-served structure index.

Then, in step 3104, the analyzed document data of the document to be registered is read.

Then, in step 3105, the process of steps 3106 to 3109 is repeated for all the nodes (elements and string data) making up the structure tree of the analyzed document data.

In step 3106, it is determined whether a meta-node (meta element or meta string data) corresponding to the node currently closely watched in the analyzed document data exists in the last-come first-served structure index. In the absence of a corresponding meta-node, the process proceeds to step 3107, where a meta-node corresponding to the node is generated and registered in the last-come first-served structure index. Further, the registered meta-node is assigned a last-come first-served context identifier as the number for uniquely identifying it in the last-come first-served structure index (step 3108).

In step 3109, the correspondence between the node currently closely watched in the analyzed document data and the last-come first-served context identifier for identifying the meta-node corresponding to particular node in the last-come first-served structure index is added to the analyzed document data. In this way, the analyzed document data is updated.

Upon complete repetitive processing of step 3105 and subsequent steps, the process proceeds to step 3110, where the updated analyzed document data is output and stored in the analyzed document data storage area 217. Then, in step 3111 the updated last-come first-served structure index is output and stored in the last-come first-served structure index storage area 2902 thereby to terminate the process.

As described above, the steps of processing according to the last-come first-served structure index generation program 2901 substantially corresponds to the steps of processing according to the structure index generation program 211 shown in FIG. 9. However, the order in which the structure tree of the analyzed document is traced in the repetition of step 3105 is different from that for the structure index generation program 211, with the result that the structure tree of the last-come first-served structure index is different from the structure tree of the structure index.

Figure 32:
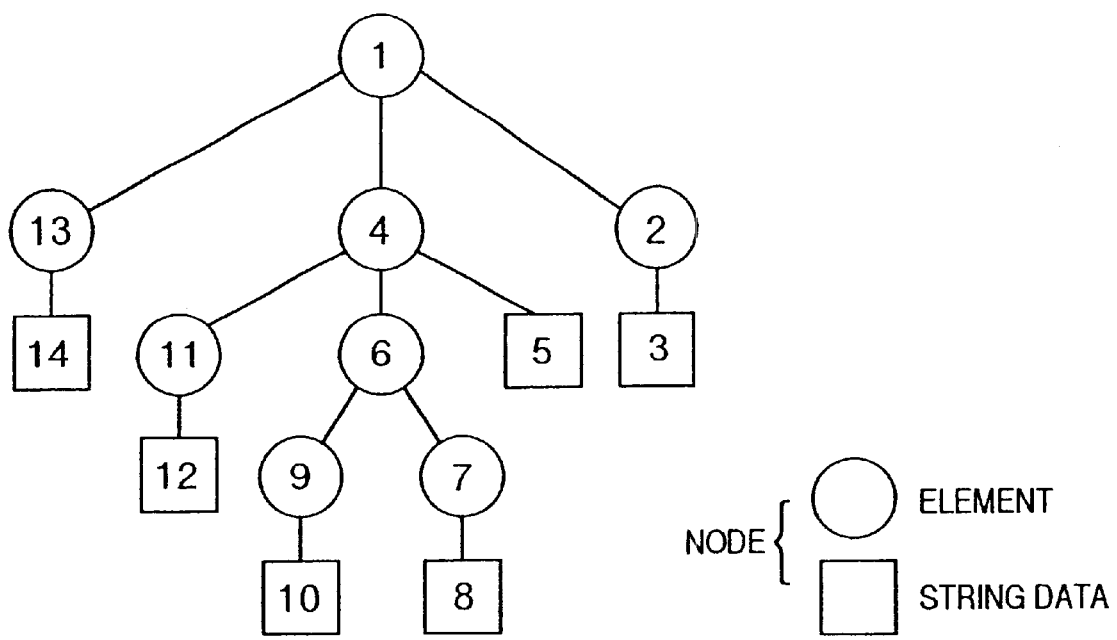
FIG. 32 is a diagram showing the order of tracing the analyzed document data according to the second embodiment of the invention.

Now, with reference to FIG. 32, an explanation will be given of the order in which the structure tree is traced to process individual nodes when repeating step 3105 for all the nodes making up the structure tree of the analyzed document data. In FIG. 32, each element node is expressed by an circle, and each string node is expressed by a rectangle. In the case where a given node has a plurality of subnodes, the subnodes are expressed by being arranged left to right in the order of occurrence. Also, the numerical characters attached to the nodes indicate the order of processing the respective nodes.

As shown in FIG. 32, in step 3105, the nodes are processed in such an order that when a specific node and the subnodes underlying it are processed starting with the node located at the root of the structure tree, the particular node is processed first, followed by processing the subnodes in the reverse order of occurrence thereof.

Figure 33:
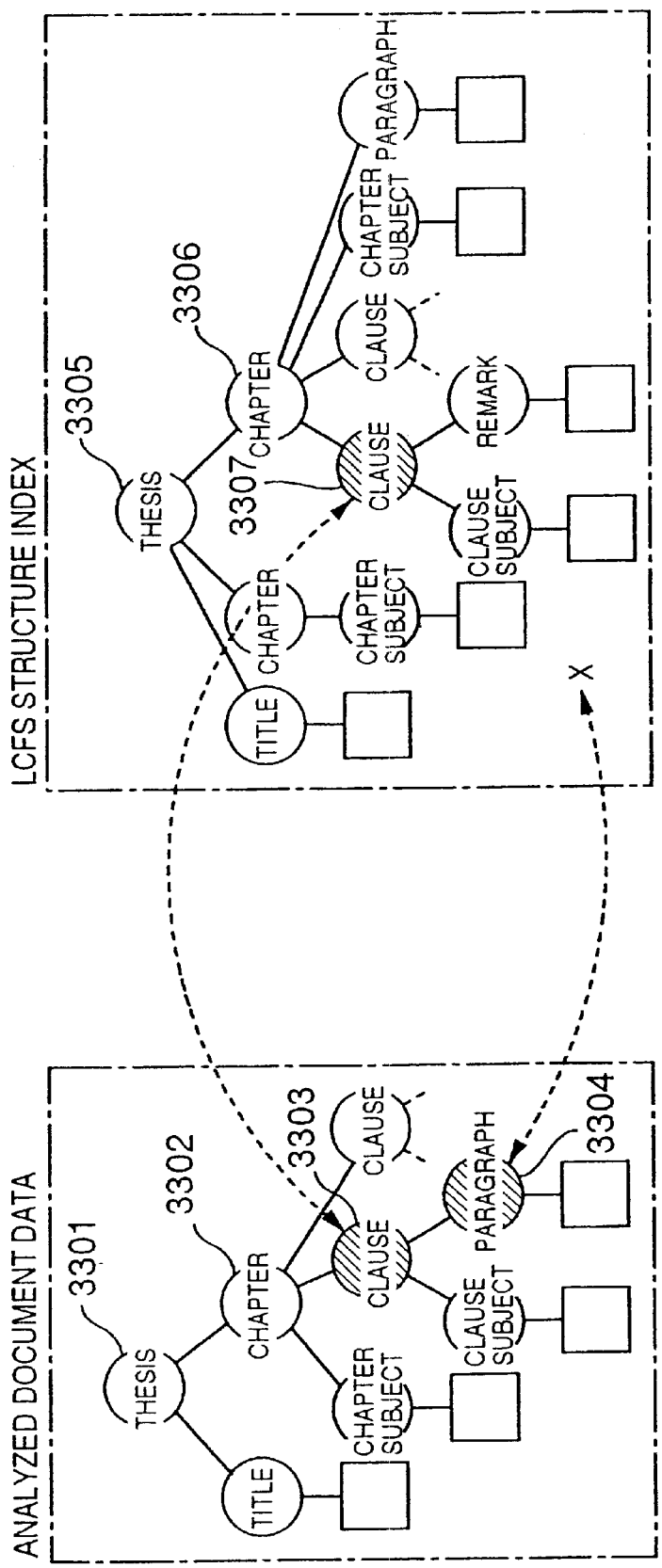
FIG. 33 is a diagram showing the correspondence between nodes and meta-nodes according to the second embodiment of the invention.

Now, with reference to FIG. 33, an explanation will be given of the process in step 3106 for determining whether a meta-node corresponding to a node currently closely watched in the analyzed document data exists in the last-come first-served structure index. FIG. 33 is a diagram showing the correspondence between a set of nodes constituting the structure tree of the analyzed document data shown to the left of the drawing and a set of nodes (meta-nodes) constituting the structure tree of the last-come first-served structure index shown to the right of the drawing.

According to this embodiment, it is determined that a given node in the structure tree of the analyzed document data corresponds to a meta-node in the structure tree of the last-come first-served structure index in the case where the last-come first-served structure tree address of the particular node is equal to the last-come first-served structure tree address of the particular meta-node. The last-come first-served structure tree address is defined as an address representing a combination of the type (element or string data, and in the former case, the element type to which the element belongs) of each node existing along the route starting with the root of the structure tree and followed from a superior node to a subnode before reaching a specific node on the one hand and the number indicating the order in which the particular node appears as counted from the last one of the sibling nodes of the same node type on the other hand (in order to discriminate from the normal structure tree address, the last-come first-served structure tree address is expressed by a negative integer).

Among the set of nodes in the analyzed document data shown in FIG. 33, for example, the node 3301 has no superior node and is the last "thesis" element node in the sibling nodes. Thus, the last-come first-served structure tree address thereof is expressed as "/thesis[−1]". In similar fashion, the node 3302 is a subnode of the node 3301 and the last "chapter" element in the sibling nodes. Therefore, the last-come first-served structure tree address of this node is expressed as "/thesis[−1]/chapter[−1]". The node 3303 is a subnode of the node 3302 and the last "clause" element but one in the sibling nodes, so that the last-come first-served structure tree address of this node is expressed as "/thesis[−1]/chapter[−1]/clause[−2]". Also, the node 3304 is a subnode of the node 3303 and the last "paragraph" element node in the sibling nodes. Therefore, the last-come first-served structure address of this node is given as "/thesis[−1]/chapter[1]/clause[−2]/paragraph[−1]".

In similar manner, the last-come first-served structure tree address of each meta-node configuring the structure tree of the structure index on the right side of FIG. 33 is determined in the following way. The last-come first-served structure tree address of the meta-node 3305 is expressed as "/thesis[−1]" which is equal to the last-come first-served structure tree address of the node 3301. In similar fashion, the last-come first-served structure tree address of the meta-node 3306 is "/thesis[−1]/chapter[−1]" which is equal to the last-come first-served structure tree address of the node 3302. Also, the last-come first-served structure tree address of the met a-node 3307 is "/thesis[1]/chapter[−1]/clause[−2]" which is equal to the last-come first-served structure tree address of the node 3303. As a result, in step 3106, it is determined that the node 3301 corresponds to the meta-node 3305, the node 3302 corresponds to the meta-node 3306, and the node 3303 corresponds to the meta-node 3307. The structure index of FIG. 33 has no meta-node having the same last-come first-served structure tree address as the node 3304, and therefore it is determined that there is no meta-node corresponding to the node 3304 in the last-come first-served structure index. Then, a new meta-node is generated in step 3107 and registered in the structure index.

In step 3107, when registering a new meta-node corresponding to a given node, a meta-node of the type corresponding to the particular node is added to the head of the subnodes of a meta-node corresponding to a superior node of the node. In registering a meta-node corresponding to the node 3304 in FIG. 33, for example, a meta-node of the element type "paragraph" is added as a meta subnode of the meta-node 3307 corresponding to the node 3303 which is a superior node of the node 3304, and the meta subnode is placed at the head of the sibling meta-nodes.

Figure 34:
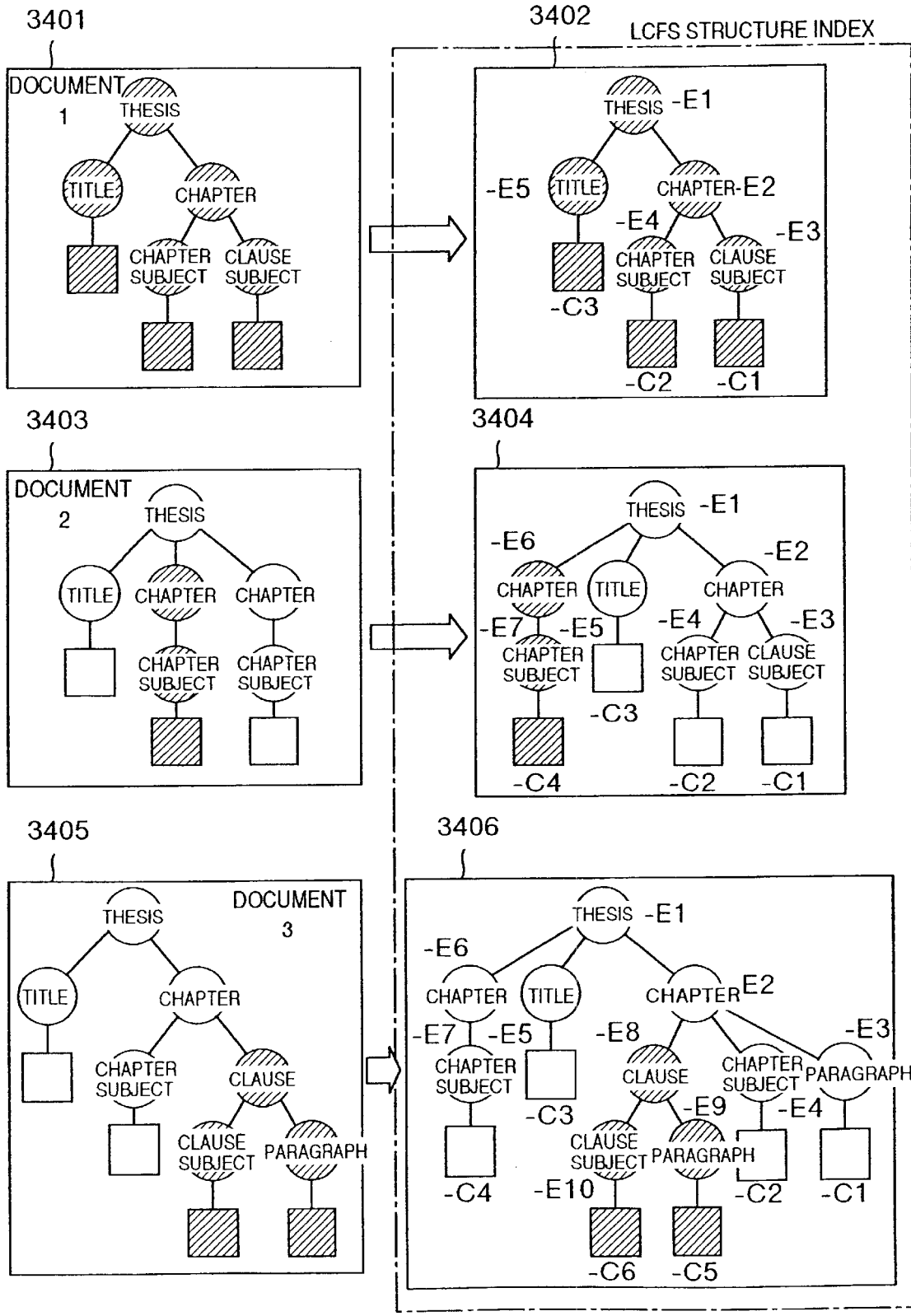
FIG. 34 is a diagram showing the process of generating a last-come first-served structure index according to the second embodiment of the invention.

Now, the process of generating a last-come first-served structure index by superposing a plurality of analyzed document data sequentially will be explained with reference to FIG. 34. In FIG. 34, numerals 3401, 3403 and 3405 designate the analyzed document data of the documents to be registered, respectively. The elements of these analyzed document data are superposed sequentially on the existing last-come first-served structure index thereby to form a last-come first-served structure index.

First, assume that the analyzed document data 3401 of the document 1 is input. The last-come first-served structure index is in initial state (vacant). Thus, a structure tree equivalent to the analyzed data is generated and directly registered in the last-come first-served structure index. Therefore, the last-come first-served structure index is in the state shown by 3402. The newly generated meta elements are assigned context identifiers −E1 to −E5, and the newly generated meta string data are assigned context identifiers −C1 to −C3.

Next, when the analyzed document data 3403 of the document 2 is input, nothing is done about the part having the same elements as the existing last-come first-served structure index (3402), but only the subelements (hatched portion in the drawing) lacking the corresponding part in 3402 are newly registered. The newly generated meta elements are assigned context identifiers −E6 and −7, and the newly generated meta string data is assigned a context identifier −C4.

Then, assume that the analyzed document data 3405 of the document 3 is input. Nothing is done about the part having the same elements as the existing last-come first-served structure index 3404, but only the subelements (hatched part in the drawing) lacking the corresponding part in 3404 are newly registered. The newly generated meta elements are assigned context identifiers −E8, −E9 and −E10, and the newly generated meta string data are assigned context identifiers −C5 and −C6. In this way, with the three documents registered, the last-come first-served structure index assumes the state shown in 3406.

Figure 35:
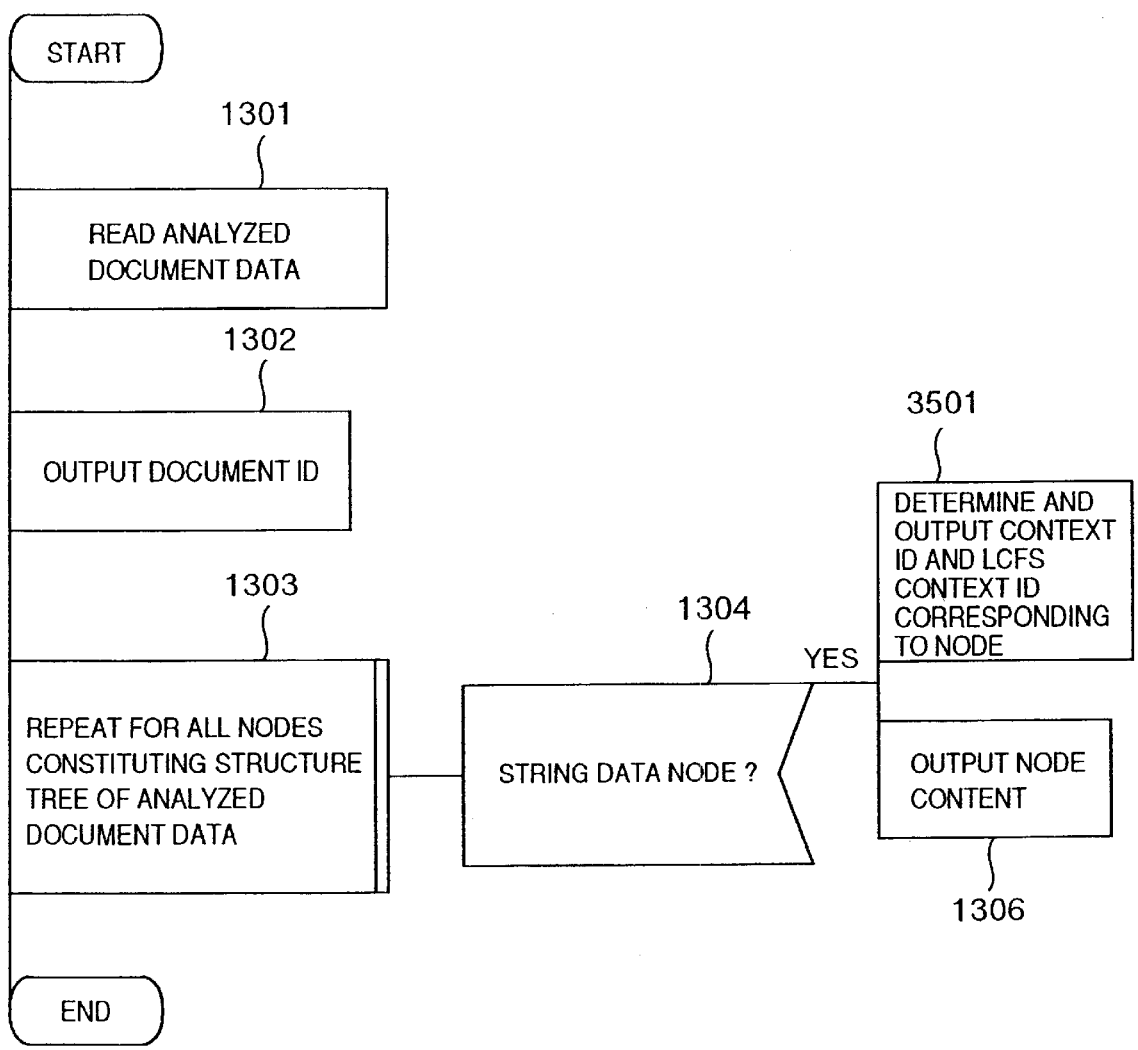
FIG. 35 is a PAD showing the steps of processing in a structured full-text data generation program according to the second embodiment of the invention.

FIG. 35 is a PAD showing the detail of step 306 in FIG. 30, i.e. the steps of processing the structured full-text data generation program 212 in this embodiment. As shown in FIG. 35, the steps of processing the structured full-text data generation program 212 according to this embodiment are substantially the same as those for the first embodiment described above.

The present embodiment is different, however, in that step 1305 in FIG. 13 is replaced by step 3501.

In step 3501, the context identifier and the last-come first-served context identifier corresponding to the string data node currently closely watch are determined from the analyzed document data, and output to the structured full-text data storage area 219.

FIG. 36 shows a file format of the structured full-text data output by the structured full-text data generation program 212 according to this embodiment. FIG. 36 illustrates the case in which the structure full-text data is generated with the SGML document shown in FIG. 5 as an input thereto. As shown in FIG. 36, the data file of the structured full-text data according to this embodiment is so structured that a document identifier is described at the head, followed by a set of three including the context identifier, the last-come first-served context identifier and the corresponding content, which set is repeated as many times as the number of the string data existing in the document.

Figure 37:
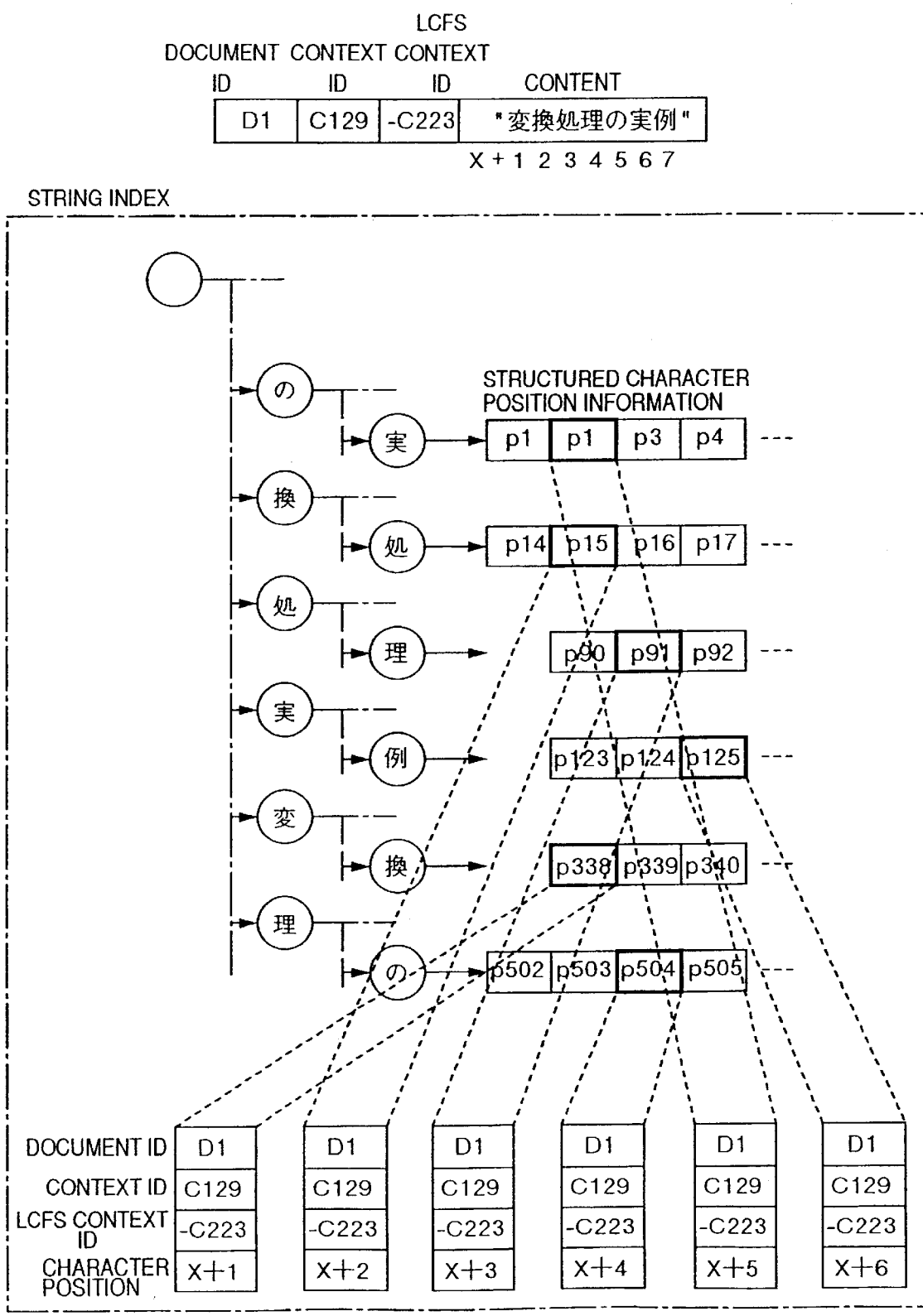
FIG. 37 is a PAD showing a data format of the string index according to the second embodiment of the invention.

The string index according to this embodiment, like in the first embodiment, is generated in accordance with the steps of processing shown in FIG. 15. FIG. 37 shows the data structure of the string index according to this embodiment. FIG. 37 illustrates a part of the data structure (the part associated with the content "変換処理の実例", (an example of conversion process)") of the string index upon complete registration of the substrings contained in the structured full-text data of FIG. 36 in the string index after the structured full-text data are processed using the string index generation program 213.

As shown in FIG. 37, in the string index according to this embodiment, each structured character position information contains the last-come first-served context identifier as well as the information held in the first embodiment. In FIG. 37, however, like in FIG. 16 of the first embodiment, the character node corresponding to the tail end "例" of the content and the structured character position information are not shown. Also, the position of the character located immediately before the content is indicated by "X" as a relative expression.

The foregoing is the description of the document registration subsystem 101 according to this embodiment.

The document search server according to the second embodiment of the invention, i.e. the component part 102 in FIG. 1 will be explained below.

Figure 38:
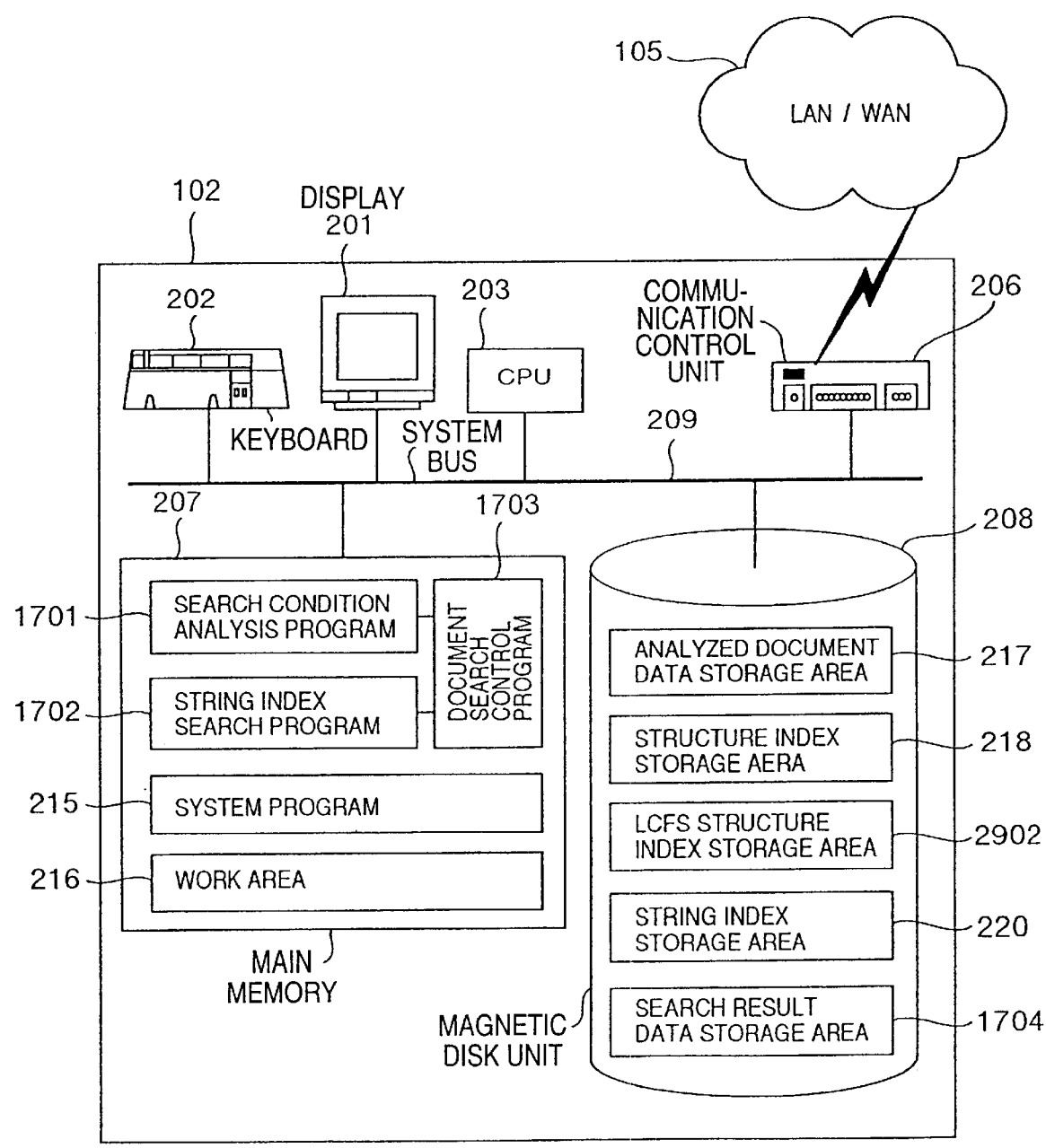
FIG. 38 is a diagram showing a configuration of a document search server according to the second embodiment of the invention.

FIG. 38 is a diagram showing a configuration of the document search server according to this embodiment. As shown in FIG. 38, the document search server 102 according to this embodiment holds the last-come first-served index storage area 2902 in the magnetic disk unit 208 in addition to the component elements of the first embodiment described above.

Also in this embodiment, instead of using the network 105 for transferring the data between the document registration subsystem 101 and the search clients, a floppy disk, a magneto-optic disk, a write-once optical disk or the like portable medium can be used. Also, the document registration subsystem 101 and the document search server 102 can be mounted on a single computer and thus the data transfer between them can be eliminated. It is also possible to employ a configuration in which one or more search clients are executed on the same computer as the document search server 102 without transferring any data between them.

Figure 39:
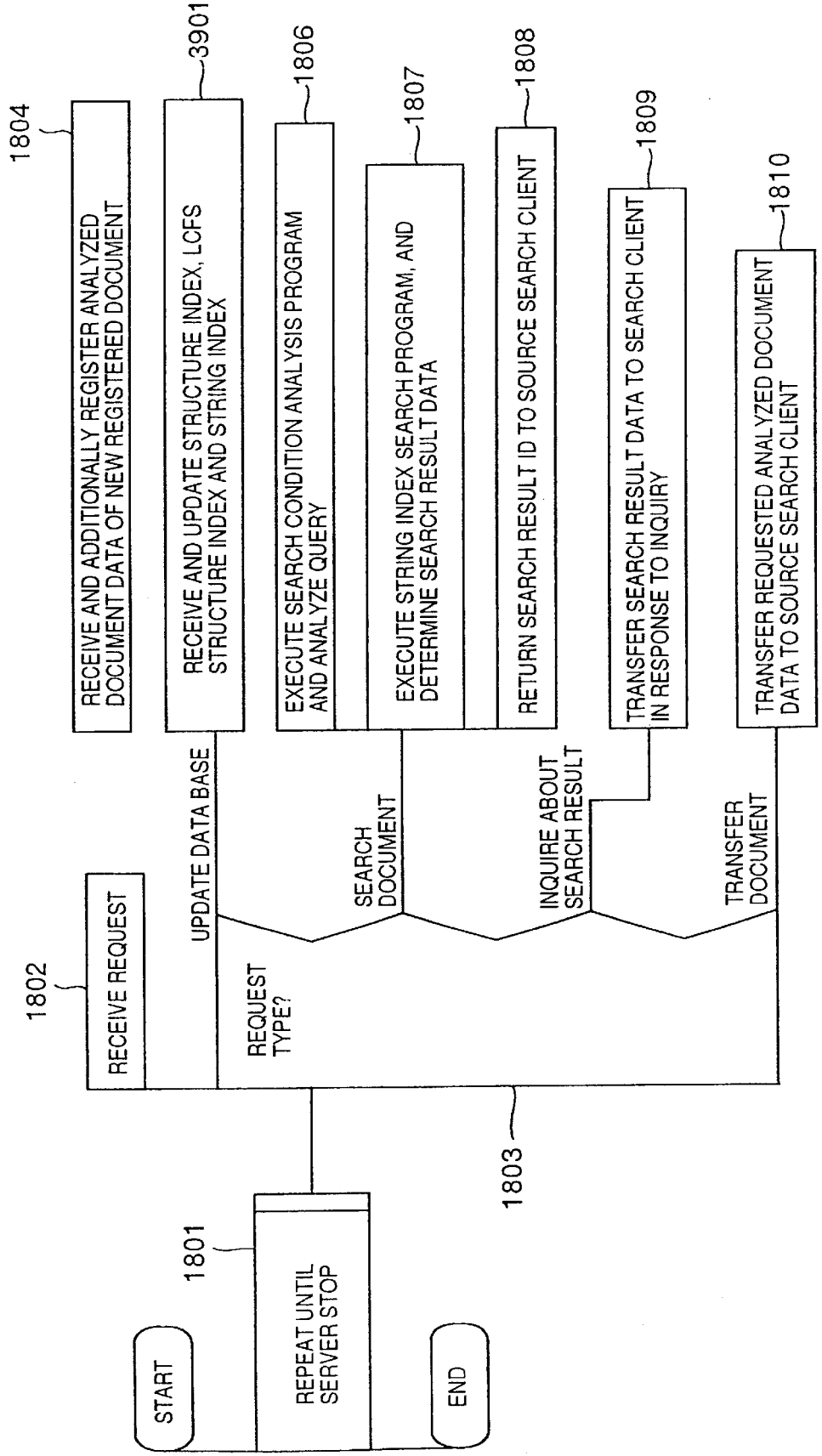
FIG. 39 is a PAD briefly showing the steps of the document search process according to the second embodiment of the invention.

FIG. 39 is a PAD briefly showing the steps of document search process according to the second embodiment of the invention. As shown in FIG. 39, the steps of processing the document search according to this embodiment are substantially the same as those for the first embodiment shown in FIG. 18. The difference of this embodiment, however, lies in that step 3901 is executed instead of step 1805 of the first embodiment. In step 3901, the updated structure index, the last-come first-served structure index and the string index reflecting the contents of the newly registered document set are received from the document registration subsystem 101, and are stored in the structure index storage area 218, the last-come first-served structure index storage area 2902 and the string index storage area 220, respectively.

Figure 40:
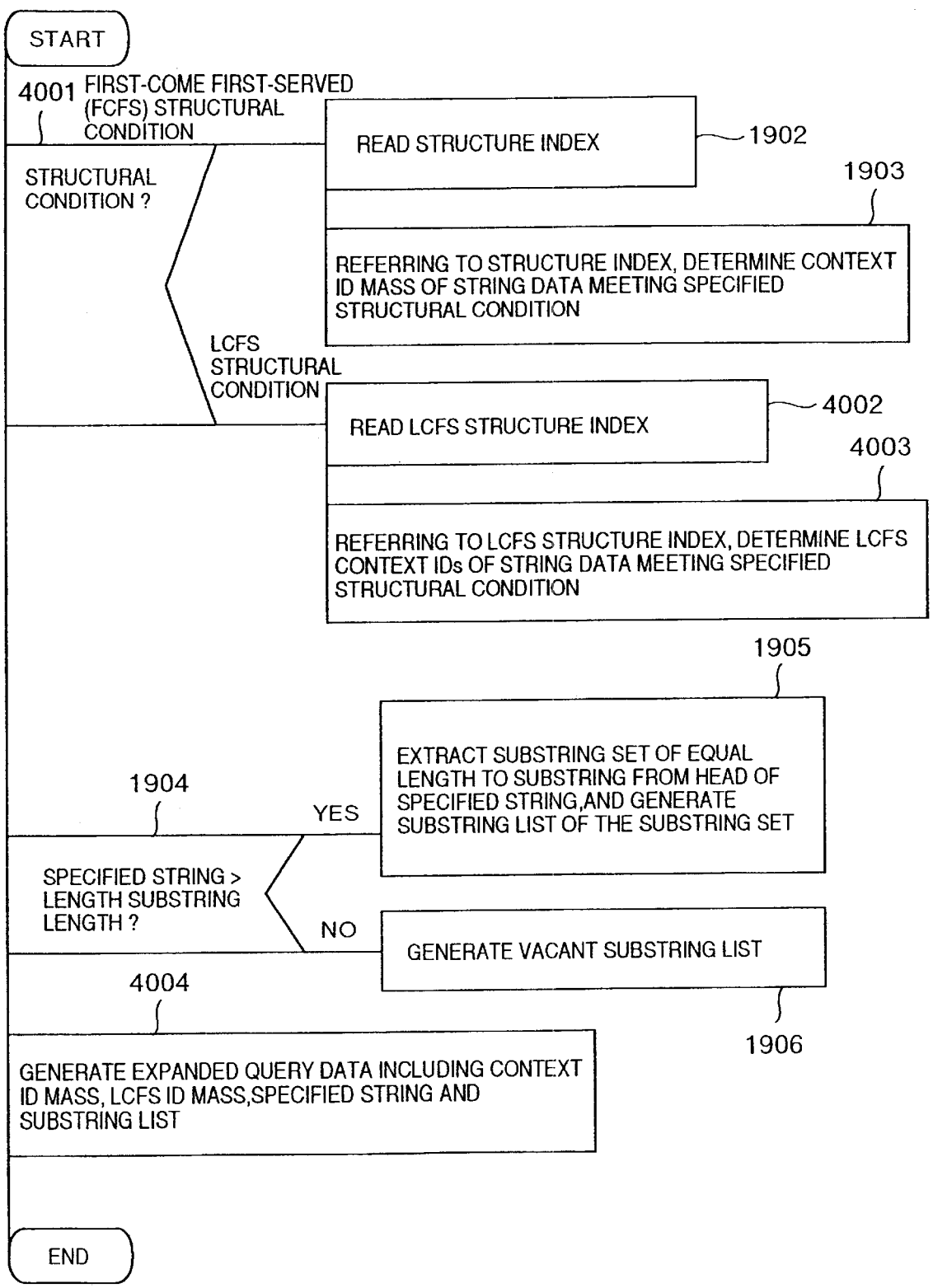
FIG. 40 is a diagram showing the steps of processing in the search condition analysis program according to the second embodiment of the invention.

FIG. 40 is a PAD showing the detail of step 1806 in FIG. 39, i.e. the steps of processing the search condition analysis program 1701 according to this embodiment.

In this embodiment, the search condition analysis program 1701, upon activation thereof in response to an input thereto of the search condition specified in the document search request, determines, first in step 4001, the structural condition contained in the query. In the case where the first-come first-served structural condition (i.e. a structural condition similar to the one in the first embodiment) is contained in the search condition, the process proceeds to steps 1902 and 1903. The process in steps 1902 and 1903 is similar to the corresponding process in the first embodiment. In the case where the search condition contains the last-come first-served structural condition, on the other hand, the process proceeds to steps 4002 and 4003. In the case where the search condition contains no structural condition, on the other hand, nothing is done but the process proceeds to step 1904.

In step 4002, the last-come first-served structure index is read from the last-come first-served structure index storage area 2902. Then, in step 4003, a mass of the last-come first-served context identifiers of all the string data contained in the structure meeting the structural condition is determined with reference to the last-come first-served structure index. This mass is hereinafter called the last-come first-served context identifier mass.

The process in step 1904 and steps 1905 and 1906 branching from it is identical to that for the first embodiment, and after completing this process, the process proceeds to step 4004.

In step 4004, the expanded substring data including the context identifier mass determined in step 1903, the last-come first-served context identifier mass determined in step 4003, the specified string contained in the search condition and the substring list generated in steps 1905 and 1096 described above are generated, and the process is terminated.

Figure 41:
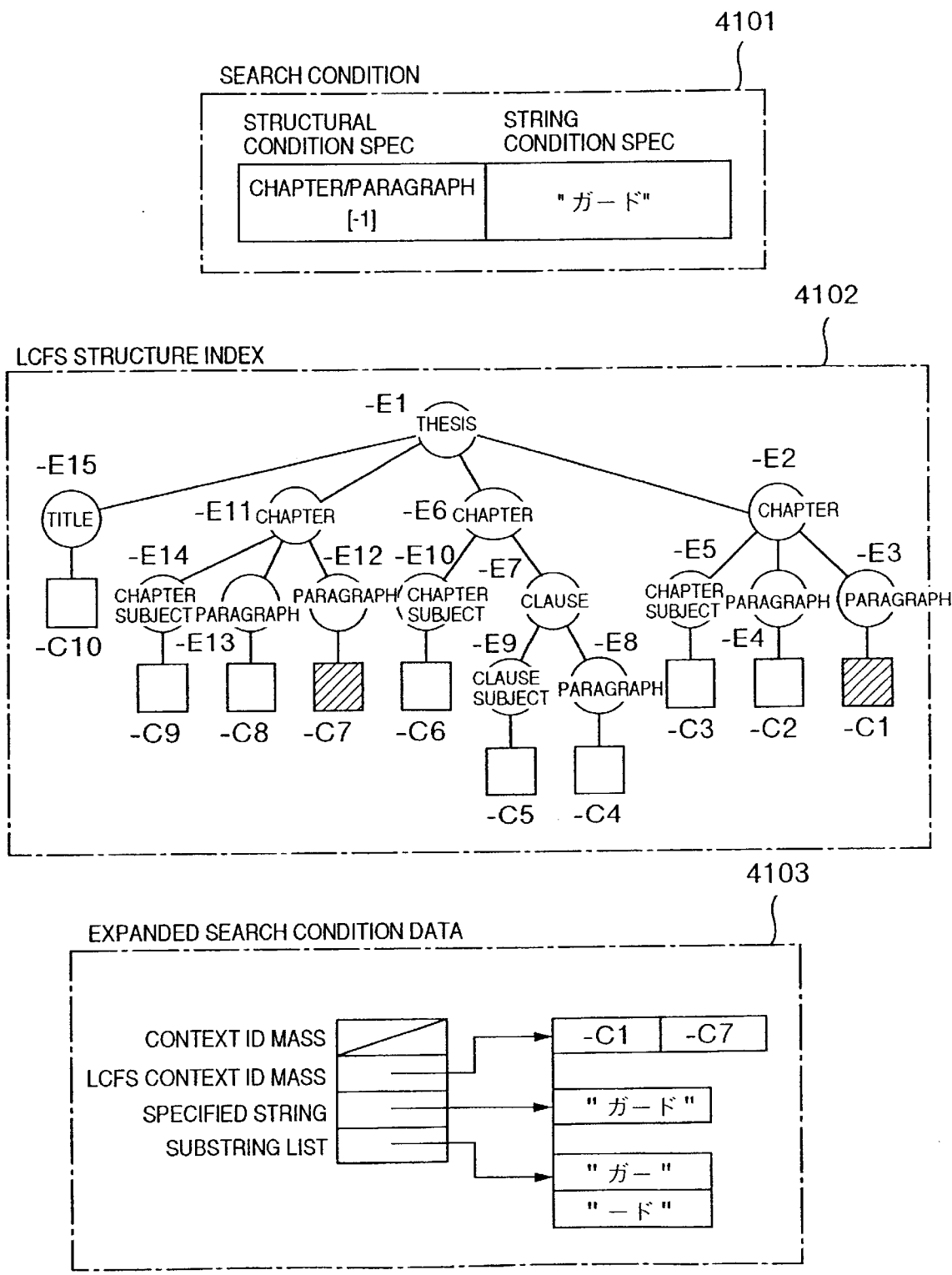
FIG. 41 is a diagram showing an example of generating an expanded search condition data according to the second embodiment of the invention.

FIG. 41 is a diagram showing an example of generating the expanded analysis condition data in the processing of the search condition analysis program 1701.

In FIG. 41, numeral 4101 designates an example of the query specified in the document search request. The query 4101 is configured of the structural condition specification "chapter/paragraph[-1]" and the string condition specification "ガード" (guard)". The query specifies that the case should be searched for in which the stringing "ガード" occurs in the last "paragraph" element which constitutes an intermediate subelement of the "chapter" element.

The structural condition specified in the search condition is the last-come first-served structural condition for specifying the condition by tracing the structure in reverse way from the tail. Assuming that the content of the last-come first-served structure index is as shown by 4102, therefore, the last-come first-served context identifiers of the "paragraph" element meeting the structural condition specification are seen to be –E3 and –E12 by referring to the structure index in step 4003. Therefore, the case should be searched for, in which the string "ガード" occurs in the string data underlying these paragraphs, i.e. the string data with the last-come first-served context identifier of –C1 or –C7. The occurrence position is registered, however, only for the substring of length 2 in the string index used for search. Therefore, the specified string having three characters described above cannot be directly searched for. In view of this, in step 1905, a list is generated which includes substrings of length 2 by decomposing the specified string in step 1905. In the case where the specified string "ガード" as mentioned above, the substrings extracted are "ガー" and "ード".

As a result, in step 4004, the expanded search condition data shown in 4103, i.e. the data with the context identifier mass vacant, the last-come first-served context identifier mass {–C1, –C7}, the specified string "ガード" and the substring list ("ガー", "ード") are generated.

Figure 42:
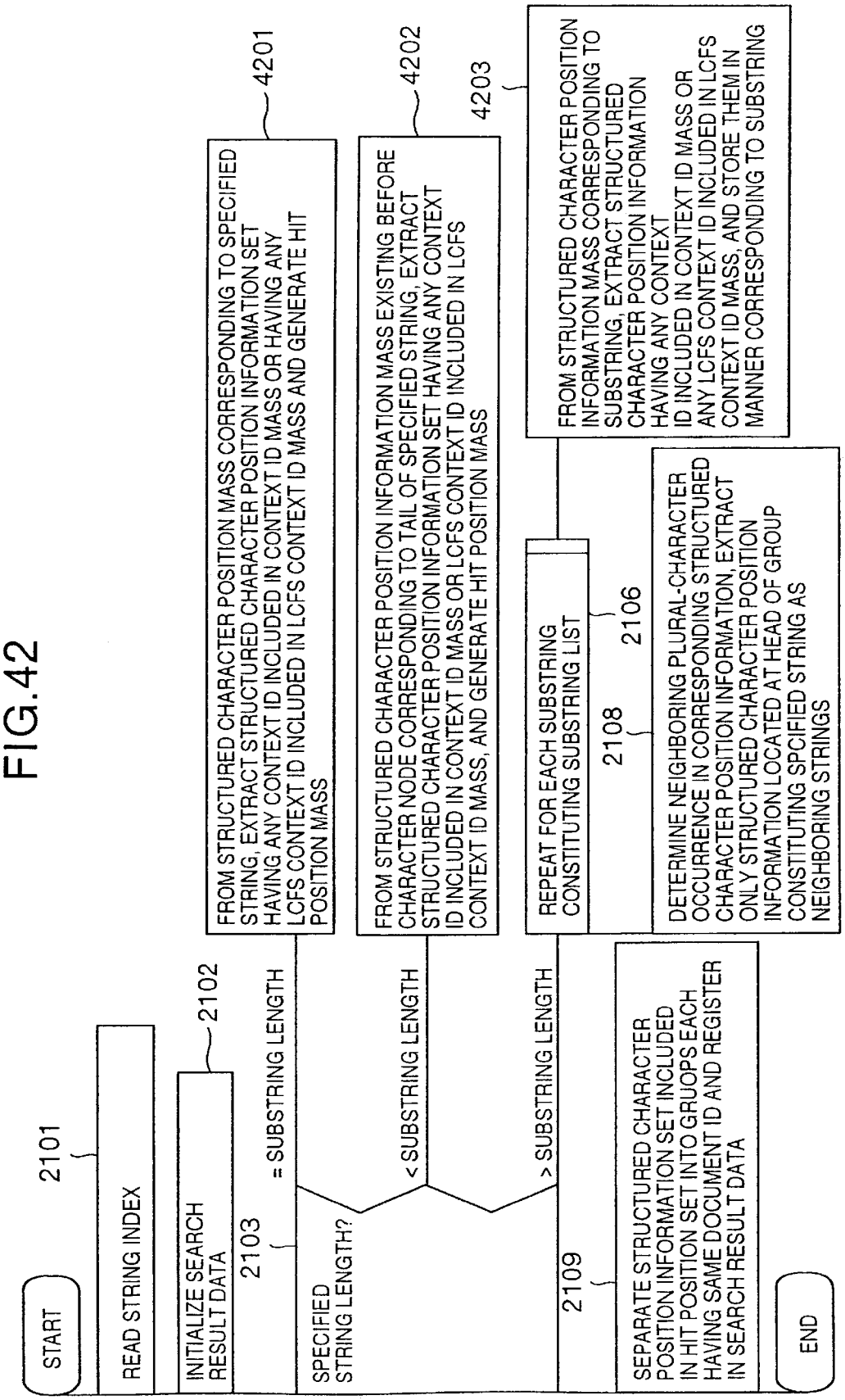
FIG. 42 is a PAD showing the steps of processing in the string index search program according to the second embodiment of the invention.

FIG. 42 is a PAD showing the detail of step 1807 in FIG. 39, i.e. the steps of processing the string index search program 1702 according to this embodiment.

The string index search program 1702 is activated by an input including the expanded search condition data generated by the search condition analysis program 1701. As shown in FIG. 42, the steps of processing this program are substantially the same as the processing steps of the first embodiment shown in FIG. 21. Instead of steps 2104, 2105 and 2107 in FIG. 21, however, steps 4201, 4202 and 4203, respectively, are executed.

In step 4201, the expanded search condition data are searched for the specified string in the string index and a mass of structured character positions corresponding to the string is determined. Then, from this mass, only the set of structured character position information having any one of the context identifiers contained in the context identifier mass in the expanded search condition data or the last-come first-served identifier contained in any one of the last-come first-served identifier mass in the expanded search condition data are extracted, and a mass of hit positions including the extracted structured character position set is generated.

In step 4202, the string index is searched for the specified string, and a mass of all the structured character position information existing before the character node corresponding to the tail end of the string is determined. From this mass, only the set of the structured character position information having any one of the context identifiers included in the context identifier mass in the expanded search condition data or any one of the last-come first-served identifiers included in the last-come first-served context identifier mass in the expanded search condition data is extracted, and a mass of hit positions including the extracted structured character position information set is generated.

In step 4203, the substring set included in the substring list in the expanded search condition data in the substring index is searched for the substring currently closely watched in the repetition of step 2106, and a mass of the structured character position information corresponding to the string is determined. Then, from this mass, only the set of the structured character position information having any one of the context identifiers included in the context identifier mass in the expanded search condition data or any one of the last-come first-served context identifiers included in the last-come first-served context identifier mass in the expanded search condition data is extracted, and the extracted set of the structured character position information is stored at positions corresponding to the substrings.

Step 2108 in FIG. 42, i.e. the determination of the neighboring plural-character occurrence in the process of the string index search program 1702 is similar to that for the first embodiment shown in FIG. 22. In the case where the structural condition in the search condition is last-come first-served, however, not the coincidence of the context identifiers but the coincidence of the last-come first-served identifiers is determined in the determination of the neighboring plural-character occurrence.

As described above, with the configuration according to this embodiment, in addition to the various structural conditions making possible the search in the first embodiment, the search by specifying the structural condition following the logic structure of the document in reverse order (from the tail) is also possible, such as "a specific string is searched for in the last chapter of a thesis", or "a specific string is searched for in the second last reference".

The foregoing is the description of the second embodiment of the invention.

(3) Third Embodiment

Now, a third embodiment of the invention will be explained with reference to the drawings.

In this embodiment, both the system configuration and the steps of processing each program are the same as those for the first embodiment. This embodiment is different, however, in the manner of setting the nodes in the document structure tree in a way corresponding to the meta-nodes in the structure index. As a result, even when the same document set is input, the structure of the structure index and the assignment of the context index are different from those of the first embodiment.

Figure 43:
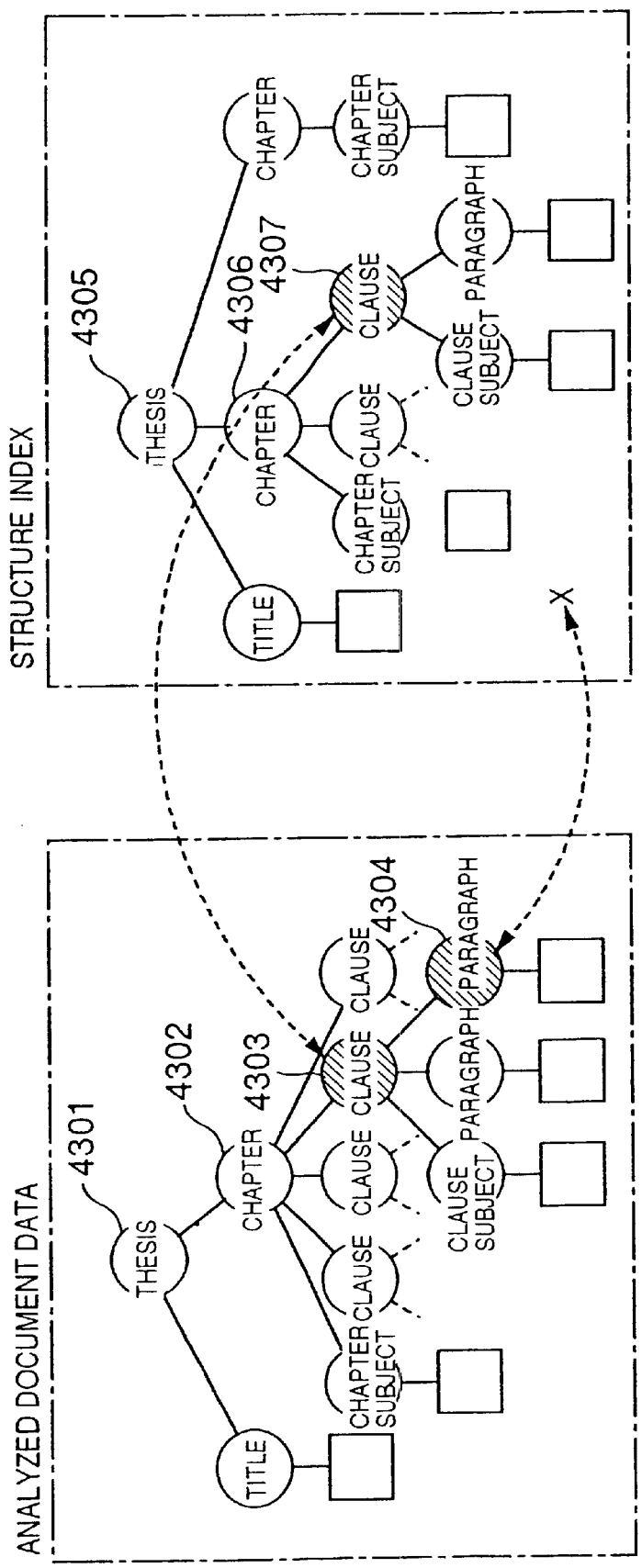
FIG. 43 is a diagram showing the correspondence between nodes and meta-nodes according to a third embodiment of the invention.

The correspondence between the nodes in the document structure tree and the meta-nodes in the structure index according to this embodiment will be explained with reference to FIG. 43. FIG. 43 shows the correspondence between the node set constituting the structure tree of the analyzed document data shown to the left of the drawing and the node (meta-node) set constituting the structure tree of the structure index shown to the right of the drawing.

Also in this embodiment, in the case where the structure tree address of a given node in the structure tree of the analyzed document is equal to the structure tree address of a given meta-node in the structure tree of the structure index, the particular node and the particular meta-node are defined to correspond to each other. According to this embodiment, however, unlike in the first embodiment, the leading node and the second node are discriminated from each other but the second node and subsequent nodes are not discriminated from each other when determining the order of occurrence therein in the sibling nodes of the same type having a common superior node. In other words, the number indicating the order of occurrence in the structure tree address always assumes [1] or [2] but never [3] or more.

Among the nodes in the analyzed document data shown in FIG. 43, for example, the node 4301 has no superior node and the first "thesis" element node in the sibling nodes. Therefore, the structure tree address of this node is expressed as "/thesis[1]". In similar fashion, the node 4302 is a subnode of the node 4301 and the first "chapter" element node in the sibling nodes, so that the structure tree address thereof is "/thesis[1]/chapter[1]". In contrast, the node 4303 is a subnode of the node 4302 and the fourth "clause" element node in the sibling nodes, so that the structure tree address thereof is given as "/thesis[1]/chapter[1]/clause[2]" according to the rule described above. Also, the node 4304 is a subnode of the node 4303 and the second "paragraph" element node in the sibling nodes, so that the structure tree address thereof is given as "/thesis[1]/chapter[1]/clause[2]/paragraph[2]".

In similar manner, the structure tree address of each meta-node constituting the structure tree of the structure index to the right of FIG. 43 is determined in the following way. The structure tree address of the meta-node 4305 is given as "/thesis[1]", and equal to the structure tree address of the node 4301. Similarly, the structure tree address of the meta-node 4306 is given an "/thesis[1]/chapter[1]" and equal to the structure tree address of the node 4302. Also, the structure tree address of the meta-node 4307 is "/thesis[1]/chapter[1]/clause[2]" which is equal to the structure tree address of the node 4303. As a result, it is determined that the node 4301 corresponds to the meta-node 4305, the node 4302 corresponds to the meta-node 4306, and the meta-node 4303 corresponds to the meta-node 4307. The structure index of FIG. 43 has no meta-node having the structure tree address equal to that of the node 4304, and therefore it is determined that there is no meta-node corresponding to the node 4304 in the structure index.

As described above, as a result of application of the rule explained above, in the structure index formed according to this embodiment, it never happens that three or more meta-nodes of the same type are added as meta subnodes of the same meta-node. In the case where three or more nodes of the same type exist as neighboring nodes in the structure tree, the second and subsequent nodes are assigned the same context identifier. As a result, the document search method according to this embodiment cannot specify an arbitrary order of occurrence in the structural condition, but only either the first element or the subsequent element set of the same type. This embodiment, however, simplifies the data structure of the structure index as compared with the first embodiment, and can reduce the required capacity of the structure index storage area 218.

Even in the case where the correspondence between noes and meta-nodes is employed as in the present embodiment, like in the second embodiment, the element specification set in the order of occurrence from the tail end is possible by providing the two structure indexes, one on the first-come first-served basis and the other on the last-come first-served basis.

The foregoing is the description of the third embodiment.

(4) Fourth Embodiment

A fourth embodiment of the invention will be explained below with reference to the drawings.

Figure 44:
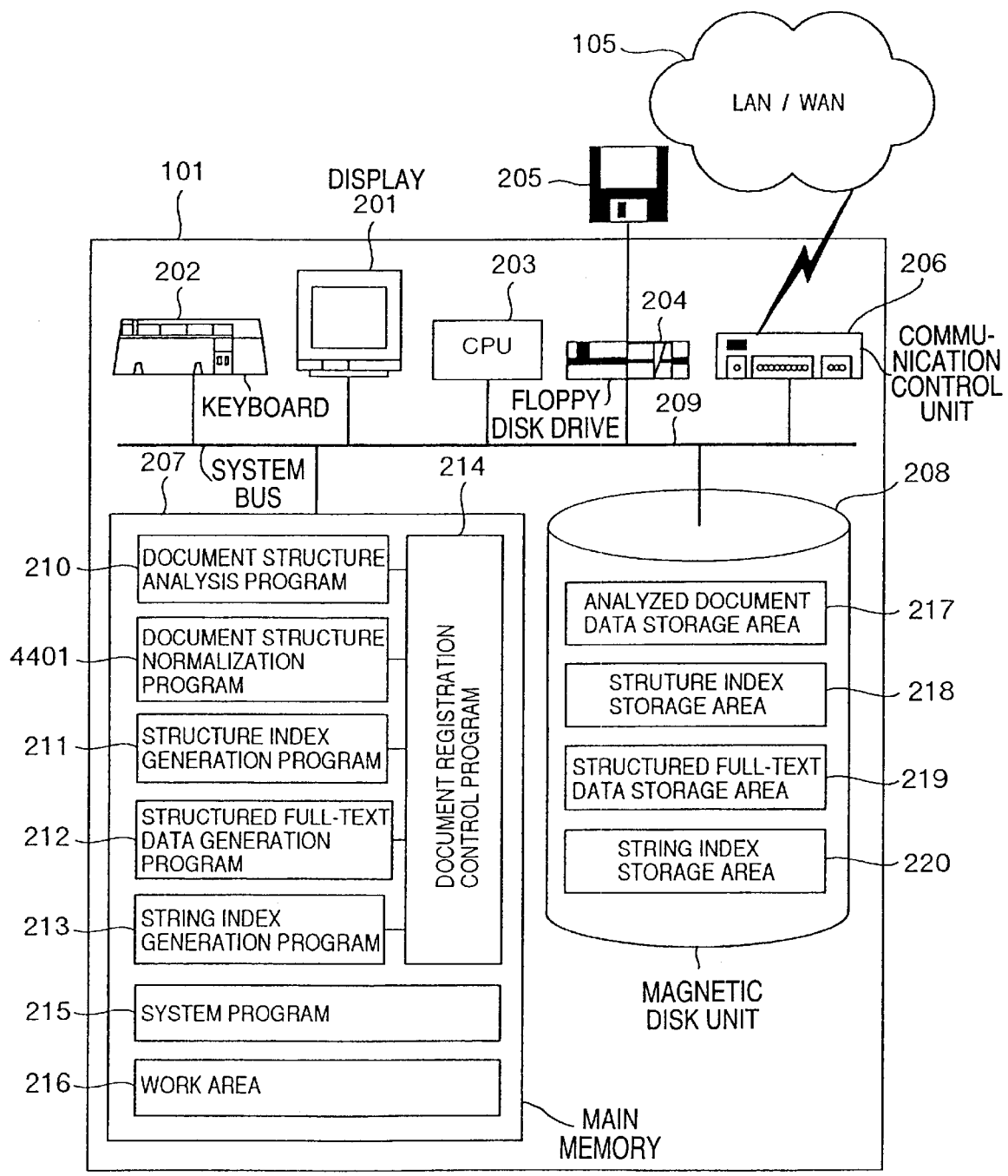
FIG. 44 is a diagram showing a configuration of a document registration subsystem according to the third embodiment of the invention.

FIG. 44 is a diagram showing a configuration of a document registration subsystem 101 according to this embodiment.

The document registration subsystem 101 shown in FIG. 44 remains the same as that of the first embodiment shown in FIG. 2 as far as the hardware configuration and the configuration of the storage areas in the magnetic disk unit 208 are concerned. However, the main memory 207 holds therein a document normalization program 4401 in addition to the program set held in the first embodiment.

According to this embodiment, a document registration control program 214 controls the activation and execution of a document structure analysis program 210, a document structure normalization program 4401, a structure index generation program 211, a structured full-text data generation program 212 and a string index generation program 213, while at the same time transferring the analyzed document data, the structure index and the string index generated by these programs to the document search server 102 through the network 105.

Although this embodiment is configured to read the document to be registered stored in the floppy disk 205 as an input thereto, an alternative configuration is possible in which such documents are read from a magneto-optic disk, a write-once optical disk or the like portable medium. It is also possible to input the document transferred through the network 105. Further, instead of the network 105 used for transferring the analyzed document data, the structure index and the string index generated in this embodiment, a configuration can be employed in which a floppy disk, a magneto-optic disk, a write-once optical disk or the like portable medium is used for transfer. As another alternative, the document registration subsystem 101 and the document search server 102 can be mounted on a single computer for eliminating the data transfer.

Figure 45:
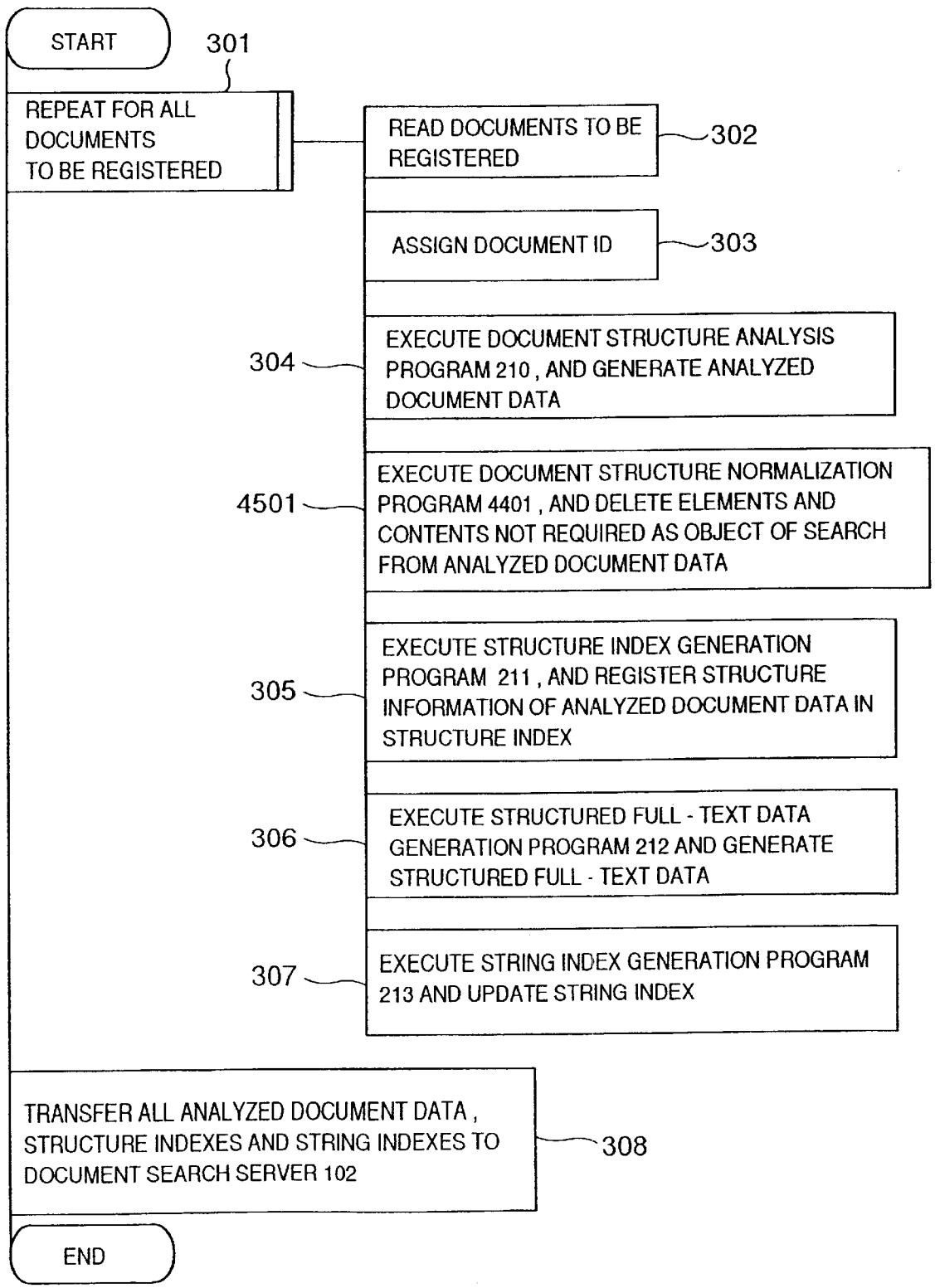
FIG. 45 is a PAD briefly showing the steps of the document registration process according to a fourth embodiment of the invention.

FIG. 45 is a PAD briefly showing the steps of processing the document registration according to the fourth embodiment of the invention. The processing steps shown in FIG. 45 are substantially the same as those of the first embodiment shown in FIG. 3, except that step 4501 is added immediately after step 304 in this embodiment.

In step 4501, the document structure normalization program 4401 is executed in response to application thereto of the analyzed document data generated in step 304. The document structure normalization program 4401 extracts and deletes the structure and the content improper as an object of search from the analyzed document data.

Figure 46:
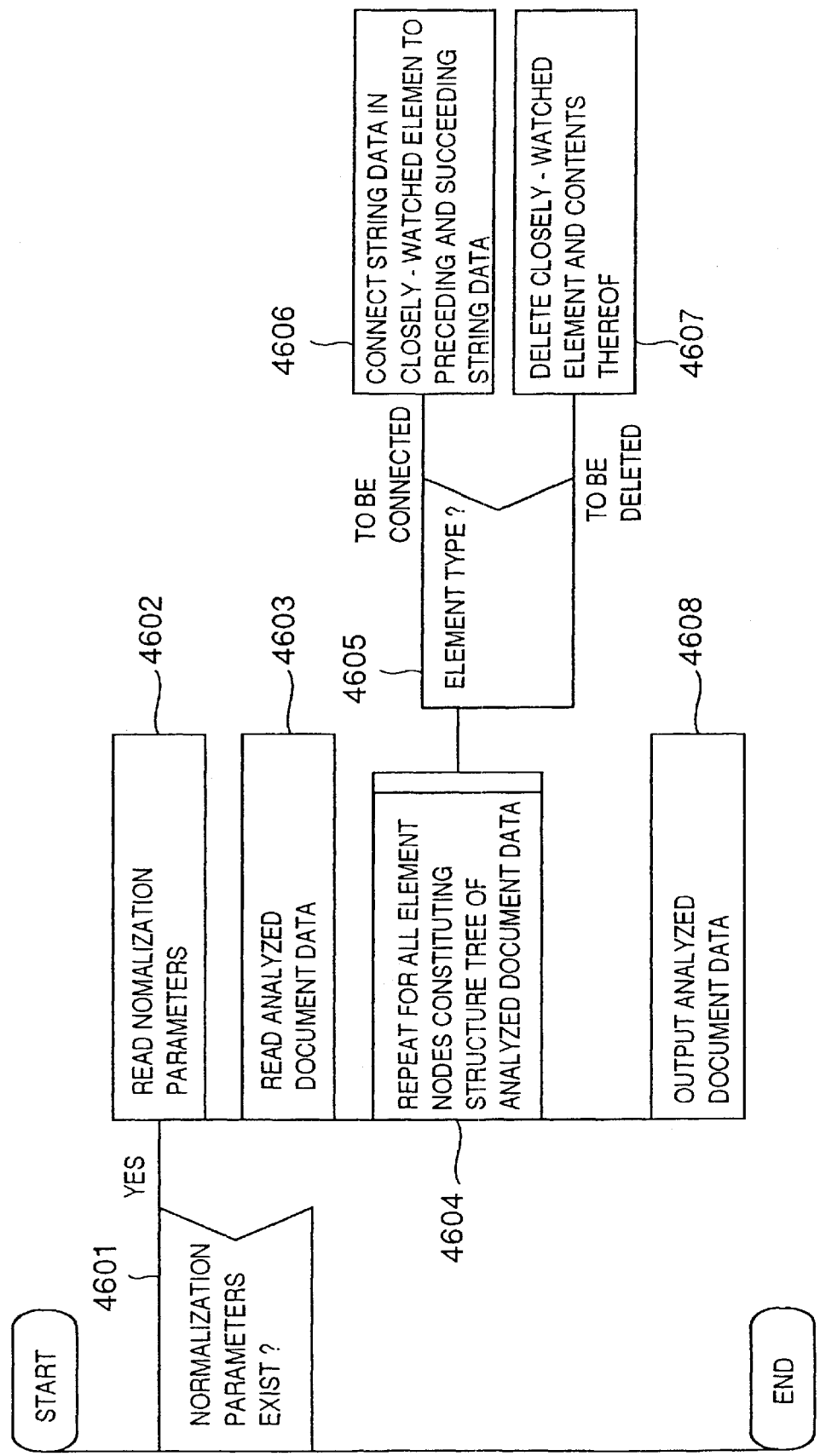
FIG. 46 is a PAD showing the steps of processing in the document structure normalization program according to the fourth embodiment of the invention.

FIG. 46 shows the steps of processing according to the document structure normalization program 4401. Upon activation, this program first checks the presence or absence of the specification of the normalization parameters first in step 4601. In the case where the normalization parameters are specified, the process of steps 4602 to 4608 is executed, while in the case where no normalization parameter is specified, the process is terminated without doing anything.

The normalization parameters are those parameters specifying the element type name of the elements to be connected or the elements to be deleted. The element to be connected is defined as a non-structural element used for displaying a part of a sentence emphatically, and a string is required to be detected over the boundary of this element at the time of search. The element to be deleted, on the other hand, is an element which holds therein data of a type different from the original document content, and the string is detected ignoring this element at the time of search.

An example of the element to be deleted is an element used for burying the link data to a reference in the text.

In step 4602, the specified normalization parameters are read. The normalization parameters are specified by the user inputting them from the keyboard 202 or by being written in a specific file in advance. A plurality of element type names can be specified or none can be specified for the elements to be connected or the elements to be deleted. Then, in step 4603, the analyzed document data are read from the analyzed document data storage area 217.

Next, in step 4604, the structure tree of the analyzed document data is sequentially traced, while repeating the process of steps 4605 to 4607 for all the element nodes. Upon complete processing of all the element nodes, the process proceeds to step 4608.

In step 4605, it is determined what is specified by the normalization parameters for the element nodes currently closely watched. In the case where the element type name of the closely-watched element is specified as an object to be connected, the process proceeds to step 4606, and the element node is deleted while at the same time connecting all the string data included in the element to the string data before and after the particular element. In the case where the element type name of the closely-watched element is specified as an object to be deleted, on the other hand, the process proceeds to step 4607 where all the nodes including and underlying the particular element node are deleted.

After processing of step 4605 and subsequent steps in the above-described manner, the process proceeds to step 4608, where the analyzed document data updated by processing the element set to be normalized are again stored in the analyzed document data storage area 217.

Figure 47:
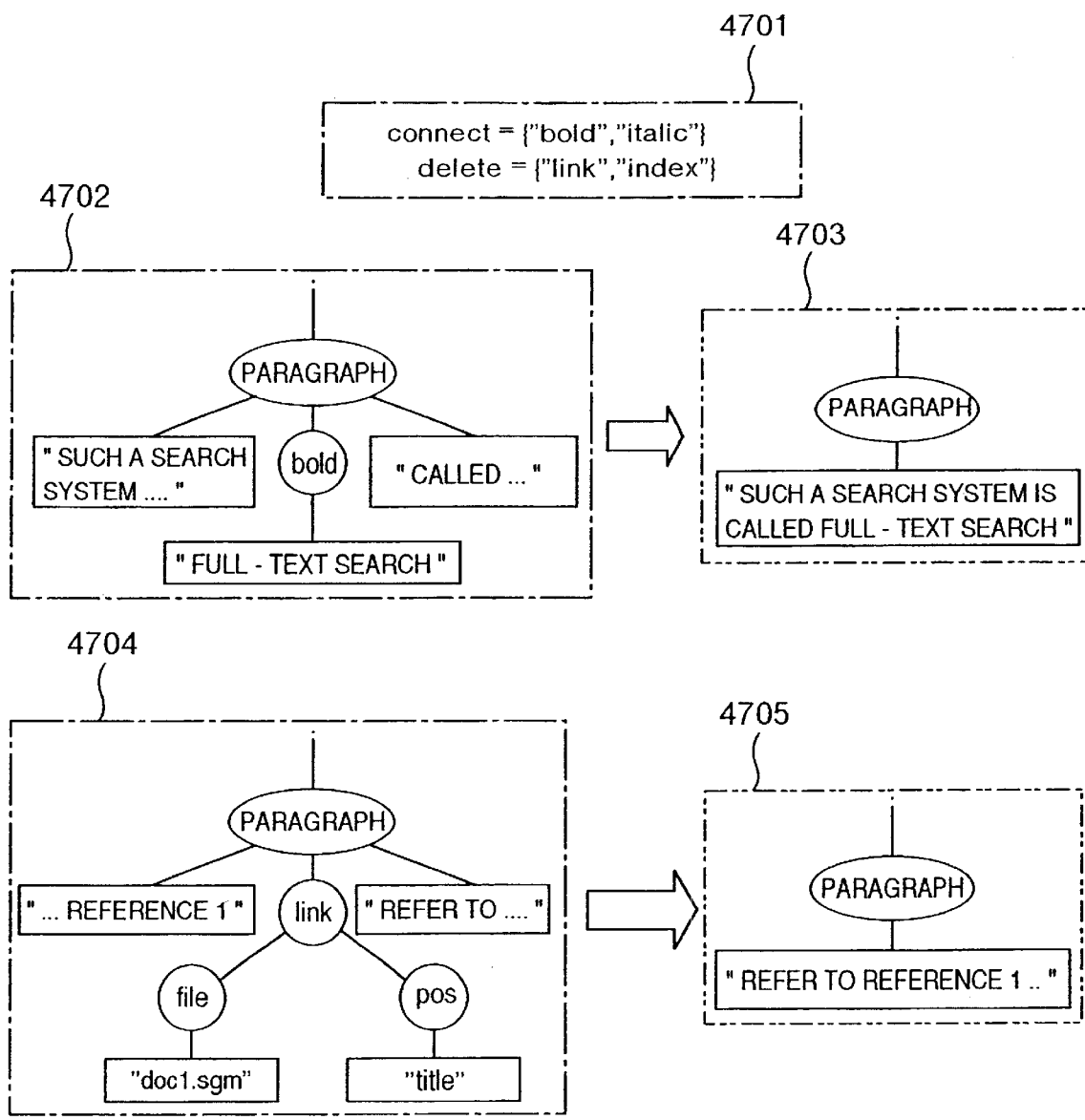
FIG. 47 is a diagram showing a specific example of the normalization process according to the fourth embodiment of the invention.

FIG. 47 is a diagram showing a specific example of the normalization process.

In FIG. 47, numeral 4701 designates an example of a normalization parameter. In this case, two element type names, "bold" and "italic", are specified for the elements to be connected, and two element type names, "link" and "index", are specified for the elements to be deleted. In the case where the analyzed document data contains a portion having a structure as shown by 4702, the connection process shown in step 4606 is executed for the element "bold", resulting in the structure shown by 4703. In the case where the analyzed document data has a portion having a structure as shown in 4704, on the other hand, the deletion process shown in step 4607 is executed for the element "link", resulting in the structure shown in 4705.

According to this embodiment, the analyzed document data are registered in the structure index and otherwise processed after being normalized as described above. The text can be searched, therefore, without interference from the non-structural elements contained in the document to be registered.

Even in the case where the normalization process according to this embodiment is employed, like in the second embodiment, a structure specification is possible, in which the order of occurrence is followed in reverse way from the end, by providing two structure indexes, the first-come first-served basis and the last-come first-served basis.

The foregoing is the description of the fourth embodiment.

(5) Fifth Embodiment

A fifth embodiment of the present invention will be explained with reference to the drawings.

Figure 48:
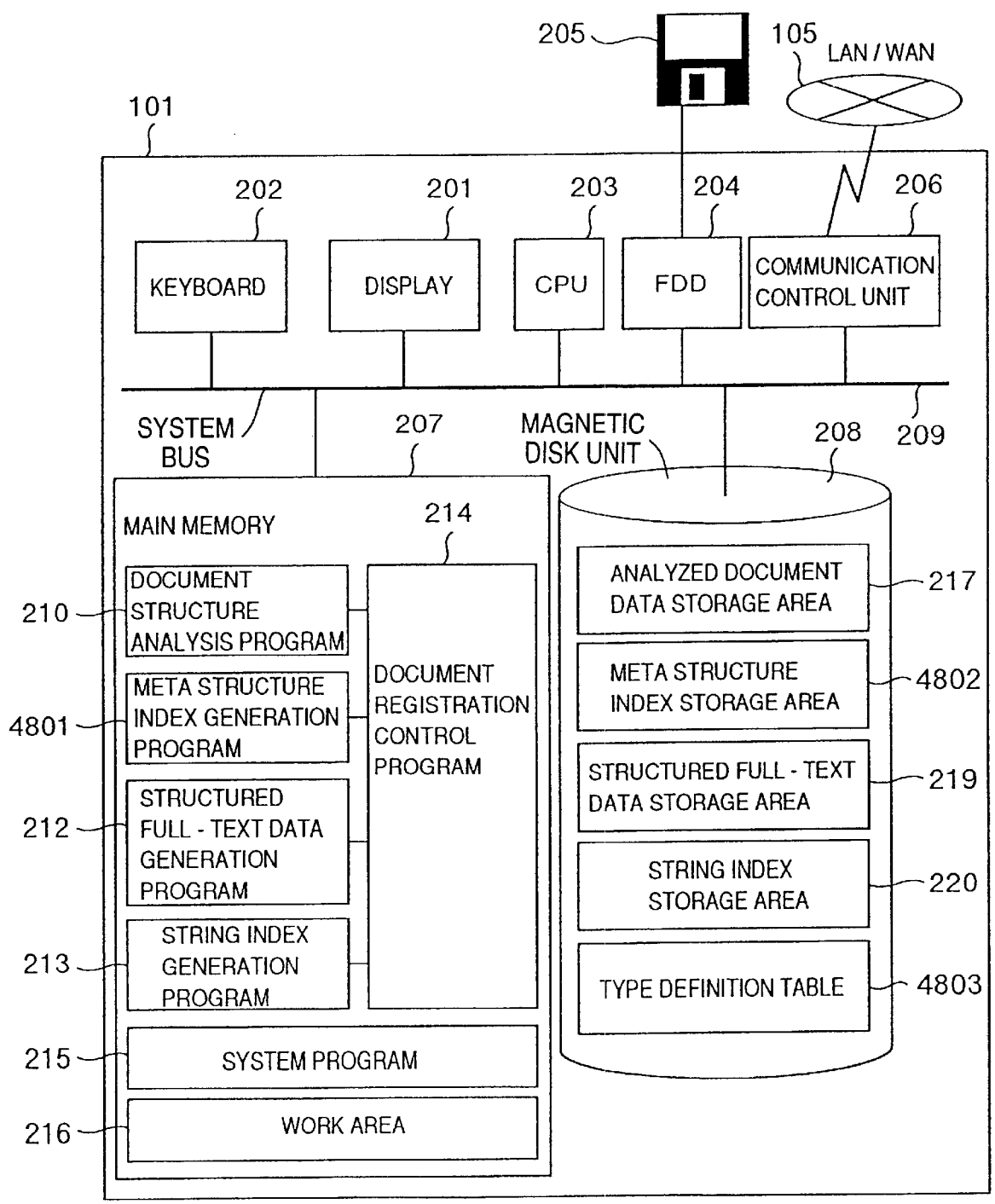
FIG. 48 is a diagram showing a configuration of a document registration subsystem according to the fifth embodiment of the invention.

FIG. 48 is a diagram showing a configuration of the document registration subsystem 101 according to this embodiment.

The hardware configuration of this subsystem is the same as that of the document registration subsystem 101 according to the first embodiment shown in FIG. 2. The difference, however, lies in that the structure index generation program 211 constituting one of the document registration programs stored in the main memory 207 is replaced by a meta structure index generation program 4801. Further, the magnetic disk unit 208 has a meta structure index storage area 4802 in place of the structure index storage area 218 and has added thereto an type definition table storage area 4803.

The meta structure index generation program 4801 is supplied with the analyzed document data 217 which is the output result of the document structure analysis program 210 and outputs a meta structure index for collectively managing all the document elements of the registered documents having various structures.

Figure 49:
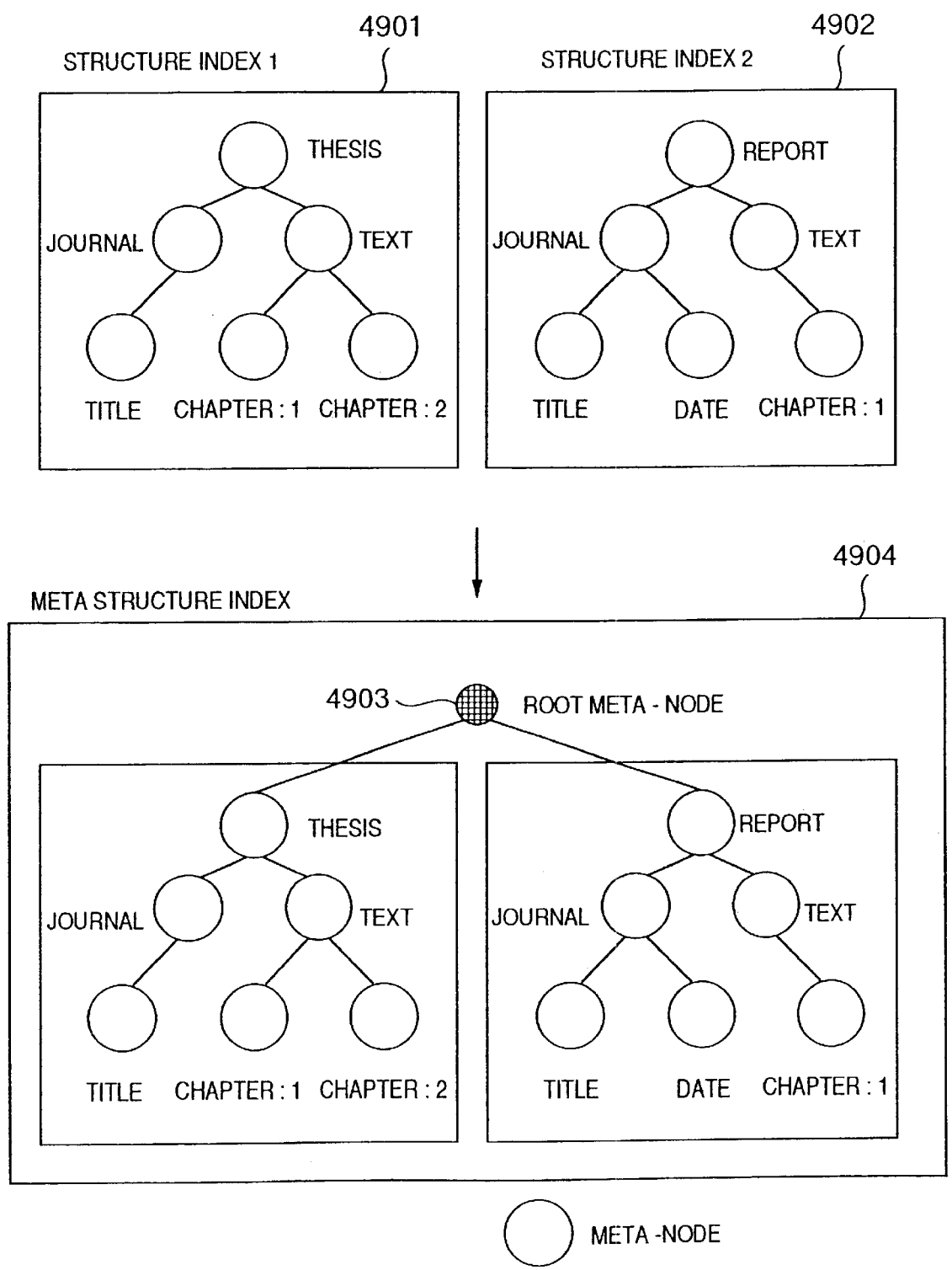
FIG. 49 is a diagram showing an example of generating a meta structure index according to the fifth embodiment of the invention.

FIG. 49 shows an example of the meta structure index. In FIG. 49, the structure index 1 (4901) having a base document element of the type "thesis" and the structure index 2 (4902) having a base document element of the type "report" are combined into a single structure tree by a root meta-node 4903. This structure tree is called a meta structure index 4904.

Specifically, the structure index is generated by superposing the elements of the registered documents having the same type of the base document element, and therefore it is generated for each registered document set having the same type of base document element. The meta structure index, in contrast, is such that different base document elements of structure indexes are combined into a single index by connecting them to a single root meta-node.

The root meta-node is a provisional containing element for combining the base document elements of a plurality of structure indexes. In other words, the root meta-node exists for tracing a plurality of structure indexes from it, and no element corresponding to the root meta-node exists in the registered document.

The root meta-node, like the element meta-node of the structure index, has information on the number of the base document elements of a plurality of structure indexes constituting subelements and the link to each structure index.

The meta structure indexes are stored in the meta structure index storage area 4802.

Now, the type definition table 4803 will be explained.

The type definition table is a table for defining the correspondence between the element type name attached to each element of the structured document and the type indicating the meaning of the element type name. This type definition table is generated by the user with a text editor from the keyboard 202 or otherwise and stored in the magnetic disk unit 208 in advance.

FIG. 50 is a diagram showing the contents of the type definition table 4803. The type is a name representing the element type names having the same meaning in spite of different expressions such as "thesis" and "paper". The type definition table manages the types attached to a plurality of element type names, and the elements having element type names defined as the same type in this table are determined to have the same type.

As shown in FIG. 50, the type definition table stores three information including the type 5001, the number of element type names 5002 and the element type name 5003. The type 5001 is a common type to which a plurality of element type names belong. The number of element type names 5002 is the one for each type. Further, the element type name 5003 lists as many specific element type names as specified.

By referring to this table, the type information can be obtained from the element type name. Conversely, the element type name can be obtained from the type. The element type name not described in this table is used directly as the type thereof.

According to this embodiment, the type and the element type name described in the type definition table 4803 meets the one-to-many correspondence. In other words, the element type name "journal" uniquely has one type. This is by reason of the fact that the type definition table is generated for each meta structure index, and each meta-node of the meta structure index is discriminated by the type and the position of occurrence. Unless the type is determined uniquely by the element type name, it is impossible to determine which of a plurality of types obtained from the element type name is to be used in generating the structure index.

Figure 51:
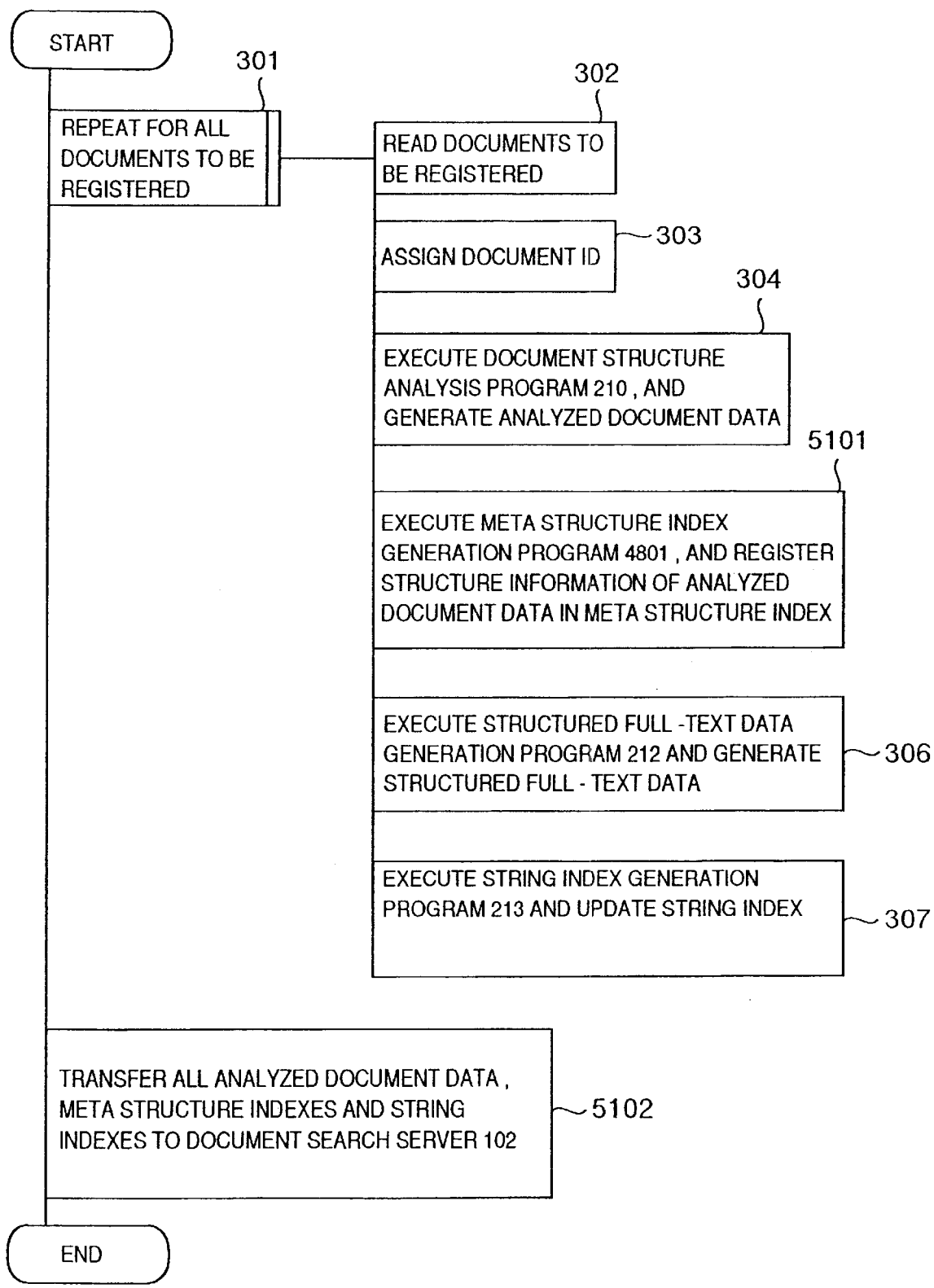
FIG. 51 is a PAD briefly showing the steps of the document registration process according to the fifth embodiment of the invention.

FIG. 51 is a PAD briefly showing the steps of processing the document registration according to this embodiment. The steps shown in FIG. 51 are substantially the same as those for the registration process in the first embodiment of FIG. 3. The difference, however, lies in that step 5101 is executed instead of step 305 in FIG. 3, and that step 5102 is executed instead of step 308.

In step 5101, the meta structure index generation program 4801 is accessed. According to the meta structure index generation program 4801, the meta structure index in registration is read from the meta structure index storage area 4802, the structure information held in the analyzed document data obtained in step 304 are registered in the meta structure index, and the updated meta structure index is stored in the meta structure index storage area 4802.

In step 5102, the analyzed document data 217 of all the registered documents, the updated meta structure index 4804 and the string index 220 are transferred to the document search server 102.

Figure 52:
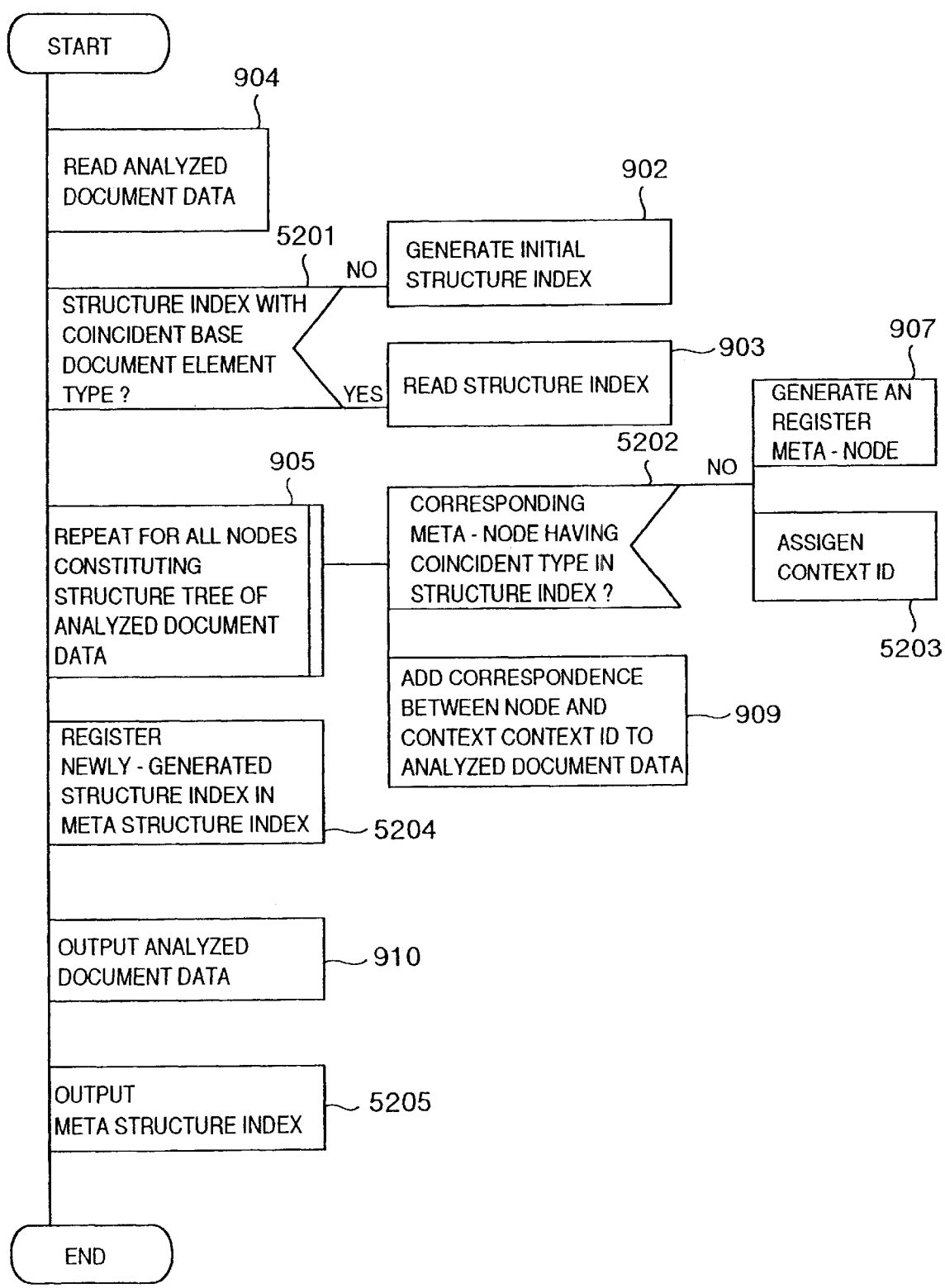
FIG. 52 is a PAD briefly showing the steps of process for generating a meta structure index according to the fifth embodiment of the invention.

FIG. 52 is a PAD showing the detail of the process for generating the meta structure index in step 5101. This process is substantially the same as the process of the structure index generation program in the first embodiment shown in FIG. 9, except that the data are registered in the meta structure index, resulting in the following-described difference from FIG. 9.

First, the analyzed document data are read in step 904.

Then, step 5201 is executed instead of step 901. Step 901 determines the presence or absence of the structure index itself, while step 5201 checks whether there exists a structure index coincident with the base document element of the registered document in the meta structure index, on the assumption that that the structure index is a part of the metal structure index and is generated for each type of the base document element.

Step 904 is executed before step 5201 by reason of the fact that this process requires information on the base document element of the registered document. In the absence of a structure index having a coincident type of the base document element, step 902 is executed for generating a new initial structure index. In the presence of such a structure index, on the other hand, step 903 is executed of read the structure index. Also, in this step, the element type name of the base document element of the registered document is converted to the type with reference to the type definition table 4803 before type comparison.

Further, step 5202 is executed instead of step 906. In step 5202, the identifier name of the analyzed document data is converted into the type with reference to the type definition table 4803, after which the structure index is checked for the presence or absence of the corresponding meta-node by executing the same process as step 906 described above with reference to FIG. 11.

Further, step 5203 is executed instead of step 908. In step 5203 for assigning a context identifier, the whole meta structure index is assigned a context identifier which can identify the meta-node uniquely. In the structured full-text data generation program 212, therefore, the context identifier attached to the text string of each structure is used to determine the meta-nodes in the meta structure index uniquely. This function can be realized by adding the identification information of the structure index to a context identifier in addition to the process of step 908.

Further, step 5204 is executed after the repetition process of step 905.

Assume that the structure index is newly generated in step 902. In step 5204, the meta-node of the base document element of the structure index newly generated is connected to the root meta-node of the meta structure index, and the newly generated structure index is incorporated in the meta structure index.

Further, step 5205 is executed instead of step 911. In step 5205, the meta structure index generated is stored in the meta structure index storage area 4802.

The process of other steps is the same as that described above with reference to FIG. 9.

Figure 53:
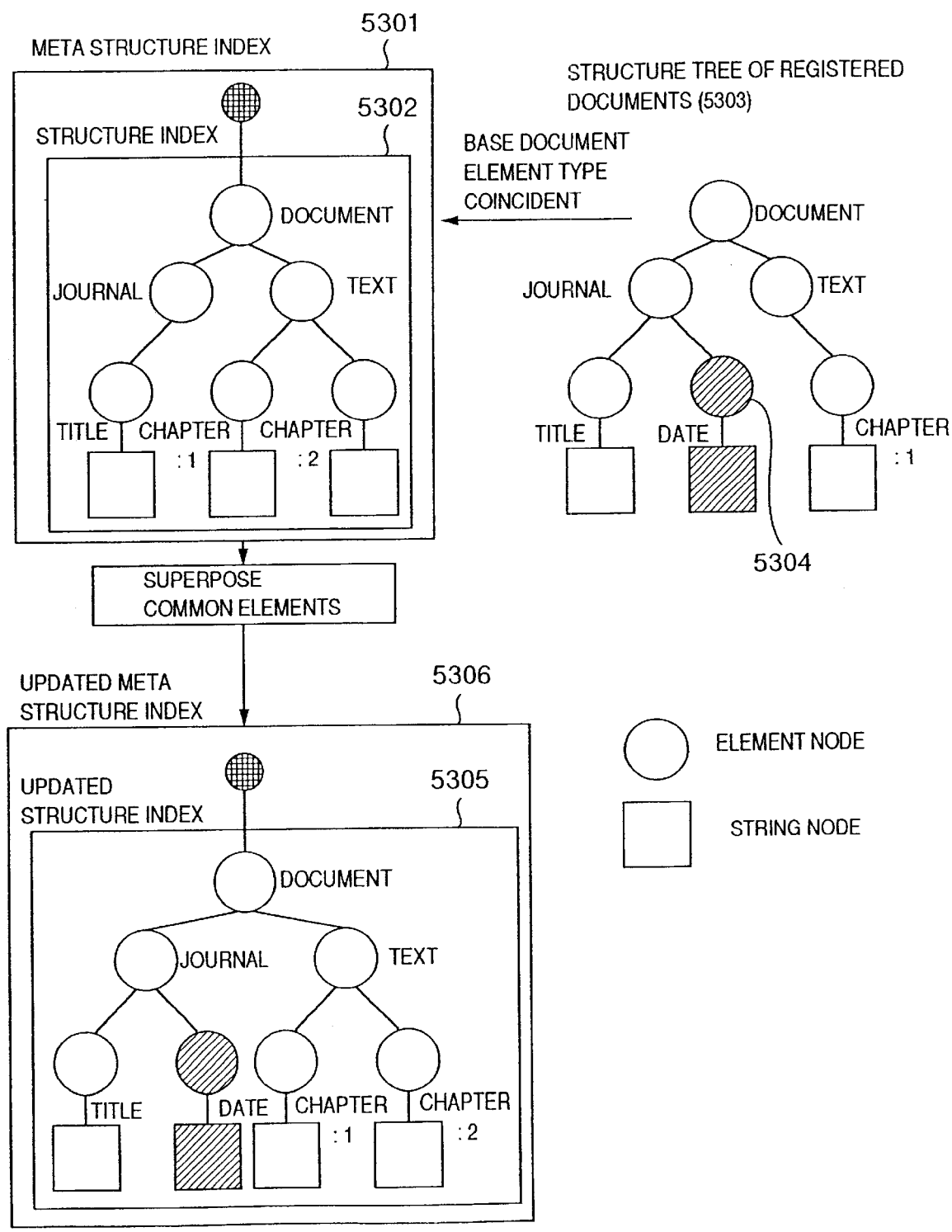
FIG. 53 is a diagram showing a first example of the process for updating the meta structure index according to the fifth embodiment of the invention.
Figure 54:
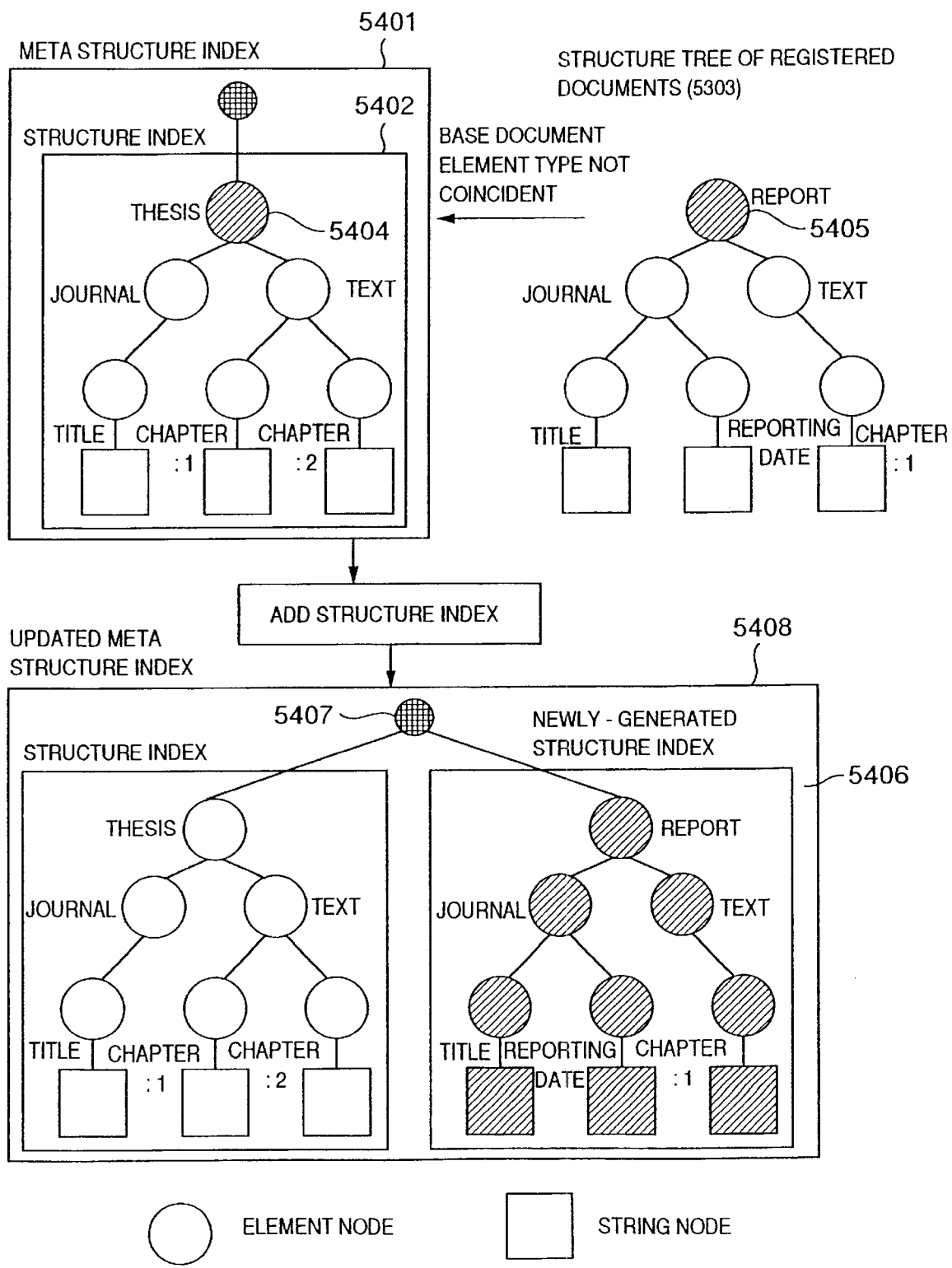
FIG. 54 is a diagram showing a second example of the process for updating the meta structure index according to the fifth embodiment of the invention.

FIGS. 53 and 54 show an example of the meta structure index generated in step 5101. FIG. 53 shows an example of the case in which structure indexes having the same type of the base document element are present. FIG. 54 shows an example of the case in which no structure index has a coincident type of the base document element.

In FIG. 53, first, the structure index 5302 existing in the meta structure index 5301 is compared with the structure tree 5303 of the structure analysis result of the registered document. In this case, the structure index 5302 exists which has the base document element coincident with "document" which is the base document element of the registered document, and therefore the structure tree 5302 of the registered document is superposed on the structure index 5302. In this case, in the presence of the "date" node 5304 in the structure index 5302, the "date" node is added to the structure index 5302, thereby generating an updated structure index 5305. With the updating of the structure index, the meta structure index 5301 is also updated (5306).

In FIG. 54, first, the structure index 5402 existing in the meta structure index 5401 is compared with the structure tree 5403 of the structure analysis result of the registered document. In this case, the only base document element of the structure index in the meta structure index is "thesis" (5404), and there exists no structure index having a base document element coincident with the "report" (5405) which is the base document element of the registered document. As a result, a structure index 5406 is newly generated which has the same structure as the structure tree of the registered document. Further, the structure index 5406 is added to the meta structure index by connecting the structure index 5406 generated to the root meta-node 5407. With the addition of the structure index, the meta structure index 5401 is updated (5408).

As described above, in the case where a structure index having a coincident base document element exists, this structure index is superposed, while in the absence of such a structure index, a structure index is newly generated and connected to the root meta-node thereby to update the meta structure index.

The document registration subsystem 101 according to this embodiment is different from the document registration subsystem according to the first embodiment in the point described above, and the configuration of the other parts and the processing specifics remain the same.

Now, a document search server according to the fifth embodiment, i.e. the component part 102 of FIG. 1 will be described.

Figure 55:
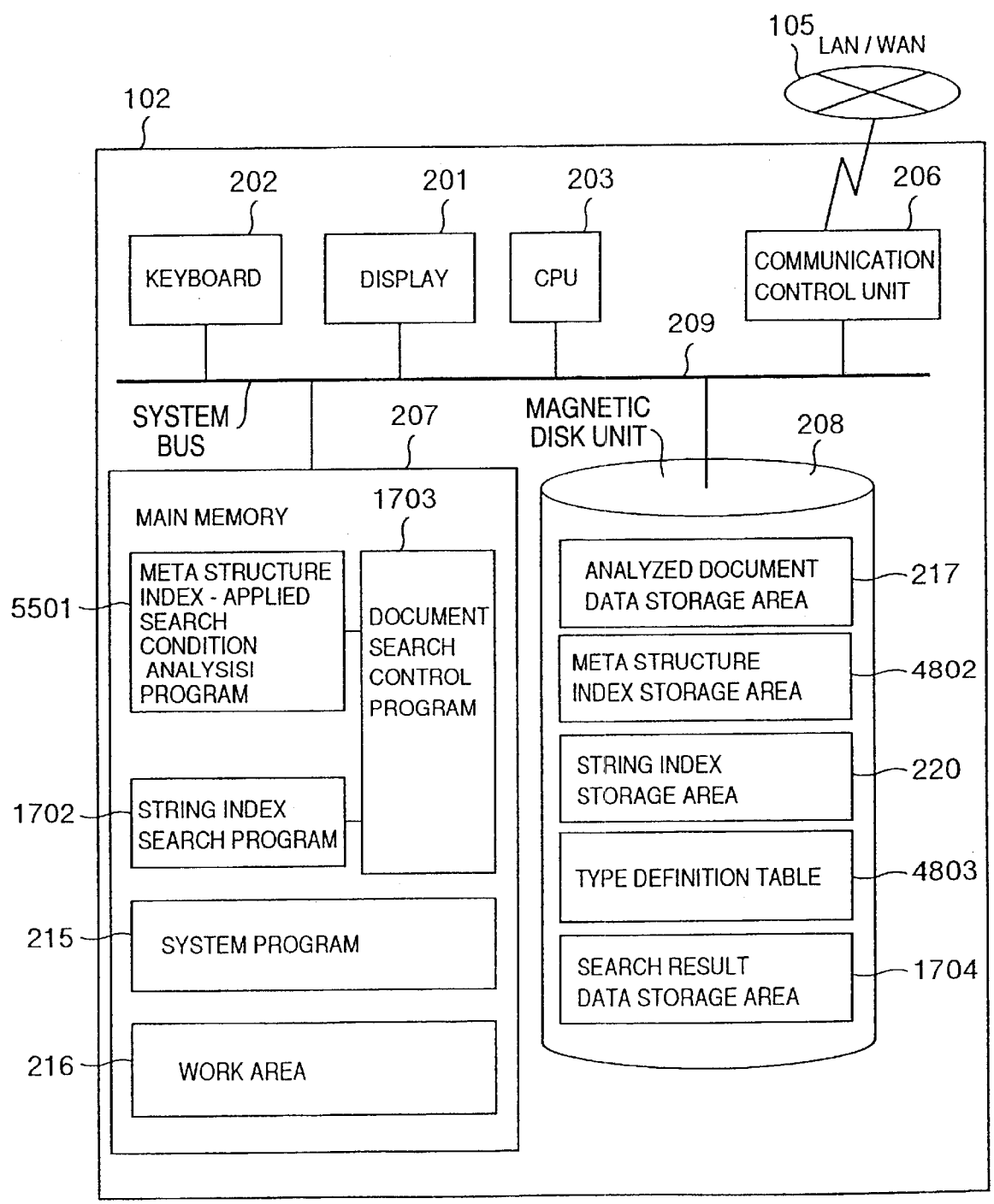
FIG. 55 is a diagram showing a configuration of a document search server according to the fifth embodiment of the invention.

FIG. 55 is a diagram showing a configuration of the document search server 102 according to this embodiment. This system has the same configuration as that of the document search server 102 according to the first embodiment shown in FIG. 17 as far as the hardware configuration is concerned.

The difference, however, lies in that the search condition analysis program 1701 among the document search processing programs stored in the main memory 207 is replaced by a meta structure index-applied search condition analysis program 5501, a meta index storage area 4802 is generated in place of the structure index storage area 218, and the type definition table storage area 4803 is added to the magnetic disk unit 208.

The meta structure index-applied search condition analysis program 5501 analyzes the search condition formula contained in the search request received from the search clients 103 and 104 and translates it into a condition specification capable of being directly searched by the string index search program 1702. Unlike the search condition analysis program 1701 which analyzes the search condition formula using the structure index, the meta structure index-applied search condition analysis program 5501 analyzes the search condition formula utilizing the meta structure index and the type definition table.

Also, the meta structure index generated in the document registration subsystem 101 described above according to this embodiment is stored in the meta structure index storage area 4802. The type definition table 4803 has the same content as the type definition table registered in the document registration subsystem 101 by the user.

Figure 56:
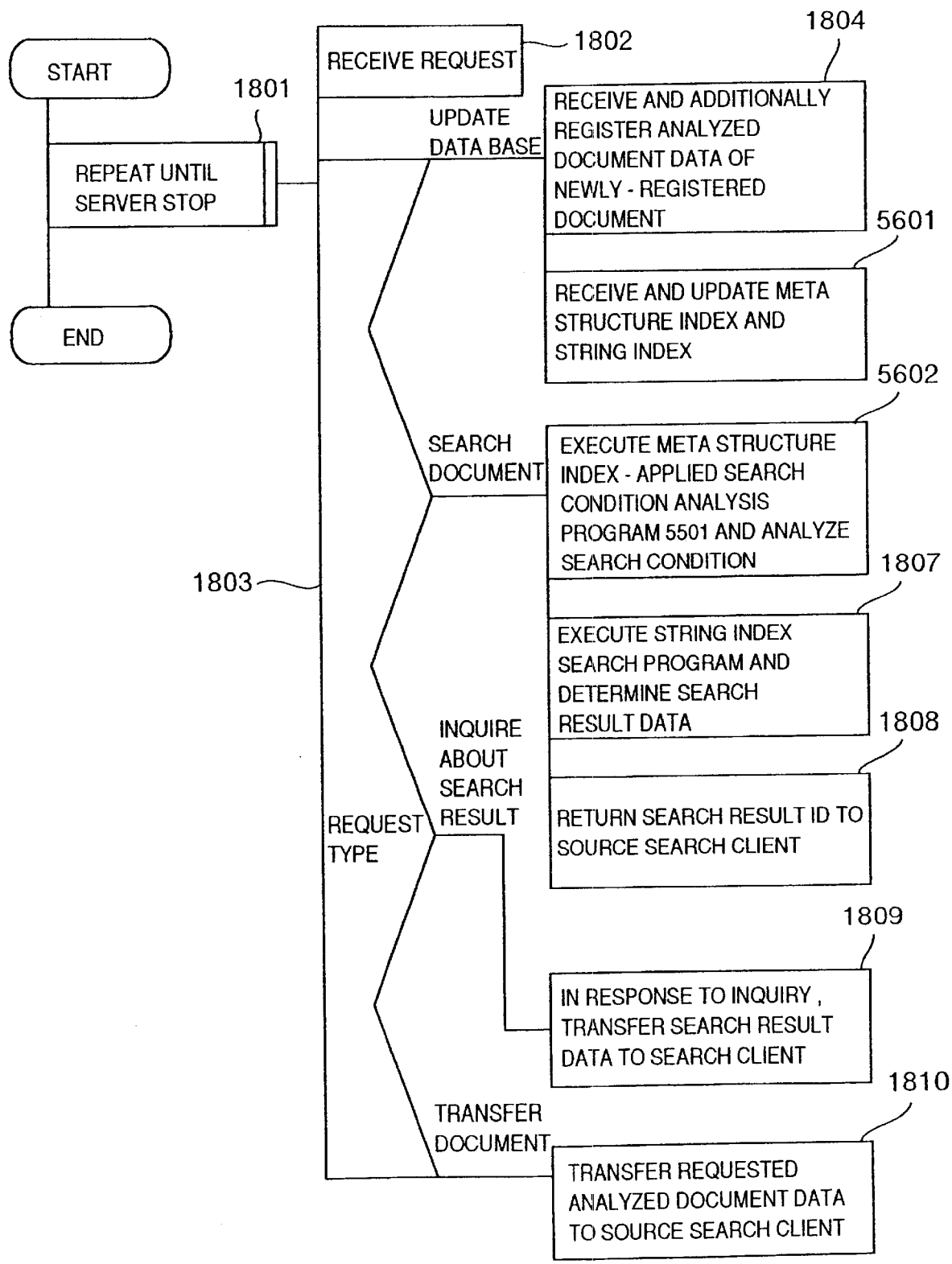
FIG. 56 is a PAD briefly showing the steps of the document search process according to the fifth embodiment of the invention.

FIG. 56 is a PAD briefly showing the steps of processing the search server according to this embodiment. The steps of FIG. 56 are substantially the same as those of the search server according to the first embodiment of FIG. 18. The only difference lies in that step 5601 is executed instead of step 1805 and that step 5602 is executed instead of step 1806.

In step 5601, the meta structure index and the string index are received from the document registration subsystem 101 and stored in the meta structure index storage area 4802 and the string index storage area 220. The meta structure index and the string index are updated in accordance with the contents of the document set newly and additionally registered in step 1804.

In step 5602, the meta structure index-applied search program analysis program 5501 is executed, the search program specified in the document search request is analyzed, and the search program is converted into a condition specification (hereinafter referred to as the expanded search condition data) capable of being directly processed by the string index search program 1702.

The other aspects of the process of the steps is the same as the process described with reference to FIG. 18 in the first embodiment.

Figure 57:
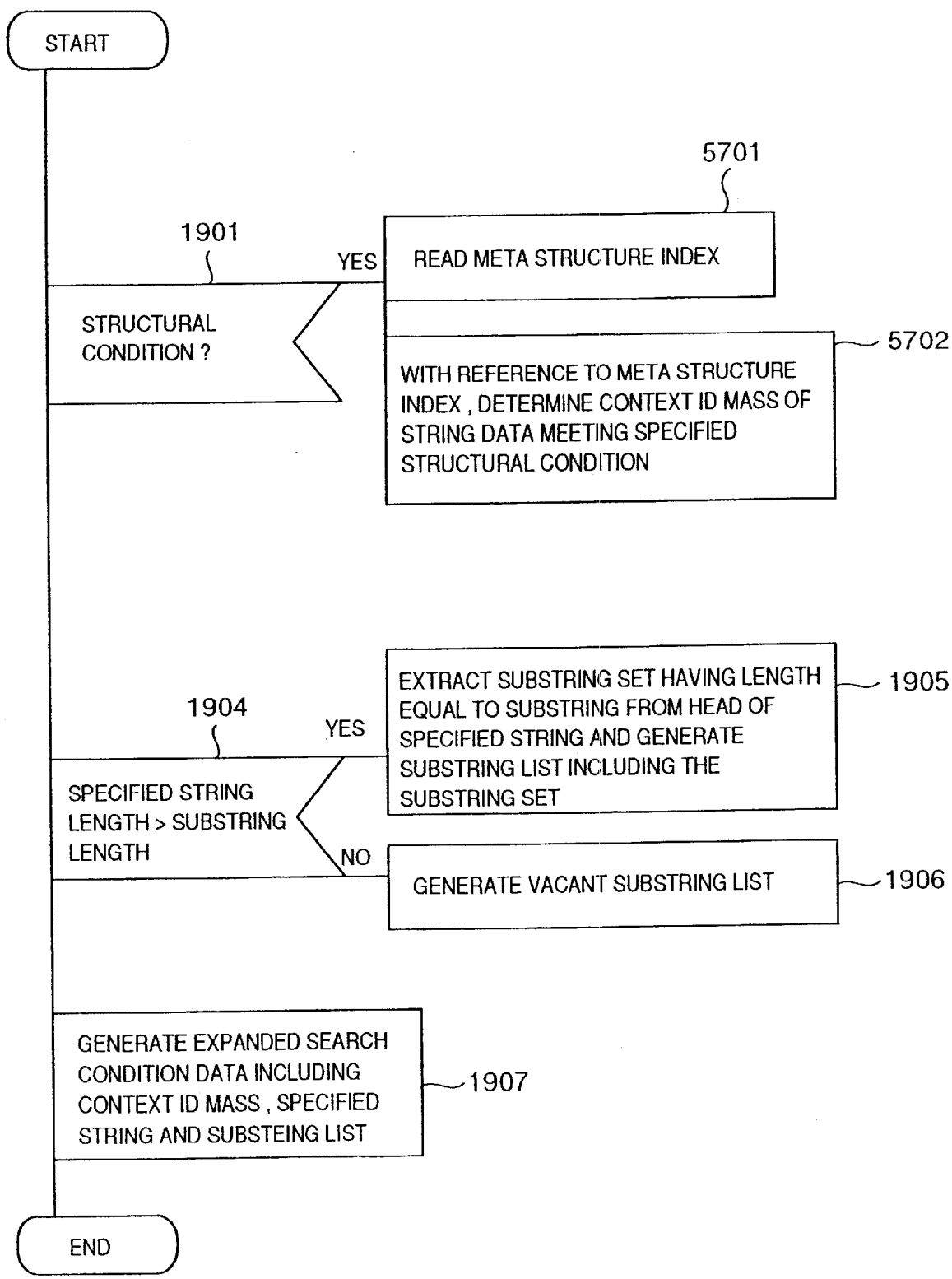
FIG. 57 is a PAD showing the steps of processing in a meta structure index-applied search condition analysis program according to the fifth embodiment of the invention.

FIG. 57 is a PAD showing the detail of step 5602 in FIG. 56, i.e. the steps of processing the meta structure index-applied search program analysis program 5501 according to this embodiment. This PAD is substantially the same as the PAD showing the steps of processing the search condition analysis program 1701 of the first embodiment shown in FIG. 19. The difference lies in that step 5701 is executed in place of step 1902 in FIG. 19 and step 5702 is executed in place of step 1903.

In step 5701, the meta structure index is read from the meta structure index storage area 4802.

Then in step 5702, a mass of the context identifiers of all the string data contained in the structure meeting the above-mentioned structural condition is determined with reference to the meta structure index. In the case where the structural condition is specified by the search condition and the element type, the context identifier of the string data contained in the structure meeting the structural condition can be obtained by directly tracing the meta structure index. In the case where it is specified by element type name, on the other hand, it is converted into the type with reference to the type definition table 4803, and then tracing the meta structure index, the context identifier of the string data contained in the structure meeting the structural condition is obtained.

The base document element of the meta structure index is the root meta-node connecting the base document elements of the document, and therefore has no corresponding structural condition.

The other steps are the same as those described above with reference to FIG. 19 in the first embodiment.

FIG. 58 is a diagram showing an example of generating the expanded analysis condition data in the processing of the meta structure index-applied search condition analysis program 5501.

In FIG. 58, numeral 5801 designates an example of the search condition specified in the document search request. The search condition 5801 is configured of the structural condition specification "thesis/journal/title" and the string condition specification "ガード". The search condition specifies that the case should be searched for in which the string "ガード" occurs in the "title" element directly underlying the "journal" element which in turn is directly underlying the "thesis" element.

Now, an explanation will be given of the case in which the type is specified for the structural condition. In the case where the element type name is specified, the process described below is executed after converting it into the type with reference to the type definition table 4803.

Further, in view of the fact that the structural condition is specified as a mix of the element type name and the type, the identification information such as "Type" is added before the structural condition for the type. As a result, in steps 2702 and 2703 described with reference to FIG. 27 according to the first embodiment, the search clients 103, 104 add the identification information to the user command and the document search request. In spite of this addition, however, the meta structure index has only the type information, and therefore it is not always possible to obtain the context identifier of the string data contained in the structure meeting the structural condition from the metal structure index from the element type name.

Assume that the content of the meta structure index is as designated by 5802. In step 5702, the context identifier of the "title" element meeting the specification of the structural condition is found to be E3 by reference to the structural index. It is thus seen that the case should be searched for, in which the string "ガード" occurs in the string data underlying this paragraph, i.e. in the string data with the context identifier of C1. Since the position of occurrence of only the substrings of length 2 is registered in the string index used for search, however, the specified string having three characters cannot be directly searched. In step 1905, therefore, the specified string is decomposed and a list of a substring of length 2 is generated.

In the case where the specified string is "ガード" described above, the extracted substrings are "ガー" and "ード". As a result, in step 1907, the data is generated which has the expanded search condition data shown in 5803, i.e. the context identifier mass is {C1}, the specified string is "ガード" and the substring list is {"ガー", "ード"}.

As described above, with the configuration according to this embodiment, a document having a plurality of elements can be searched at a time. Also, a structural condition specifying the type and the element type name can be included in the query.

The foregoing is the description of the fifth embodiment of the invention.

(6) Sixth Embodiment

Now, a sixth embodiment of the invention will be explained with reference to the drawings.

The sixth embodiment is different from the fifth embodiment in that the document registration does not use the type definition table, but a meta structure index is generated using the element type name directly as the element type, and the search process is conducted by converting the structure-specified search condition including the structural condition using the type to the structural condition with a specified element type name. As a result, either the structural condition based on the type or the structural condition based on the element type name can be specified.

The system configuration of the document registration subsystem 101 according to this embodiment is the same as that of the document registration subsystem 101 according to the fifth embodiment shown in FIG. 48.

In the meta structure index generation program 4801 according to the fifth embodiment shown in FIG. 48, however, the processing in steps 5201 and 5202 described with reference to FIG. 52 is partially changed. Specifically, in steps 5201 and 5202, the conversion of the element type name to the type with reference to the type definition table 4803 is eliminated, and the element type name itself is regarded as the type for registration in the structure index. Nevertheless, the type definition table 4803 is still generated and the transfer to the search server remains the same.

The foregoing is the difference between the document registration subsystem 101 of the sixth embodiment and the document registration subsystem according to the fifth embodiment. The configuration of the other parts and the other processing steps remain the same.

The system configuration of the document search server 102 according to this embodiment is also identical to that shown in FIG. 55.

However, that part of the meta structure index generation program 5501 according to the fifth embodiment shown in FIG. 55 which relates to the process of step 5702 described with reference to FIG. 57 is partly changed.

Specifically, in step 5702, in the case where the structural condition is specified in the search condition based on the element type, all the element type names corresponding to the type are acquired with reference to the type definition table 4803, so that the structural condition is changed to the one generated by ORing the element type names thus obtained. By tracing the meta structure index, it is possible to obtain the context identifier of the string data contained in the structure meeting the structural condition generated. In the case of specification by element type name, on the other hand, the meta structure index is directly traced to acquire the context identifier of the string data contained in the element (structure) meeting the structural condition.

Figure 59:
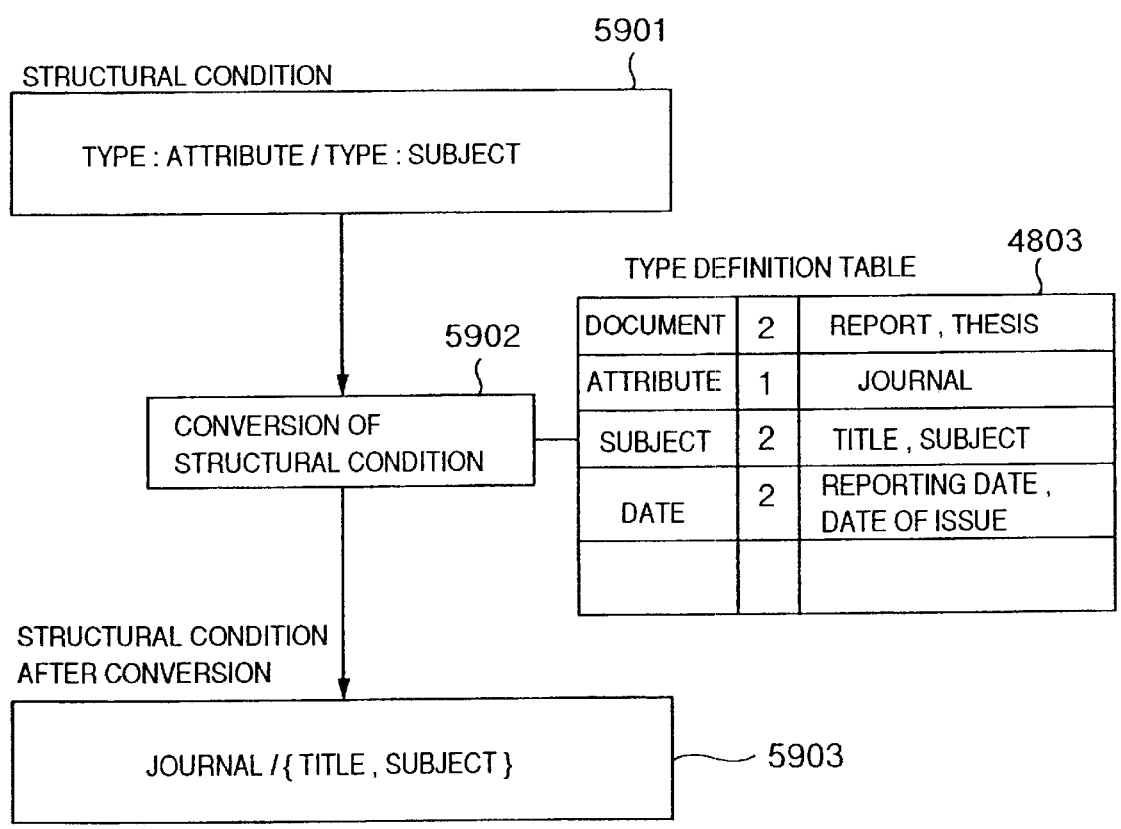
FIG. 59 is a diagram showing an example of structure condition conversion according to a sixth embodiment of the invention.

FIG. 59 shows the structural condition generated by changing the type, by which the structural condition may be specified, to the element type name in step 5702 of this embodiment. As shown in FIG. 59, the element type name is acquired for each type configuring the structural condition, so that the structural condition is generated in which each hierarchical level is described by the logic sum (OR) of one or a plurality of element type names. The logic sum of a plurality of element type names is specified by listing a plurality of types or element type names in "{ }" such as "{type or element type name, type or element type name, . . . }".

When the user specifies the search condition by type, he describes the identification information such as "Type:" before the type name, and with the particular name as the type, changes it to the element type name. If the query is described without specifying anything, it is determined as the element type name and the context identifier of a suitable structure is acquired from the structure index using the structural condition as it is. As an alternative, if the type is the one lacking the element type name identical to it, the identification specification such as "Type:" can be done without in the absence of ambiguity.

In FIG. 59, the structural condition (5901) "Type: attribute/Type: Subject" is converted to the structural condition (5903) using the element type name with reference to the type definition table 4803 by the process (5902) for changing the structural condition.

The difference of the search clients 103, 104 is as described above with reference to FIG. 58 in the fifth embodiment. According to the present embodiment, on the other hand, the structural condition specifying the element type name can acquire the context identifier of the string data in the structure having a coincident element type name, while the structural condition specifying the type can acquire the context identifier of the string data in the structure having a coincident type.

According to this embodiment, the foregoing process makes it possible to incorporate both the structural condition based on the type and the structural condition based on the element type name in the search condition.

Further, the advantage of the method of the present embodiment as compared with the method of the fifth embodiment resides in that the type can be arbitrarily changed in the structure index since a meta-node is generated for each element type name. For example, after the type definition table is generated for each client and transferred to the search server, a search condition specifying the type definition table can be set, thereby realizing a versatile type setting. According to the fifth embodiment, to keep up with the change of the type definition table, the meta structure index and the string index generated up to the time point of change are required to be generated again.

The disadvantage of the method according to the fifth embodiment as compared with the fifth embodiment is the large size of the meta structure index generated. In the meta structure index, the number of meta-nodes can be reduced more by generating a meta-node for each type than by generating it for each element type name.

The foregoing is the description of the sixth embodiment of the invention.

(7) Seventh Embodiment

Now, an explanation will be given of a system configuration and the processing steps according to a seventh embodiment in which a set of documents having different document elements are subjected to structure-specified search using a single structure index without using the meta structure index.

Figure 60:
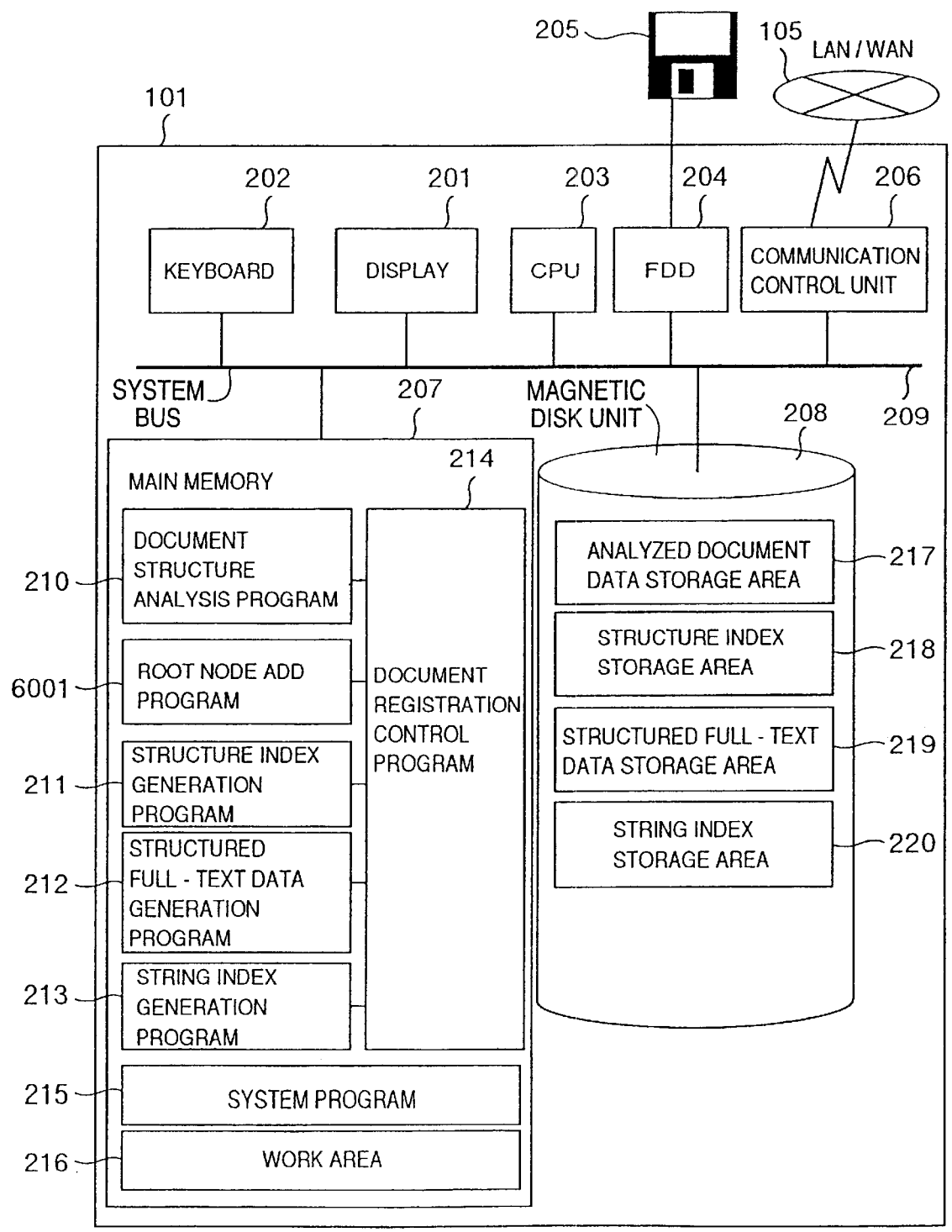
FIG. 60 is a diagram showing a configuration of a document registration subsystem according to a seventh embodiment of the invention.

FIG. 60 shows a system configuration of the document registration subsystem 101 according to this embodiment. This system configuration remains unchanged from that of the document registration subsystem 101 according to the first embodiment shown in FIG. 2 as far as the hardware configuration is concerned, except that a root node add program 6001 is added to the document registration program stored in the main memory 207.

Figure 61:
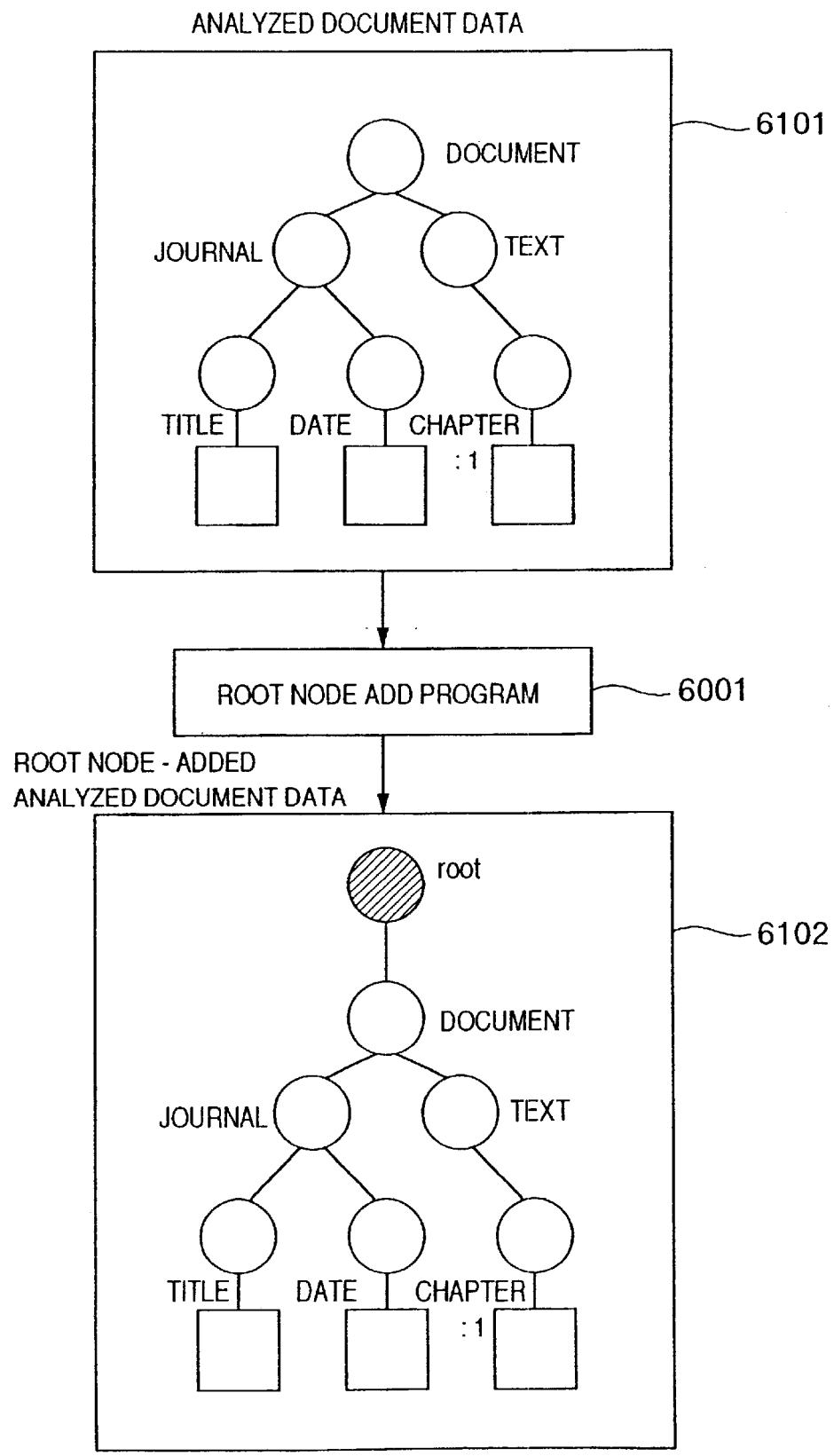
FIG. 61 is a diagram showing an example of the result of processing the root node add program according to the seventh embodiment of the invention.

The specific processing of the root node add program 6001 will be explained with reference to FIG. 61. The root node add program 6001 reads the analyzed document data 6101 constituting the output result of the document structure analysis program 210 from the analyzed document data storage area 217, generates the root node-added analyzed document data 6102 with a node having a specific type added as a superior node of the base document node of the analyzed document data, and stores it in the analyzed document data storage area 217. As a result, the analyzed document data 6101 thus read is replaced by the root node-added analyzed document data 6102.

In the document registration subsystem 101 according to this embodiment, all the parts of the configuration and the processes other than those mentioned above are exactly identical to those for the document registration subsystem according to the first embodiment.

Figure 62:
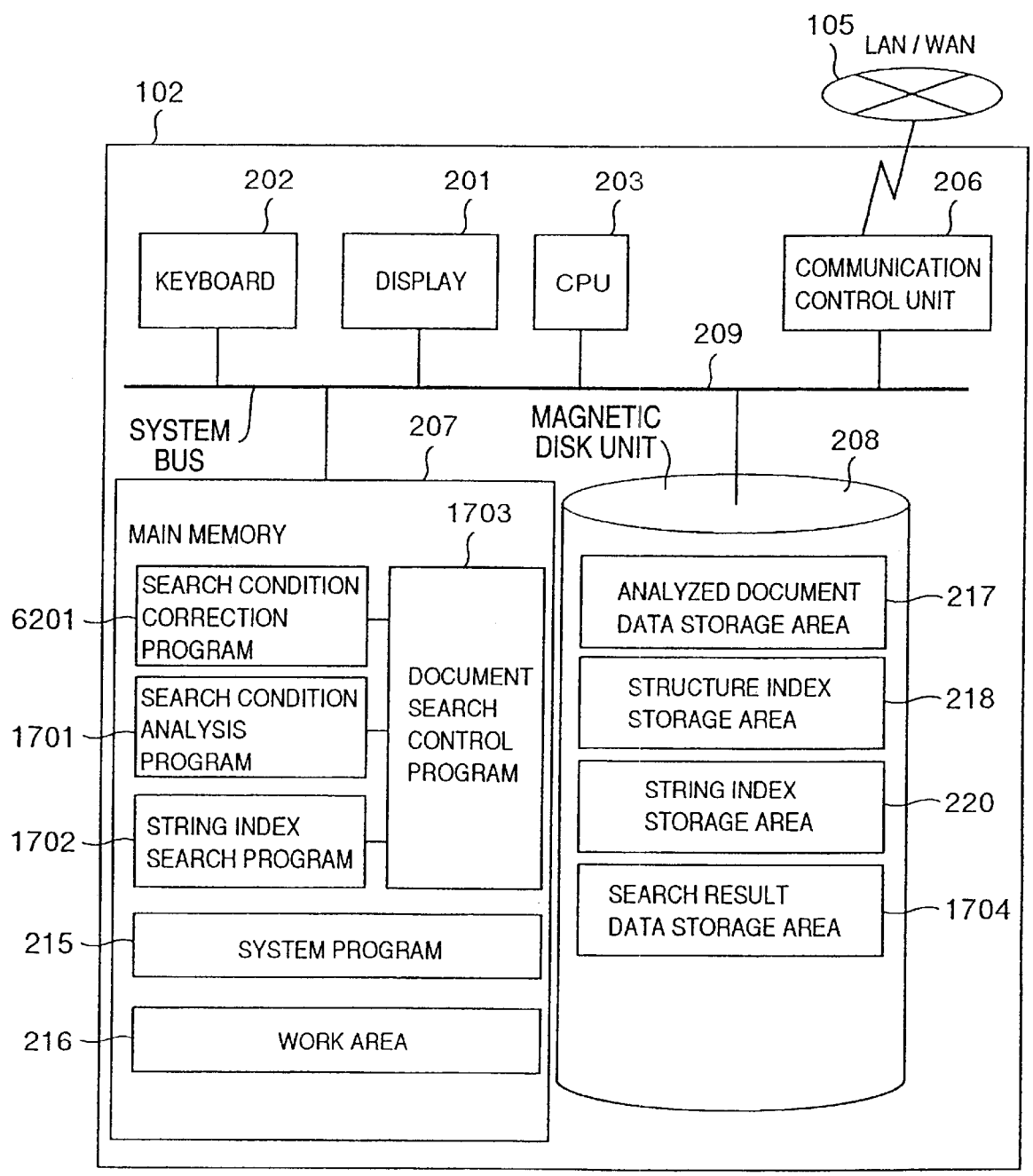
FIG. 62 is a diagram showing a configuration of a document search server according to the seventh embodiment of the invention.

FIG. 62 shows a system configuration of the document search server 102 according to this embodiment. This system configuration is the same as that of the document search server 102 of the first embodiment shown in FIG. 17 as far as the hardware configuration is concerned, except that a search condition correction program 6201 is added to the document registration program stored in the main memory 207.

In the case where the structural condition is specified from the base document element, the search condition correction program 6201 has added thereto the process in which the root added to the base document element of the analyzed document data of the registered document is added to the structural condition at the time of document registration. The search condition is not required to be changed in other cases.

Figure 63:
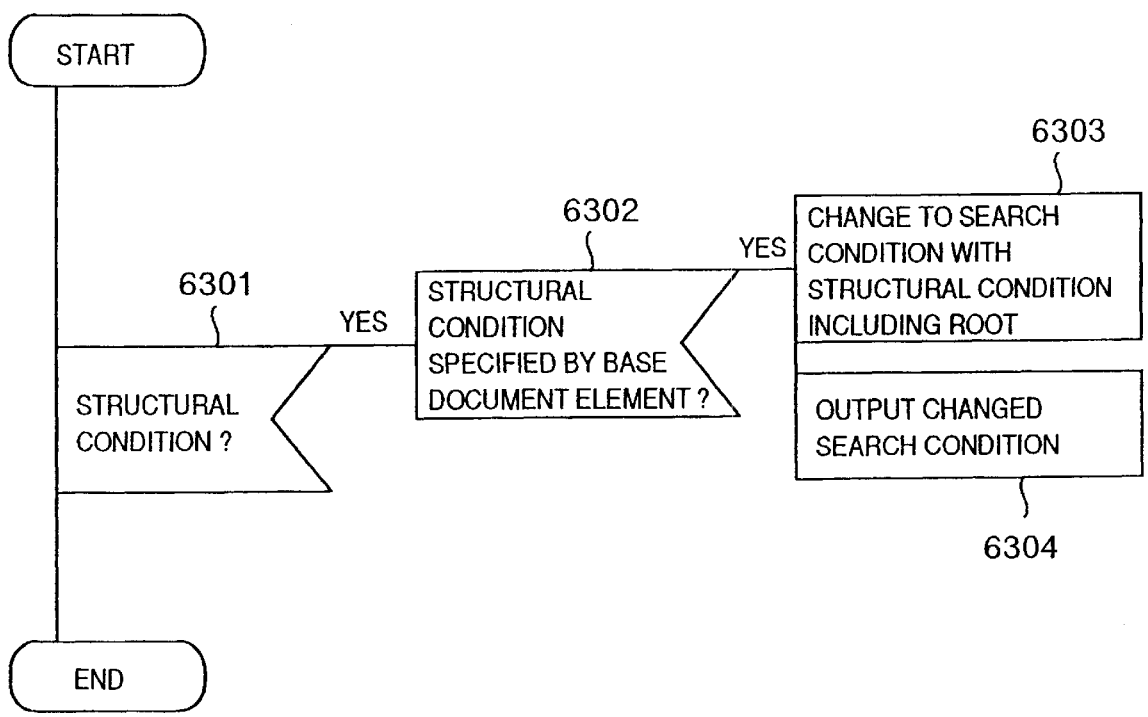
FIG. 63 is a diagram showing the steps of processing in the root node add program according to the seventh embodiment of the invention.

FIG. 63 is a PAD showing the specific processing of the search condition correction program 6201.

First, in step 6301, it is checked whether a structural condition exists or not in the search condition. In the presence of a structural condition, the process proceeds to step 6302, while in the absence thereof, the search condition is not changed and the search condition correction program 6201 is terminated.

In step 6302, it is checked whether or not the structural condition is specified from the base document element. In the case where it is specified from the base document element, the process proceeds to step 6303. In the case where the structural condition is not specified from the base document element, on the other hand, the search condition correction program 6201 is terminated without changing the search condition.

In step 6303, the structural condition is changed and the root of the base document element is determined as a specified search condition.

In step 6304, the changed search condition is output. The specific processing including and subsequent to step 1702 is the same as that of the search server 102 according to the first embodiment described above with reference to FIG. 17.

Figure 64:
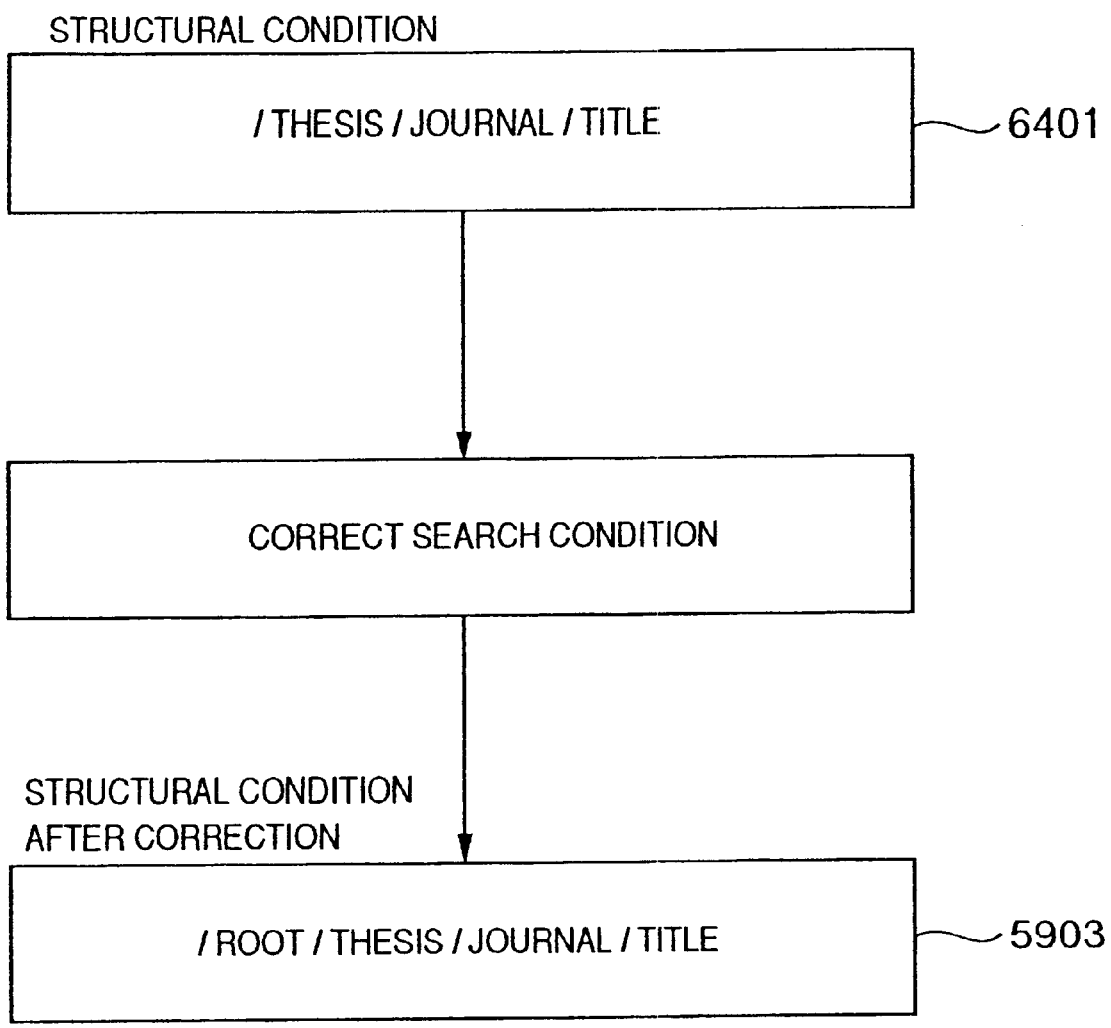
FIG. 64 is a diagram showing the contents of the process for converting the structural conditions according to the seventh embodiment of the invention.

FIG. 64 shows the result of search condition correction. As shown in FIG. 64, in the case where the base document element is specified in the structural condition, the structural condition is generated in which the element called the root is added.

All the processing other than changing the query as mentioned above is identical to the corresponding processing in the configuration of the search server 102 according to the first embodiment.

Now, an explanation will be given of the specific processing of the search clients 103, 104 according to the seventh embodiment.

In this embodiment, the system configuration of the search clients 103, 104 is identical to that of the search clients in the first embodiment of FIG. 25 except for the following point.

In step 2815 in the PAD of FIG. 28 showing the steps of processing according to the search result display program 2502, the analyzed document data are formatted and displayed only after the added root node is deleted in the document registration subsystem 101. In other words, the registered document is displayed after being converted into the analyzed document data representing the result of structural analysis. As a result, the root node added to the analyzed document data is transparent to the user.

The foregoing is the difference of the processing in the seventh embodiment from that in the first embodiment. The other points of the configuration and the other processing are the same as those for the first embodiment.

Except that the analyzed document data is different from the registered document, the foregoing processing makes possible the collective structure-specified search for a set of documents having various document structures using the structure index as in the case where the metal structure index is used.

(8) Eighth Embodiment

Now, an explanation will be given of a method of generating an alias structure index for efficiently searching a plurality of structures having the same structure collectively, and the search process using such a method.

Figure 65:
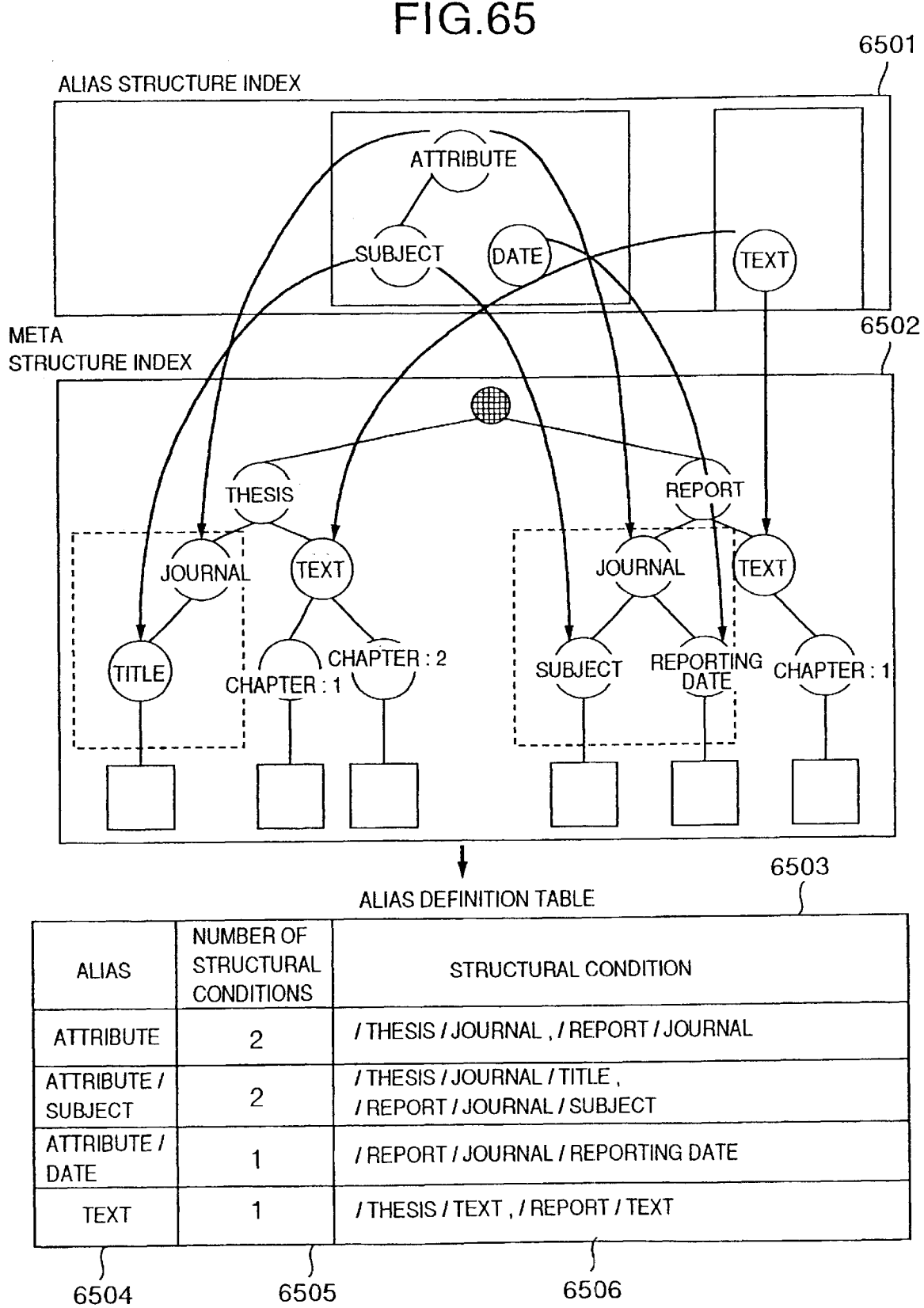
FIG. 65 is a diagram showing an alias structure index according to an eighth embodiment of the invention.

FIG. 65 is a diagram showing a configuration of an alias structure index 6501, the relation between the alias structure index 6501 and a meta structure index 6502, and the contents of an alias definition table 6503 used for generating the alias structure index.

The alias structure index, unlike the structure index, is not always generated for tracing the elements of the whole document, but is generated by cutting out the subelements of the document structure from the structure index and superposing them one on another.

As shown in FIG. 65, information on the journal of different document structures is cut out, and the context identifiers of the meta-nodes constituting the meta structure index are managed. In this way, without specifying each element in the search condition, the context identifiers of all the meta-nodes in the meta structure index corresponding to a given alias can be acquired by setting the structural condition with the particular alias specified.

The alias definition table 6503 stores the aliases 6504, the number of element definitions 6505 and the element definitions 6506.

The alias 6504 is stored as the name for referring to the alias structure index. The number of element definitions 6505 describes the number of element definitions registered as aliases. The element definition 6506 lists as many structural conditions in the search condition represented by the alias 6504 as the number of element definitions.

The alias structure index is such that the context identifiers of the meta-nodes in the structure index specified by several element definitions are acquired in advance thereby to quickly acquire from the structural condition the context identifiers of the string data contained in the structure meeting the search condition.

Each node of the alias structure index, like the meta-node of the structure index, has a context identifier of the meta-node and the link information for expressing the logic structure. The context identifier of the meta-node, however, has stored therein all the context identifiers of the meta-nodes of the string data contained in the structure defined as an alias.

Figure 66:
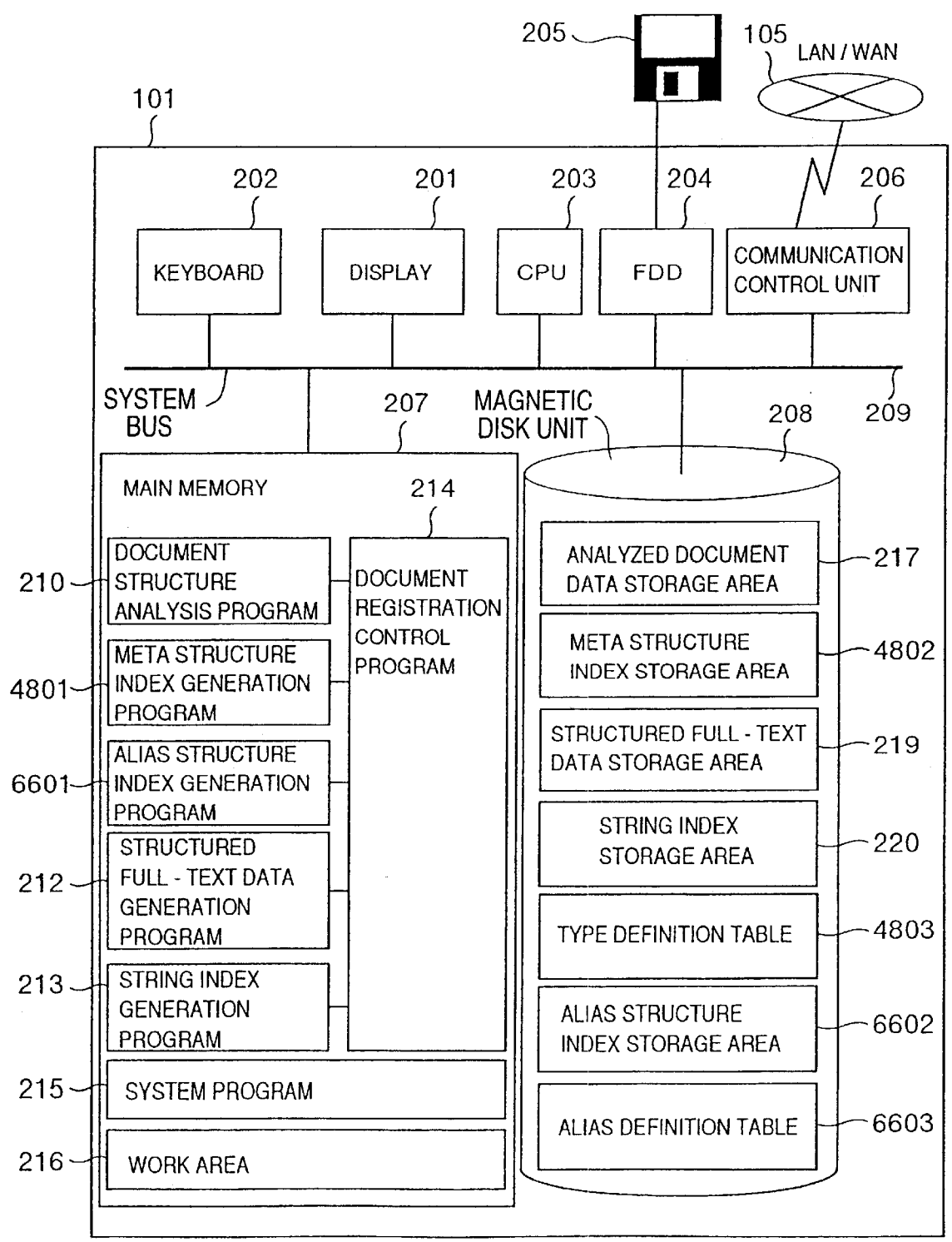
FIG. 66 is a diagram showing a system configuration of a document registration subsystem according to the eighth embodiment of the invention.

FIG. 66 is a diagram showing a system configuration of the document registration subsystem 101 according to this embodiment.

The system configuration of the document registration subsystem 101 according to this embodiment is identical to that of the document registration subsystem 101 of the fifth embodiment shown in FIG. 48, as far as the hardware configuration is concerned, except for the following point.

The difference lies in that an alias structure index generation program 6601 is added to the document registration program stored in the main memory 207, and an alias structure index storage area 6602 and an alias definition table 6603 are added to the magnetic disk 208.

The alias structure index generation program 6601 reads the alias definition table from the alias definition table storage area 6603. Further, the meta structure index generated by the meta structure index generation program 4801 is read from the meta structure index storage area 4802. Based on the information thus read, the alias structure index is generated and stored in the alias structure index storage area 6602.

Figure 67:
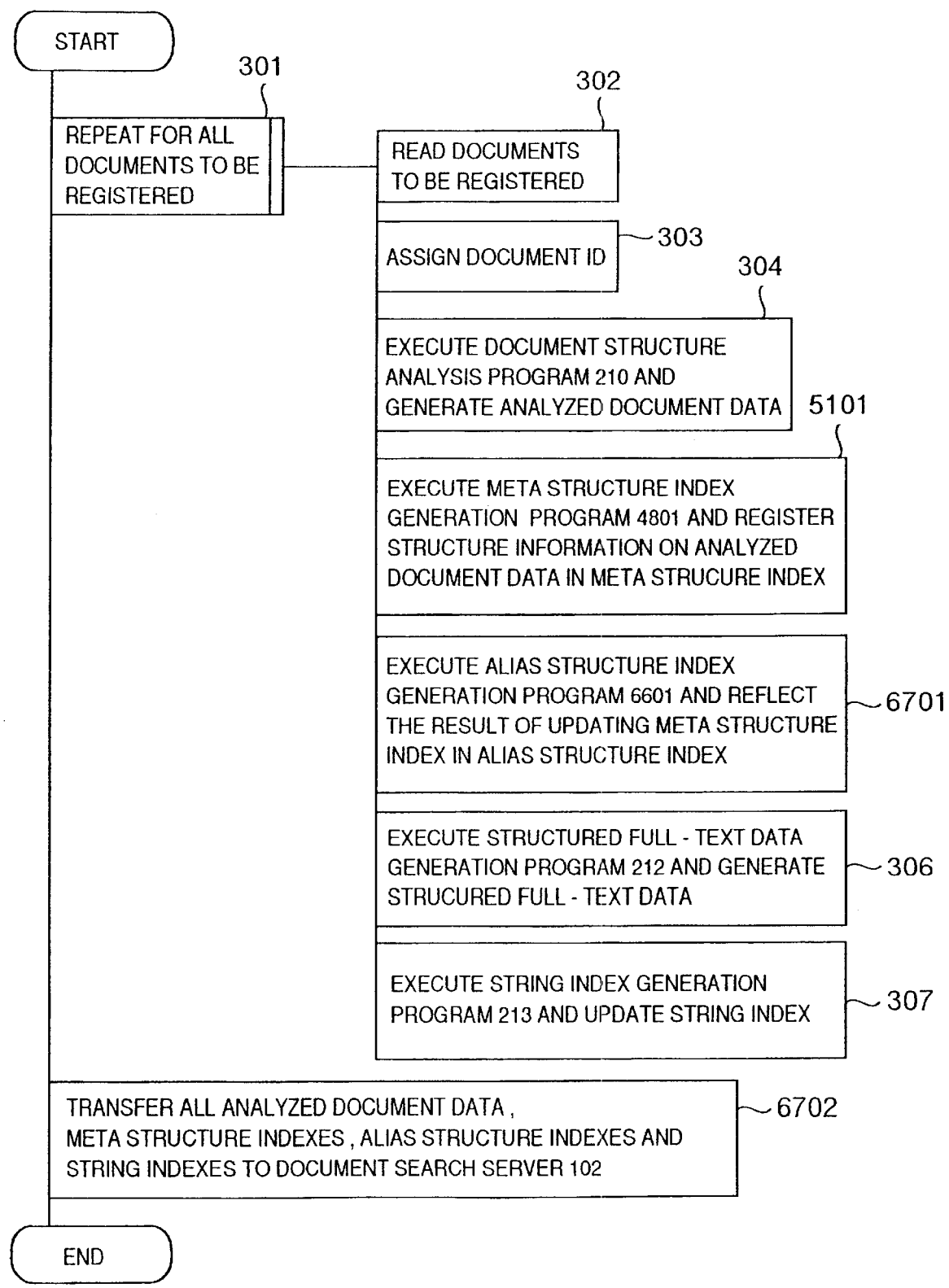
FIG. 67 is a PAD briefly showing the steps of the registration process according to the eighth embodiment of the invention.

FIG. 67 is a PAD briefly showing the steps of processing in the document registration subsystem 101 according to this embodiment. The processing steps according to this embodiment are substantially the same as those for the document registration subsystem 101 of the fifth embodiment described above with reference to FIG. 51. The only difference lies in that step 6701 is executed after step 5101, and step 6702 instead of step 5102 is executed.

In step 6701, the alias structure index generation program 6601 is executed, and with reference to the meta structure index information updated by document registration, the contents of the alias structure index are updated.

In step 6702, all the analyzed document data, the meta structure index, the alias structure index and the string index are transferred to the document search server 102.

Figure 68:
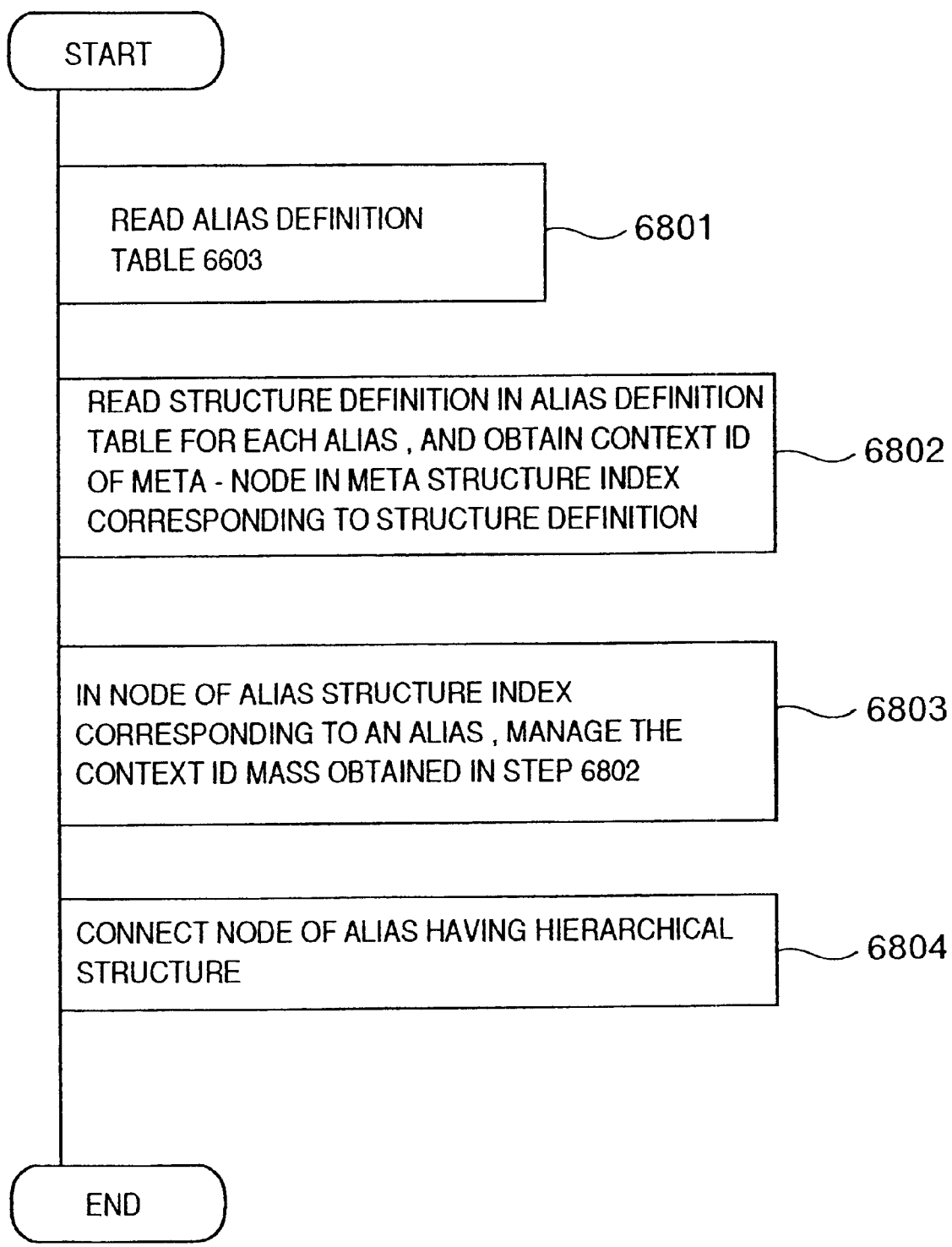
FIG. 68 is a PAD briefly showing the steps of generating an alias structure index according to the eighth embodiment of the invention.

FIG. 68 is a PAD showing the detailed process of step 6701 in FIG. 67. The steps of generating the alias structure index will be explained with reference to FIG. 68.

First, in step 6801, the alias definition table 6603 defining the elements generated as aliases is read out. The alias definition table 6603 is generated by the user using the text editor or the like from the keyboard 202. As an alternative, the same type of structures existing in different hierarchical levels are extracted from the structure index, and according to on this information on the same type of structures, the alias definition table 6603 is generated by a program for generating such a table.

Then, in step 6802, using the alias definition table 6603 read in step 6801, the meta-node adapted for the structure information is extracted from the structure index. This can be realized by the same process as the process for acquiring the meta structure index adapted for the query in the document search according to the fifth embodiment described as step 5702 in FIG. 57.

In step 6803, a table is generated for managing the context identifiers of the meta-nodes thus obtained, and registered in the alias structure index.

In step 6804, nodes are interconnected for expressing a hierarchical structure for an alias having a hierarchical structure. A hierarchical alias such as "journal/subject" can be specified as an alias registered in the alias structure index. In this case, first, a meta-node having the type information "journal" is extracted from the structure index, a meta-node having the type information "subject" is extracted from a subnode thereof, and a context identifier management table for managing the context identifiers of this meta-node is generated and registered in the alias structure index. Further, the context identifier management table is generated also for the meta-node having the type information "journal" obtained in this process, and stored in "journal" of the alias structure index, thereby generating an alias structure index having a hierarchical structure.

Figure 69:
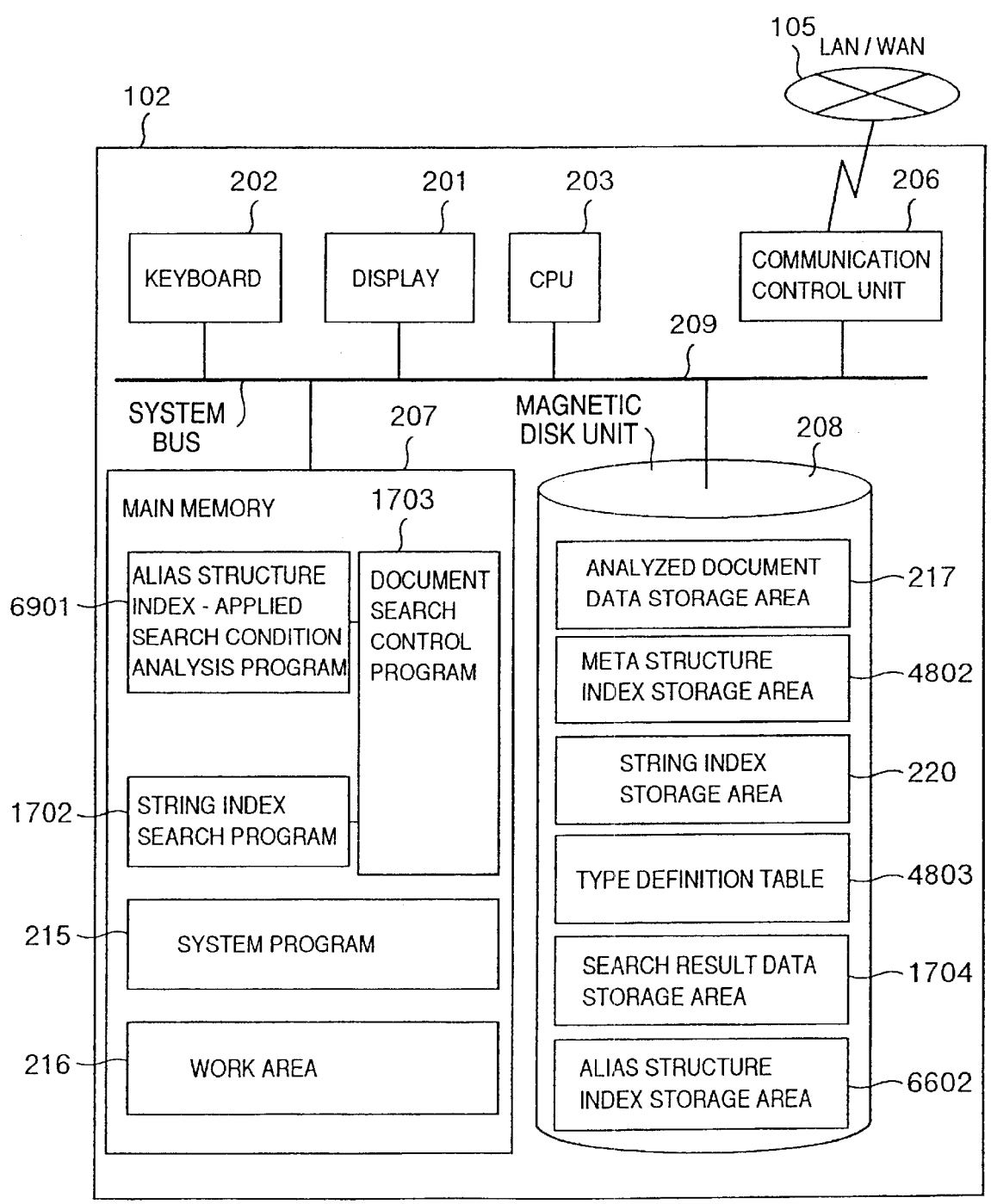
FIG. 69 is a diagram showing a system configuration of a document search server according to the eighth embodiment of the invention.

FIG. 69 is a diagram showing a system configuration of the full-text search server 102 according to this embodiment.

This configuration diagram is identical to the system configuration diagram of the full-text search server 102 of the fifth embodiment described above with reference to FIG. 55, as far as the hardware configuration thereof is concerned, except that an alias structure index-applied search condition analysis program 6901 is stored in the main memory in place of the meta structure index-applied search condition analysis program 5501, and that an alias structure index storage area is added to the magnetic disk 208.

Figure 70:
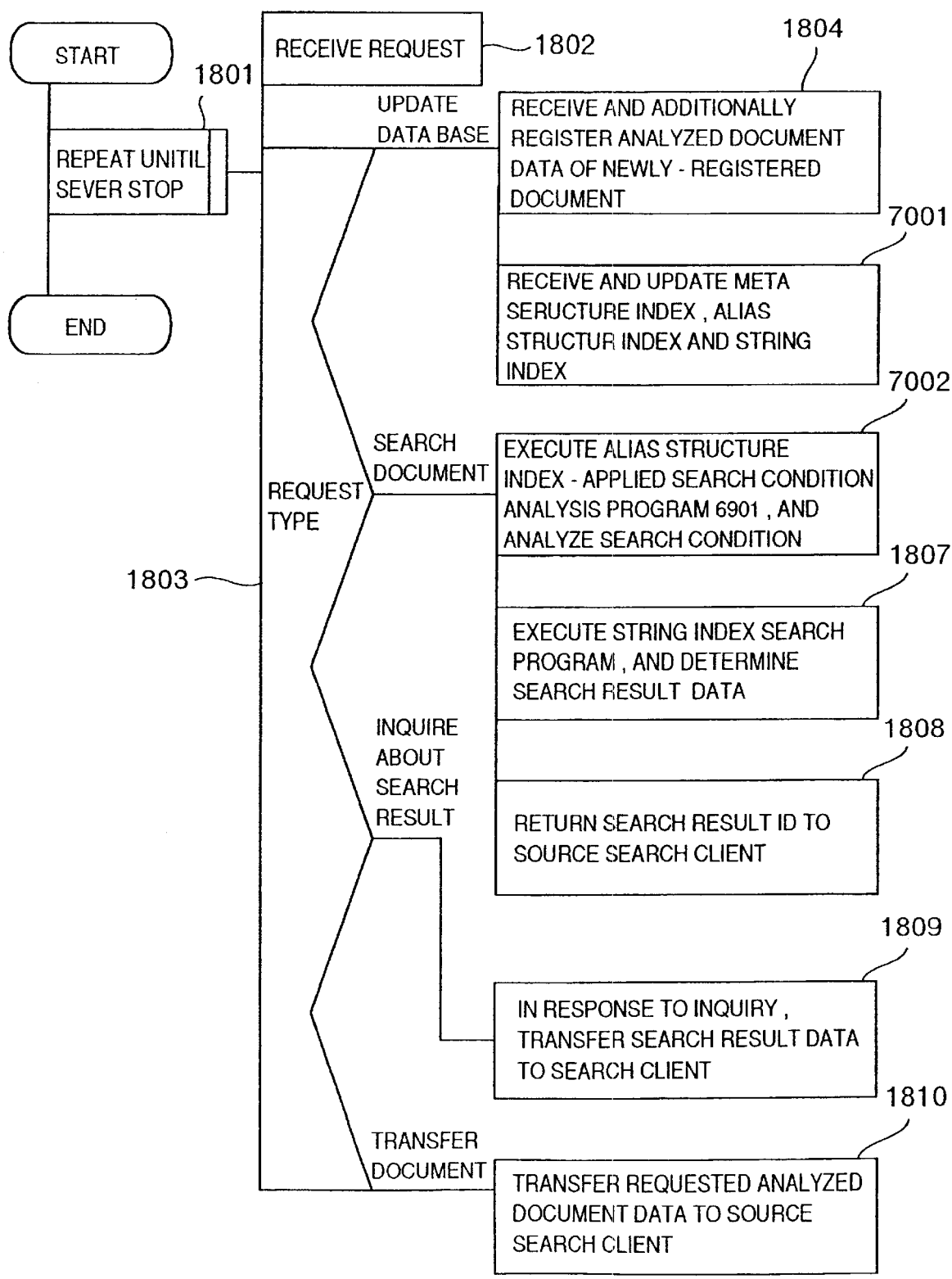
FIG. 70 is a PAD briefly showing the document search process according to the eighth embodiment of the invention.

FIG. 70 is a PAD briefly showing the search process according to this embodiment.

The process shown in FIG. 70 is substantially the same as that of the fifth embodiment shown in FIG. 56, except that step 7001 instead of step 5601 is executed in place of step 5601 and step 7002 is executed in place of step 5602.

In step 7001, the meta structure index, the alias structure index and the string index are received from the document registration subsystem 101 and stored in the meta structure index storage area 4802, the alias structure index storage area 6602 and the string index storage area 220, respectively.

In step 7002, the alias structure index-applied search condition analysis program 6901 is executed.

Figure 71:
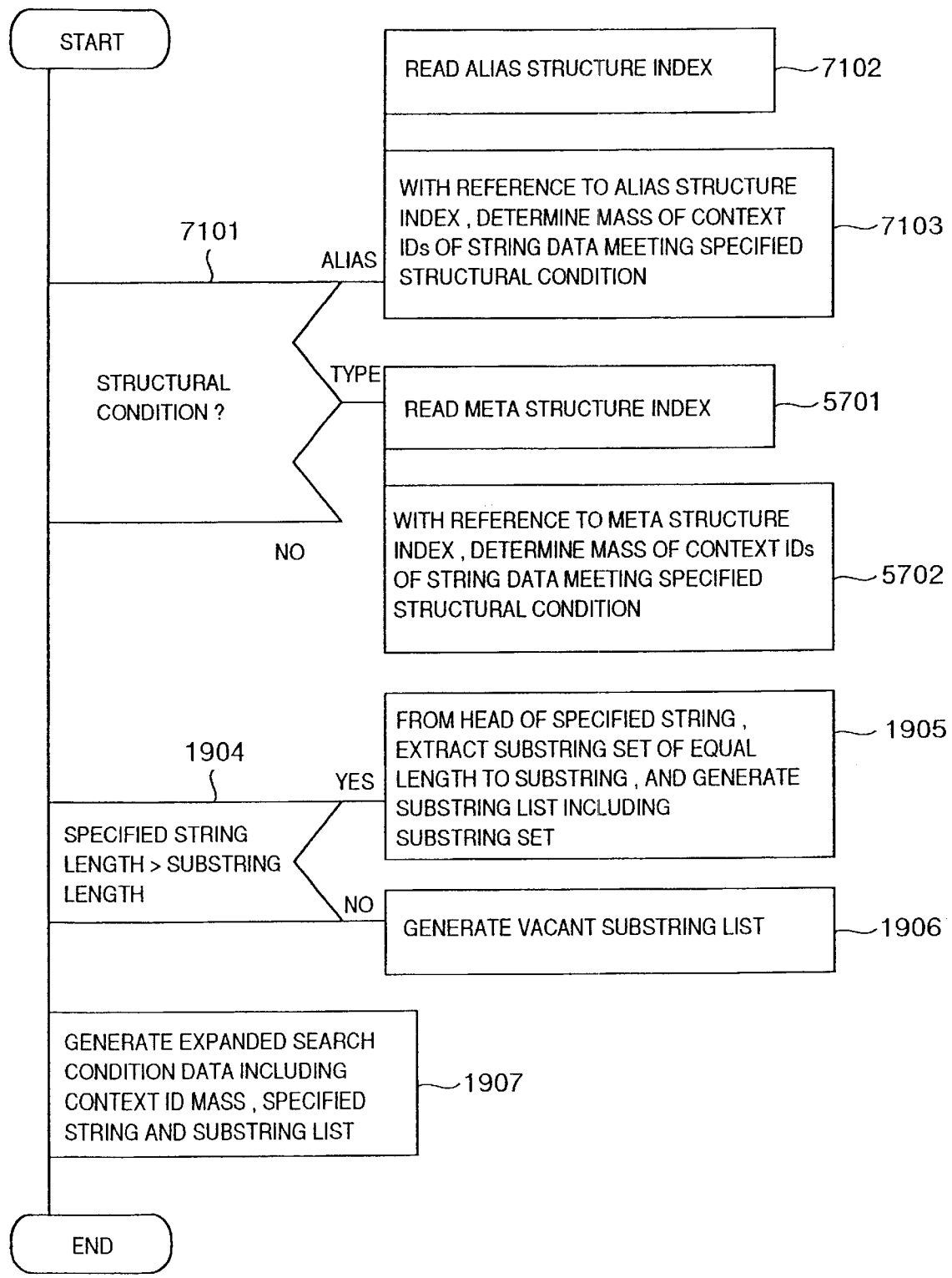
FIG. 71 is a PAD showing the steps of processing in an alias structure index-applied search condition analysis program according to the eighth embodiment of the invention.

FIG. 71 is a PAD showing the detail of the process of step 7002, i.e. the steps of processing the alias structure index-applied query analysis program 6901.

The process shown in FIG. 71 is substantially the same as that of the meta structure index-applied search condition analysis program according to the fifth embodiment shown in FIG. 57, except for the following points.

In place of step 1901 for determining the presence or absence of the structural condition, step 7101 is executed for determining whether the structural condition is present or absent and whether an alias is specified or not. Also, in the case where an alias is specified in step 7101, steps 7102 and 7103 are executed. In the case where the structural condition is the type or the element type name, like in the fifth embodiment, steps 5701 and 5702 are executed.

Step 7101 determines whether an alias is used as the structural condition for the structure-specified search. In the case where an alias is used for the structural condition, the string "Alias:", for example, is added to the head of the structural condition for discrimination. In the case where "subject" constituting an alias is specified as an element to be searched, therefore, it is determined by checking whether "Alias: subject" is described in the structural condition or not.

In step 7102, the alias structure index is read. In step 7103, with reference to the alias structure index, a mass of context identifiers of the string data meeting the specified structural condition is determined. It is thus possible to acquire the context identifier of the meta-node of the string data underlying the meta-node of the meta structure index corresponding to the alias stored in the alias index.

The other processes are the same as those of the meta structure index-applied search condition analysis program of the fifth embodiment shown in FIG. 57.

The configuration, the specific processes and other aspects of the search server 102 according to the present embodiment are the same as those for the full-text serve 102 according to the fifth embodiment.

The foregoing is the description of the eighth embodiment of the invention.

(9) Ninth Embodiment

Now, as a ninth embodiment, an explanation will be given of a method of specifying the type of the element type name for each document structure by changing the contents described in the type definition table 4803 in the fifth embodiment.

The information stored in the type definition table 4803 according to this embodiment will be explained with reference to FIG. 72. As shown in FIG. 72, the DTD name and the element type name are stored in the "DTD and element type name" area 7201, so that the type can be determined not only by the element type name of the analyzed document data but by a combination with the DTD name. As a result, the type according to the document structure of the registered document can be defined while setting the type of "text" in "report" as "report content", and the type of "text" of other documents as the same "text".

The system configuration of the document registration subsystem 101 according to this embodiment is the same as that of the document registration subsystem according to the fifth embodiment shown in FIG. 48. Further, the processing steps of the document registration subsystem 101 according to this embodiment are the same as those for the document registration subsystem according to the fifth embodiment shown in the PAD of FIG. 52, except for the following point.

Specifically, the difference lies in that the base document element of the structure index is acquired in step 5201 not simply by converting the element type name to the type with reference to the type definition table but the acquired type corresponds to a combination of the DTD of the registered document and the element name.

Further, the structure index is superposed in step 5202 after the type is acquired by a combination of the DTD of the registered document and the element type name with reference to the type definition table 4803.

The other aspects of the configuration and the specific processes of this embodiment are not different from those of the fifth embodiment.

The foregoing is the description of the ninth embodiment.

(10) Tenth Embodiment

Now, as a tenth embodiment, an explanation will be given of a method for acquiring the type by managing the type definition table 4803 for each structure index in the fifth embodiment and by referring to the type definition table for each structure index in the meta structure index.

The system configuration of the document registration subsystem 101 according to this embodiment is the same as that of the document registration subsystem according to the fifth embodiment shown in FIG. 48, except for the following points. Specifically, according to this embodiment, the type definition table 4803 is generated for each structure index, and the meta structure index has a type definition table for the type of the base document element of each structure index. This configuration permits a given element type name to be assigned to different types for each structure index.

These type definition tables can have the contents shown in FIG. 50 of the fifth embodiment, or the contents shown in FIG. 72 of the ninth embodiment. The description that follows refers to the case of using the type definition table according to the fifth embodiment shown in FIG. 50. However, similar processes can be employed also when using the type definition table according to the ninth embodiment shown in FIG. 72.

Figure 73:
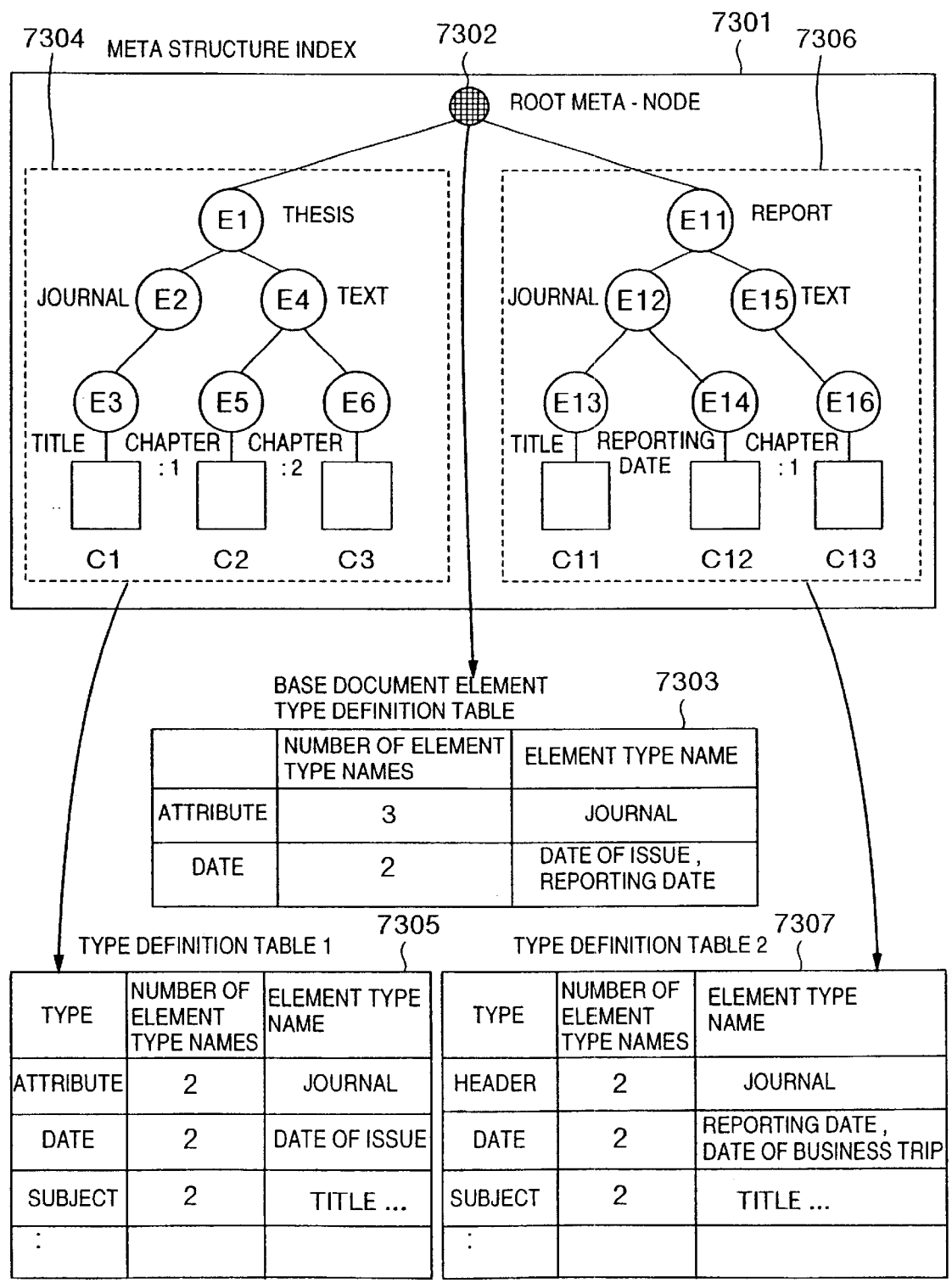
FIG. 73 is a diagram showing the correspondence between the meta structure index and the type definition management table for each structure index according to a tenth embodiment of the invention.

FIG. 73 is a diagram showing the relation between the meta structure index and the type definition table according to this embodiment. A base document element type definition table 7303 is generated as a table corresponding to the root meta-node 7302 of the meta structure index 7301. Further, the type definition table is generated for each structure index. In FIG. 73, the type definition table 1 (7305) corresponding to the structure index of the thesis is generated, and further the type definition table 2 (7307) corresponding to the structure index 7306 of the report is generated. With this configuration, the type can be defined for each structure index.

The processing steps of the document registration subsystem 101 according to this embodiment are the same as those shown in the PAD of FIG. 52 for the document registration subsystem of the fifth embodiment, except for the following points. That is, the base document element of the structure index is acquired in step 5201 by converting the element type name to the type by referring to the base document element type definition table 7303 to acquire a corresponding structure index. Further, in step 5202, the element type name is converted to the type for superposing the structure index by reference to the type definition table corresponding to the structure index obtained in step 5201. In the case where the type of the registered document is the thesis, for example, the element type name is converted to the type by reference to the type definition table 1 (7305) corresponding to the structure index 7304.

The other aspects of the configuration and the specific processes of the present embodiment are the same as those of the fifth embodiment.

Even in the case where the type definition table has a configuration as shown in FIG. 72 like the ninth embodiment, the same configuration can be realized by using a combination of the element type name and the DTD according to the steps of processing shown in the ninth embodiment.

The foregoing is the description of the tenth embodiment of the invention.

It will thus be understood from the foregoing description that according to the method of searching a structured document of the present invention, the conditions for the position of occurrence of the logic elements in the document can be included in the structural condition specification. Therefore, a highly accurate structure-specified search is possible even for a document data base made up of a multiplicity of documents having complicated logical structure.

What is claimed is:

1. A method of registering a structured document in a document search system for searching the contents of a mass of documents registered in advance, said method of registering a structured document comprising the steps of:

generating analyzed structured documents obtained by analyzing the logical structures of documents to be registered, said structured document being denoted with a hierarchy of nodes corresponding to each logical structure of said document;

setting a root meta-node as a superior node of the analyzed structured documents, while assigning a meta-node for the analyzed documents having the same kind and locating at the same position when the root meta-node is a most superior node; and generating a meta structure index representing a document structure information having the root meta-node as the most superior node by a structure tree having meta-nodes as elements.

2. A method of registering a structured document according to claim 1, further comprising the steps of:

analyzing a kind definition table defining a correspondence between an element kind name of the document and an element kind to obtain elements having the same kind.

3. A method of registering a structured document according to claim 1, further comprising the steps of:

assigning a document element kind name for elements having the same kind but locating at different positions as alias; and generating an alias structure index linking the alias with the meta-node.

4. A method of registering a structured document according to claim 1, further comprising the steps of:

assigning a common element kind name for the meta-nodes having a specific kind in the meta structure index as alias; and generating a common element kind name structure index linking the alias with the meta-node in the meta structure index.

5. A method of registering a structured document according to claim 1, further comprising the steps of:

assigning a common element kind name for elements having the same kind and locating at different structure indices or positions as an alias; and generating an alias structure index linking the alias name with a structure index identifier and a context identifier of the meta-node.

6. A method of registering a structured document in a document search system for searching the contents of a mass of documents registered in advance, said method of registering a structured document comprising the steps of:

generating first analyzed structured documents obtained by analyzing the logical structures of documents to be registered, said structured document being denoted with a hierarchy of nodes corresponding to each logical structure of said document;

converting the first analyzed documents to second analyzed documents by adding a virtual base document element common to all documents as a superior node of the base document element of the first analyzed document to the first analyzed document; and generating a structure index representing a common structure information by a structure tree having meta-nodes as elements by assigning a meta-node for the nodes of the second analyzed documents having the same kind and locating at the same position when the virtual base document element is the base document element.

7. A method of searching a structured document in a document search system for searching the contents of a mass of documents registered in advance, said method of searching a structured document comprising the steps of:

(1) converting an element kind name described in a search condition into an element kind using a kind definition table defining a correspondence between the element kind name of the document and the element kind and determining a context identifier group matching kind information by referring to a structure index;

(2) extracting a predetermined substring from a search term and extracting a group of structured character position information corresponding to the substring by referring to a string index; and (3) extracting the structured character position information having a context identifier included in the group determined in step (1) and having the same positional relation as the substring in the search term from the group of structured character position information.

8. A method of searching a structured document in a document search system for searching the contents of a mass of documents registered in advance, said method of searching a structured document comprising the steps of:

(1) determining a context identifier group matching kind information by obtaining a position of a node corresponding to a structure index based on an element kind name described in search condition by using a common element kind name index;

(2) extracting a predetermined substring from a search term and extracting a group of structured character position information corresponding to the substring by referring to a string index; and (3) extracting the structured character position information having a context identifier included in the group determined in step (1) and having the same positional relation as the substring in the search term from the group of structured character position information.

* * * * *